(12) United States Patent
Malakapalli et al.

(10) Patent No.: US 12,169,639 B2
(45) Date of Patent: Dec. 17, 2024

(54) DATA EXCHANGE BETWEEN HOST AND STORAGE DEVICE USING COMPUTE FUNCTIONS

(71) Applicant: Kioxia Corporation, Tokyo (JP)

(72) Inventors: Krishna R. Malakapalli, San Jose, CA (US); Gary James Calder, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/200,349

(22) Filed: Mar. 12, 2021

(65) Prior Publication Data

US 2022/0291861 A1    Sep. 15, 2022

(51) Int. Cl.
G06F 3/06 (2006.01)

(52) U.S. Cl.
CPC .......... G06F 3/0655 (2013.01); G06F 3/0604 (2013.01); G06F 3/0679 (2013.01)

(58) Field of Classification Search
CPC .............................. G06F 3/0655; G06F 3/0604
See application file for complete search history.

(56) References Cited

U.S. PATENT DOCUMENTS

| | | | |
|---|---|---|---|
| 9,092,152 B1* | 7/2015 | Piszczek | G06F 3/0647 |
| 2014/0208024 A1* | 7/2014 | Simionescu | G06F 11/1076 711/114 |
| 2017/0220410 A1* | 8/2017 | Kim | G06F 11/1072 |
| 2017/0309314 A1* | 10/2017 | Zawodny | G11C 8/16 |
| 2018/0046405 A1* | 2/2018 | Hush | G11C 7/1012 |
| 2018/0101450 A1* | 4/2018 | Park | G06F 11/1469 |
| 2019/0102321 A1* | 4/2019 | Trikalinou | G06F 12/145 |
| 2021/0096816 A1* | 4/2021 | Wang | G06F 16/9017 |

FOREIGN PATENT DOCUMENTS

| | | |
|---|---|---|
| CN | 102693758 A | 9/2012 |
| CN | 110348249 A | 10/2019 |

OTHER PUBLICATIONS

Office Action and Search Report issued in a Taiwanese application No. 111105980 dated Jan. 19, 2023.

* cited by examiner

*Primary Examiner* — David Yi
*Assistant Examiner* — Nicholas A. Paperno
(74) *Attorney, Agent, or Firm* — Foley & Lardner LLP

(57) ABSTRACT

Various implementations described herein relate to systems and methods for a storage device (e.g., a Solid State Drive (SSD)) to perform a Compute Function (CF). One or more embodiments include a method by which a data transfer is annotated to call out a computation to be performed by the storage device on data before, after, or in parallel with reading the data from or writing the data to the storage device. One or more embodiments include a storage device including a controller, wherein the controller is configured to perform a method including receiving a command from a host, the command identifying the CF, and in response to receiving the command, performing the CF on at least one of internal data stored in the storage device or external data transferred from the host to determine the computation result of the CF.

17 Claims, 26 Drawing Sheets

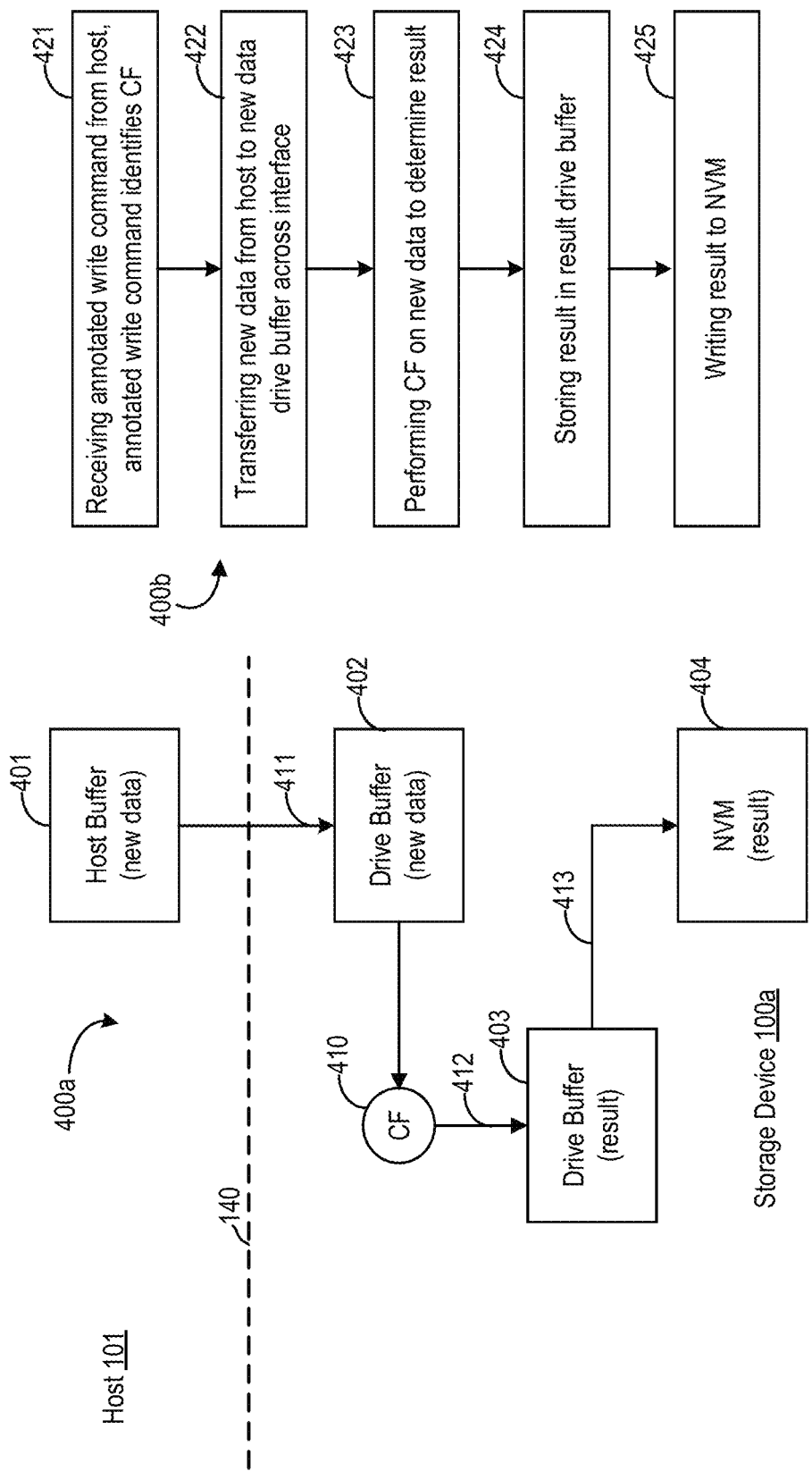

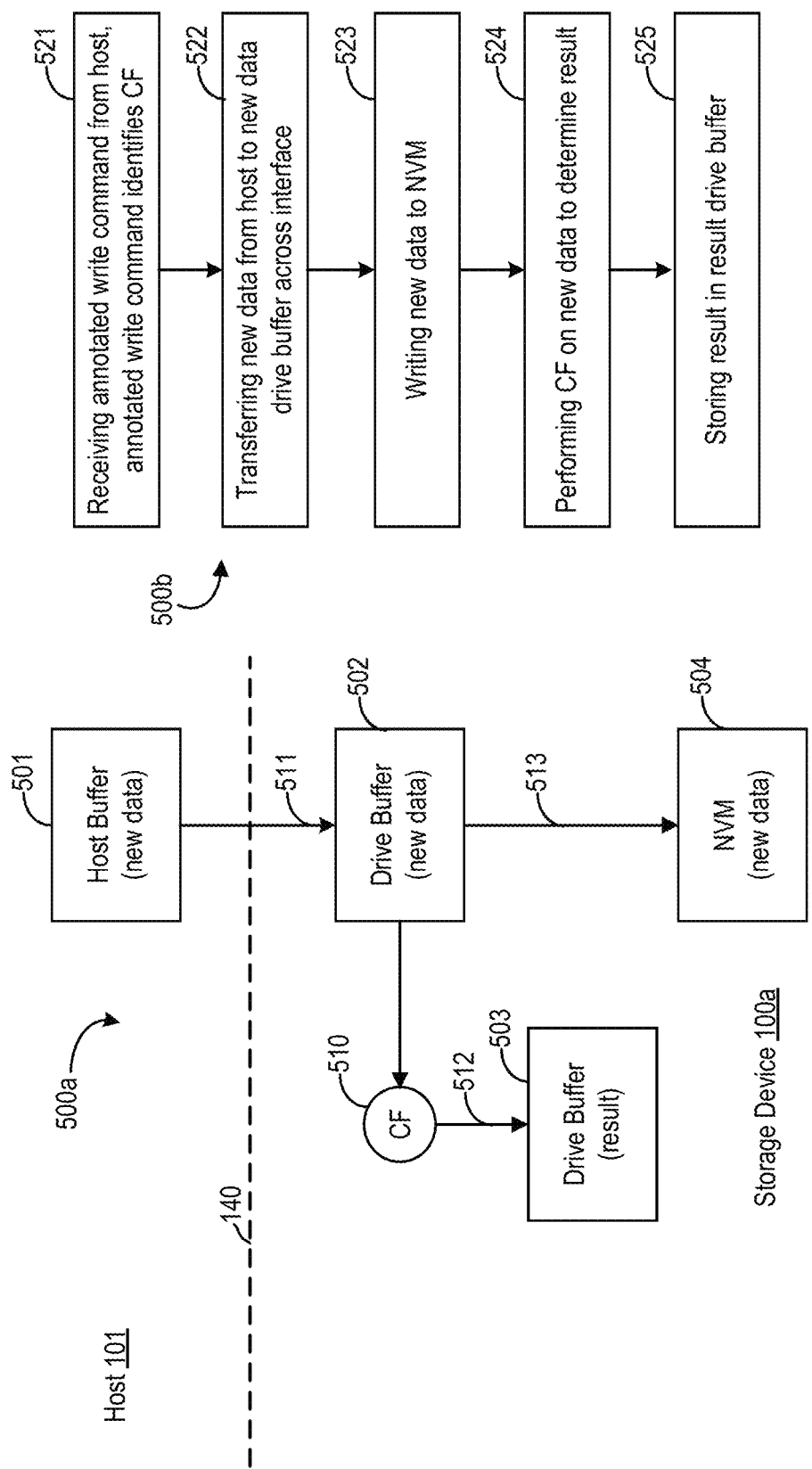

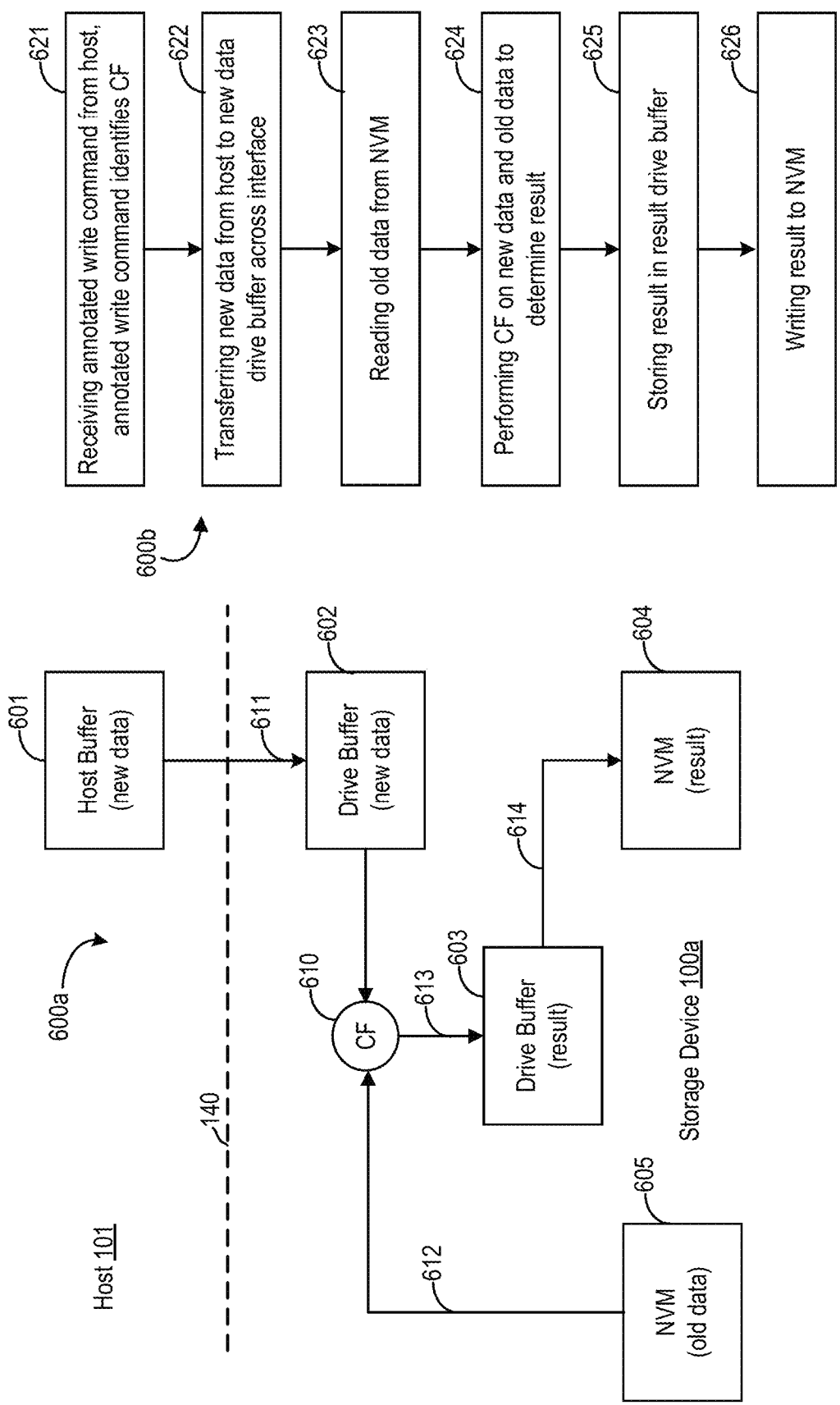

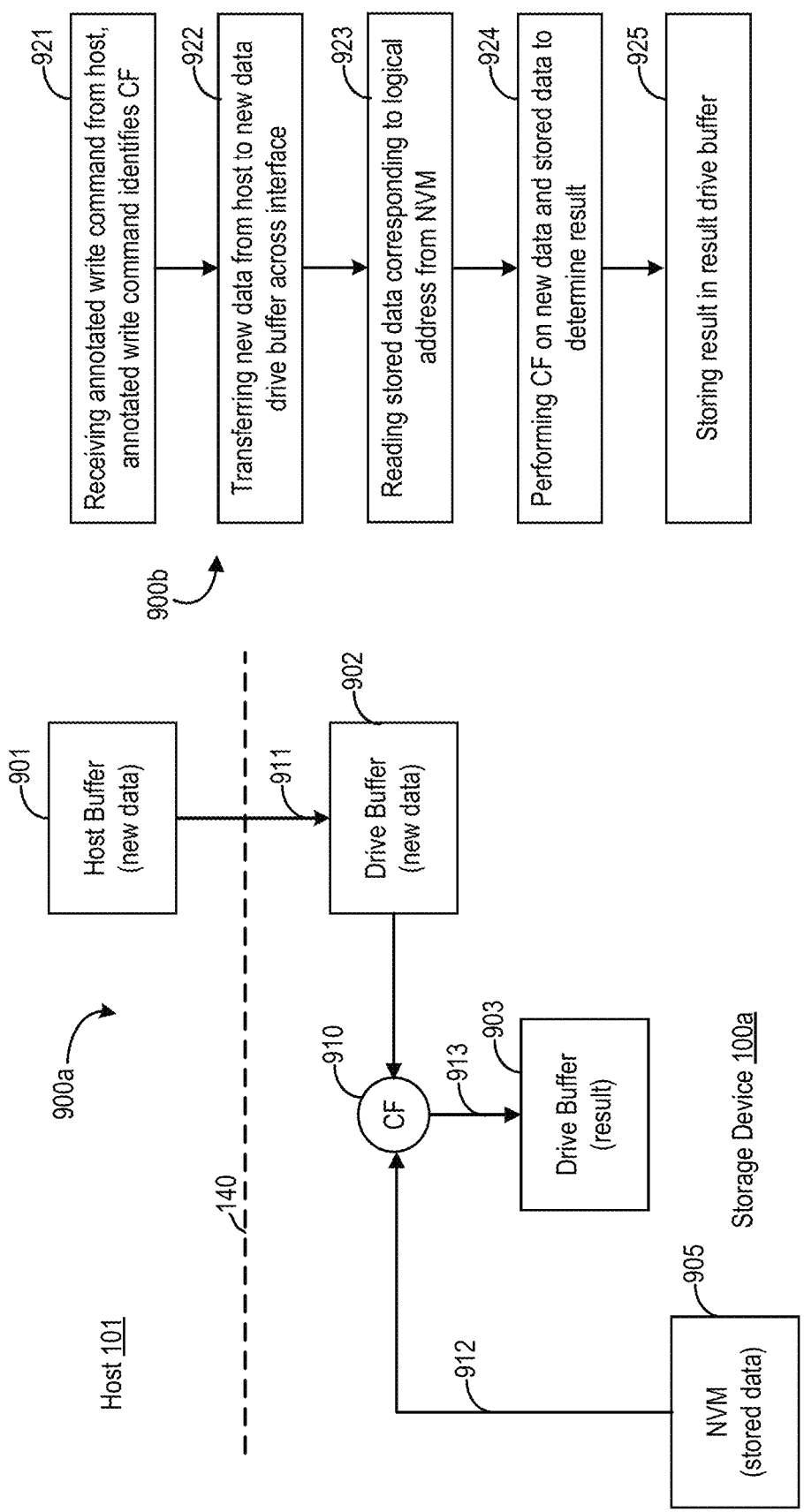

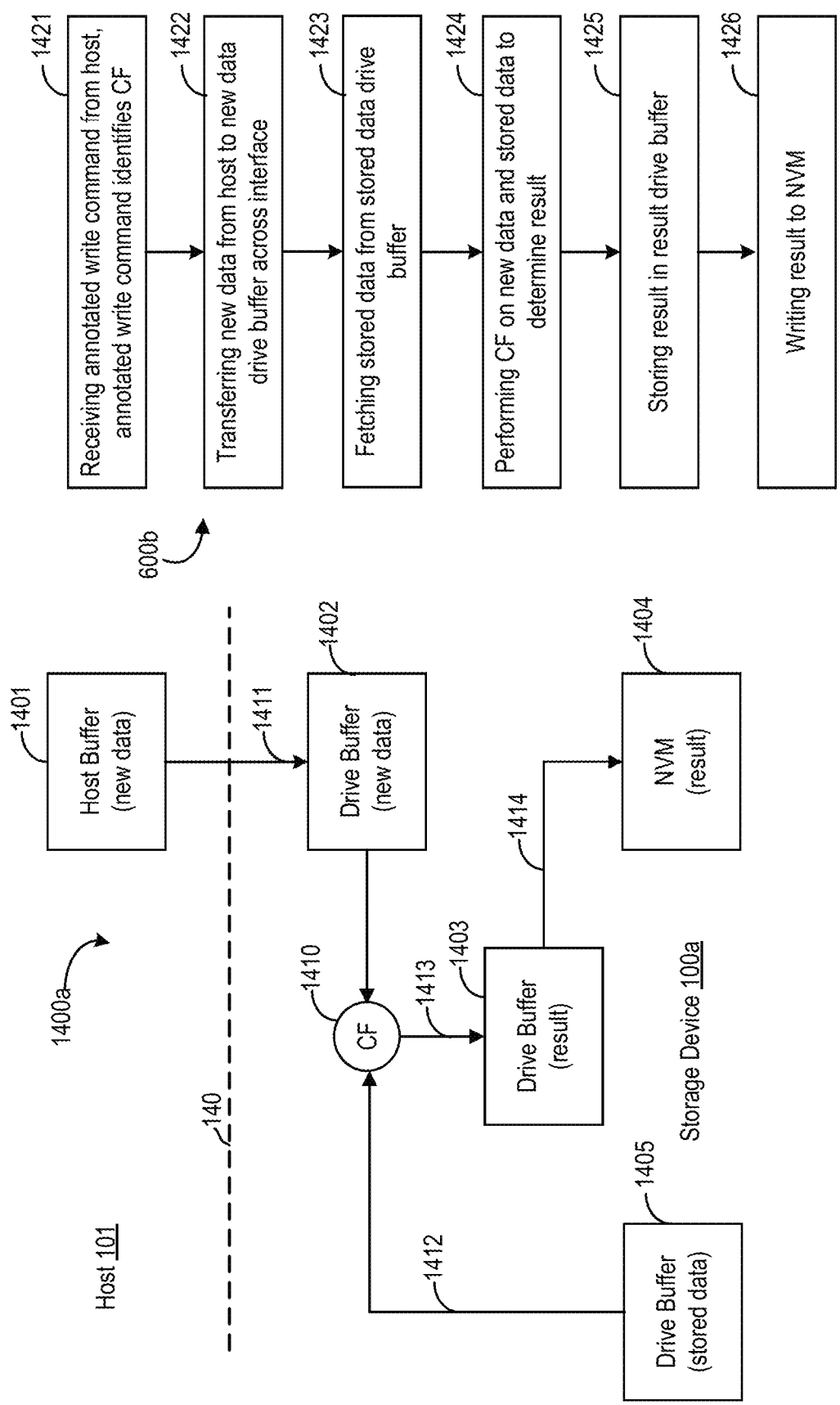

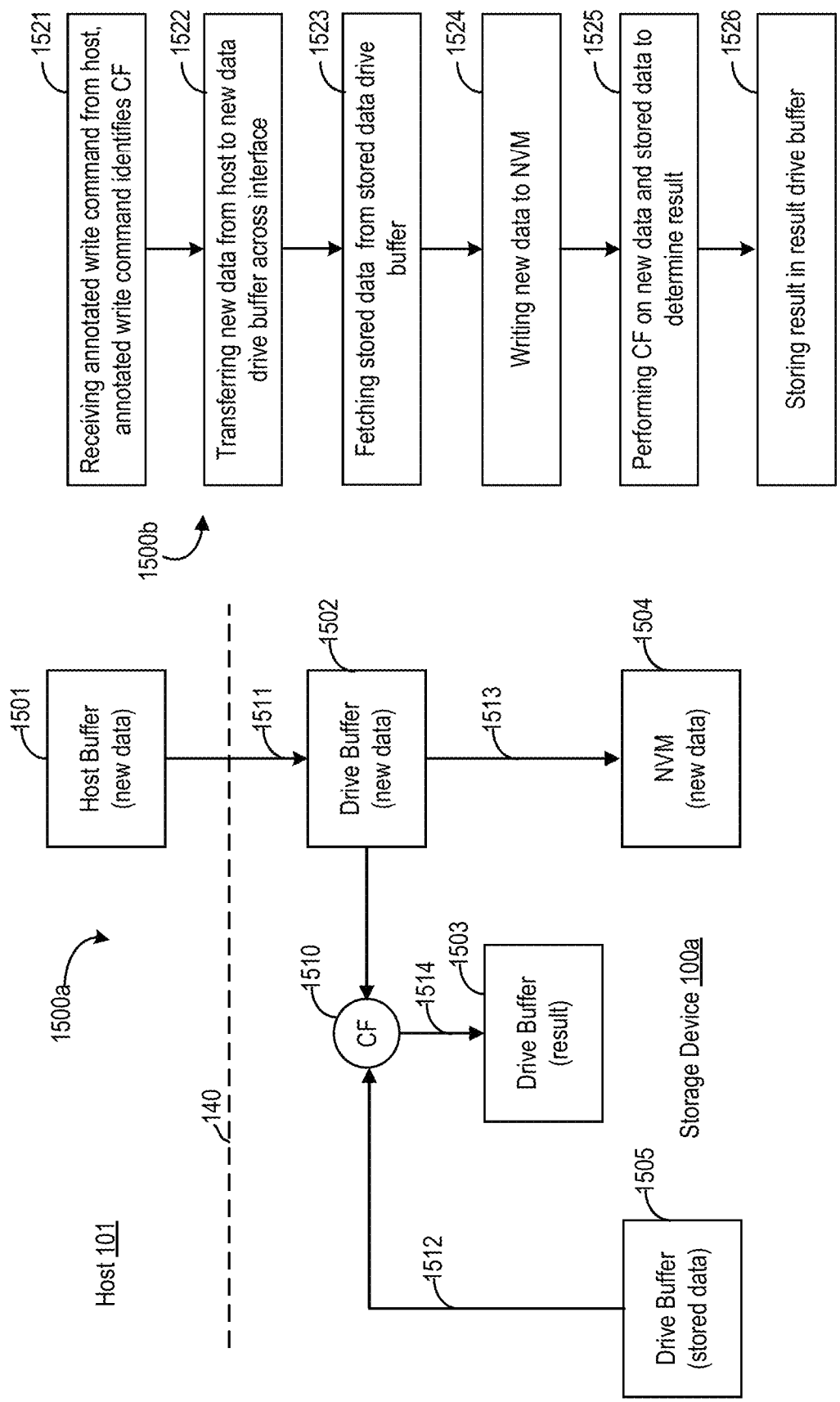

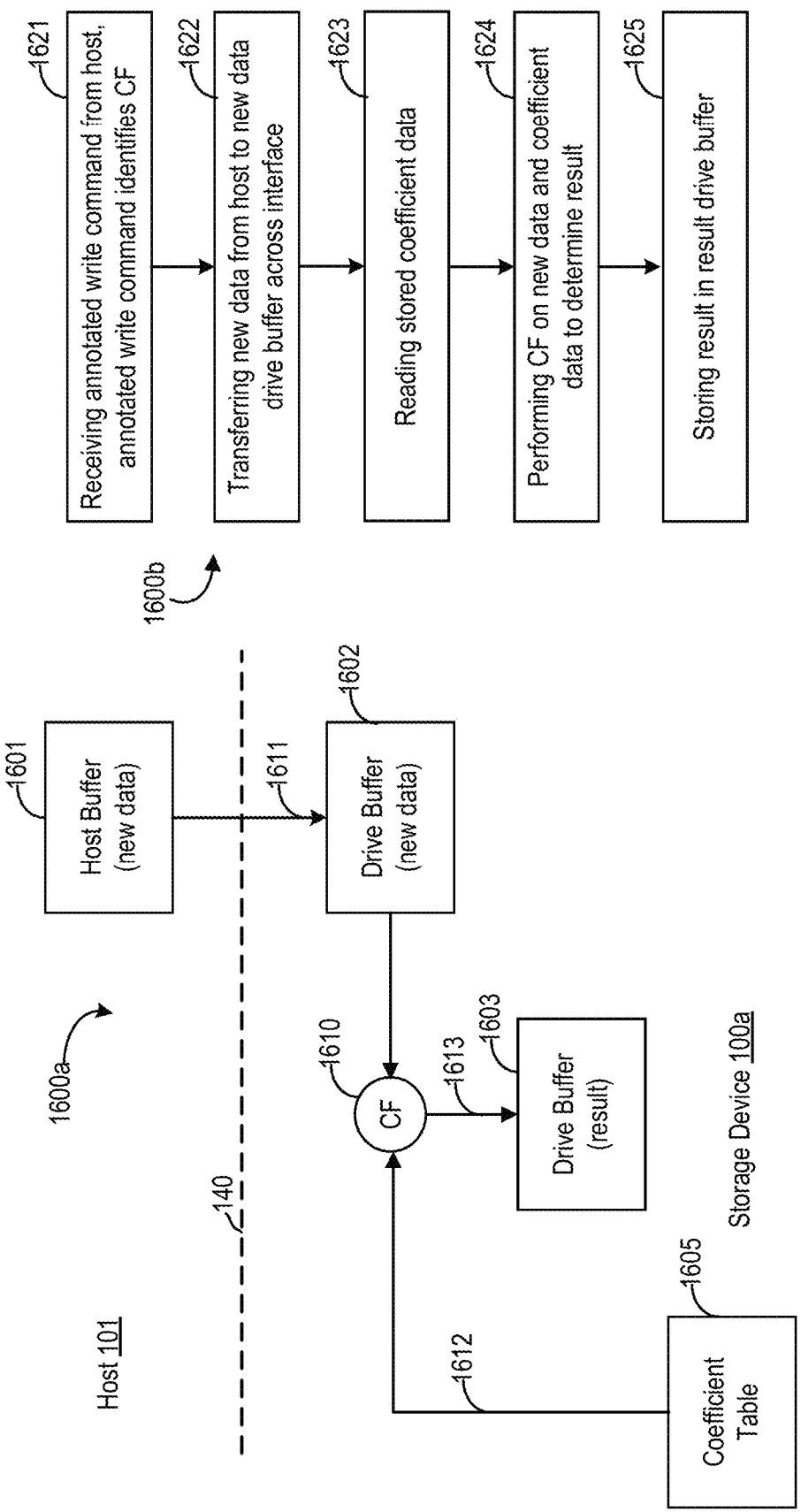

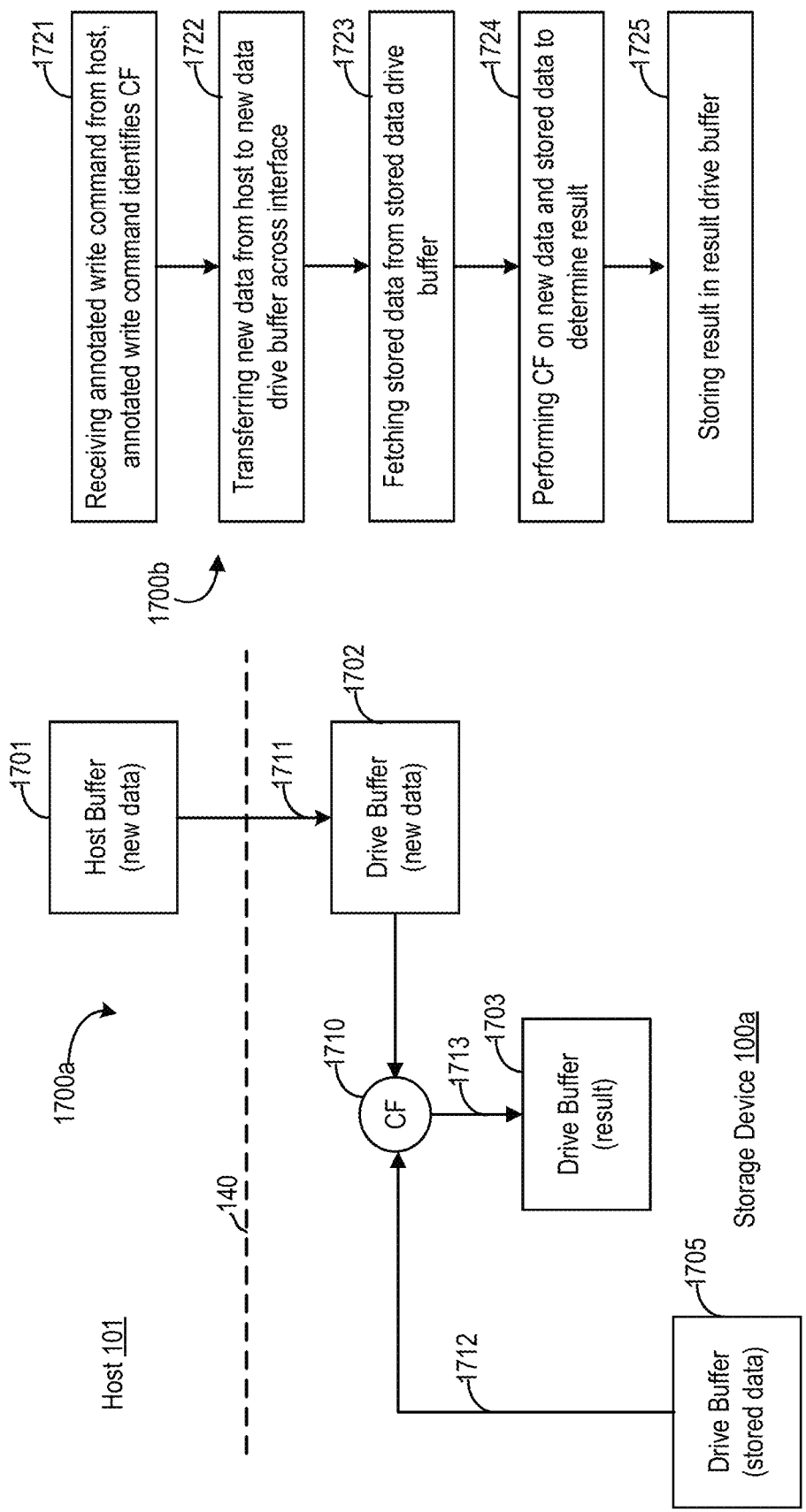

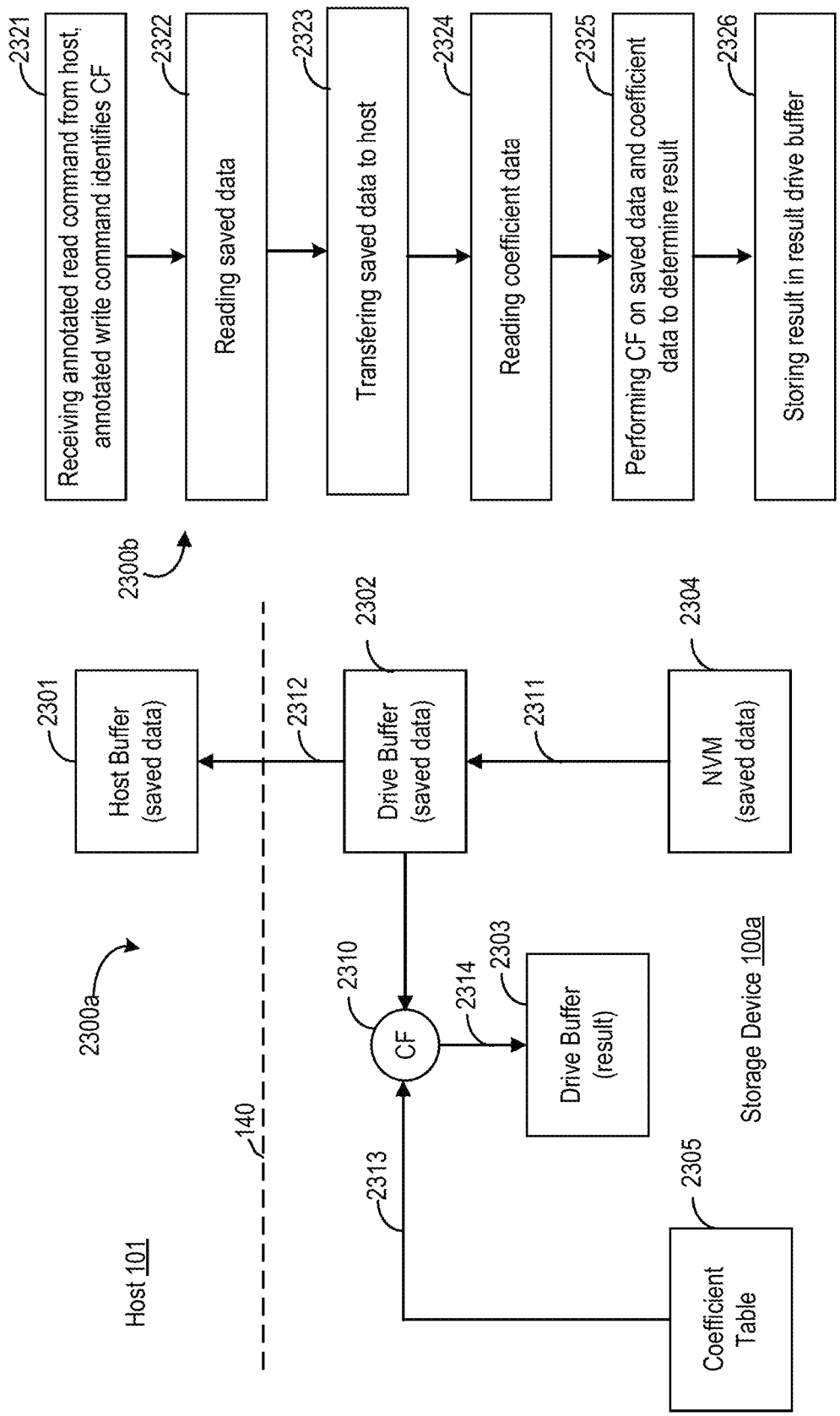

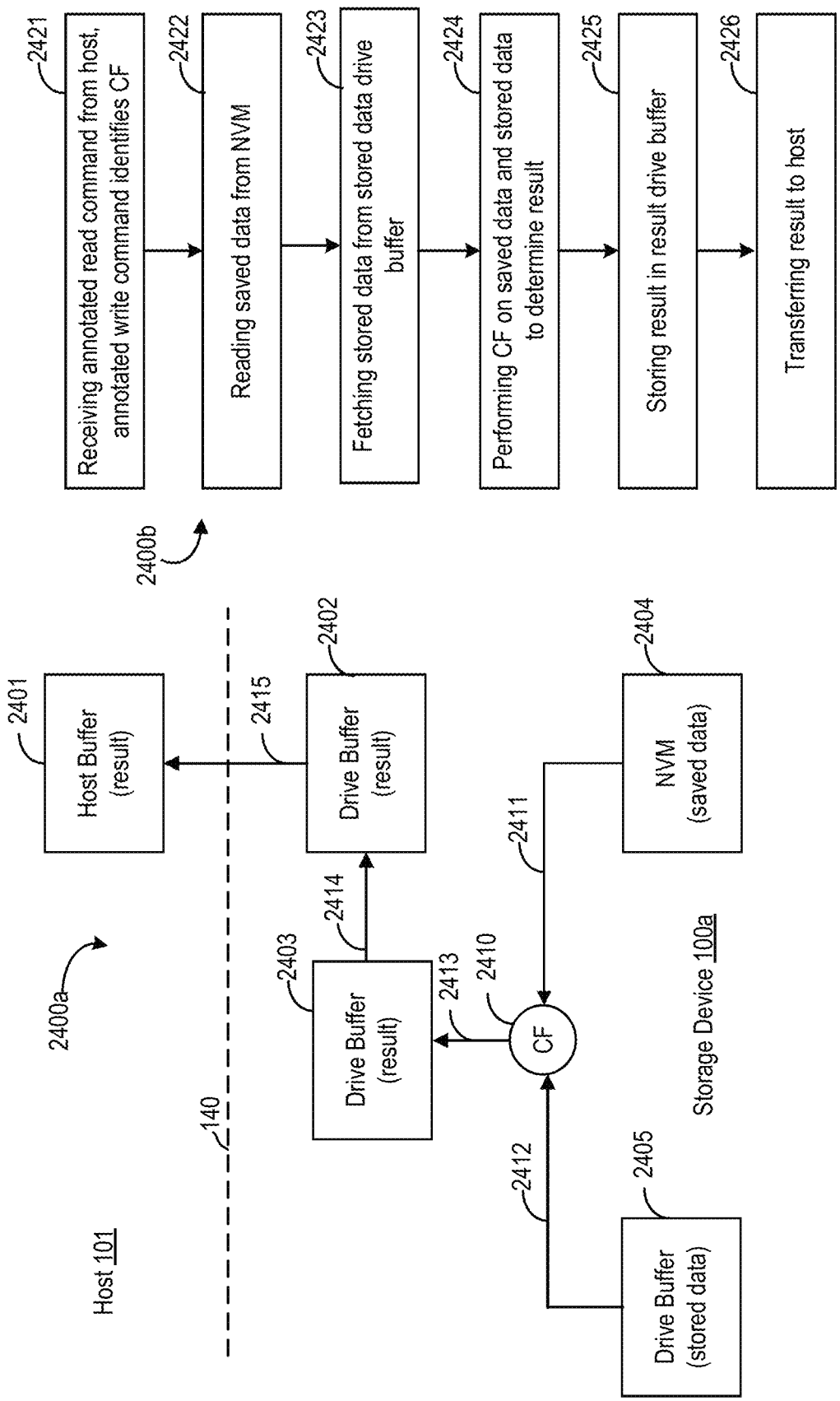

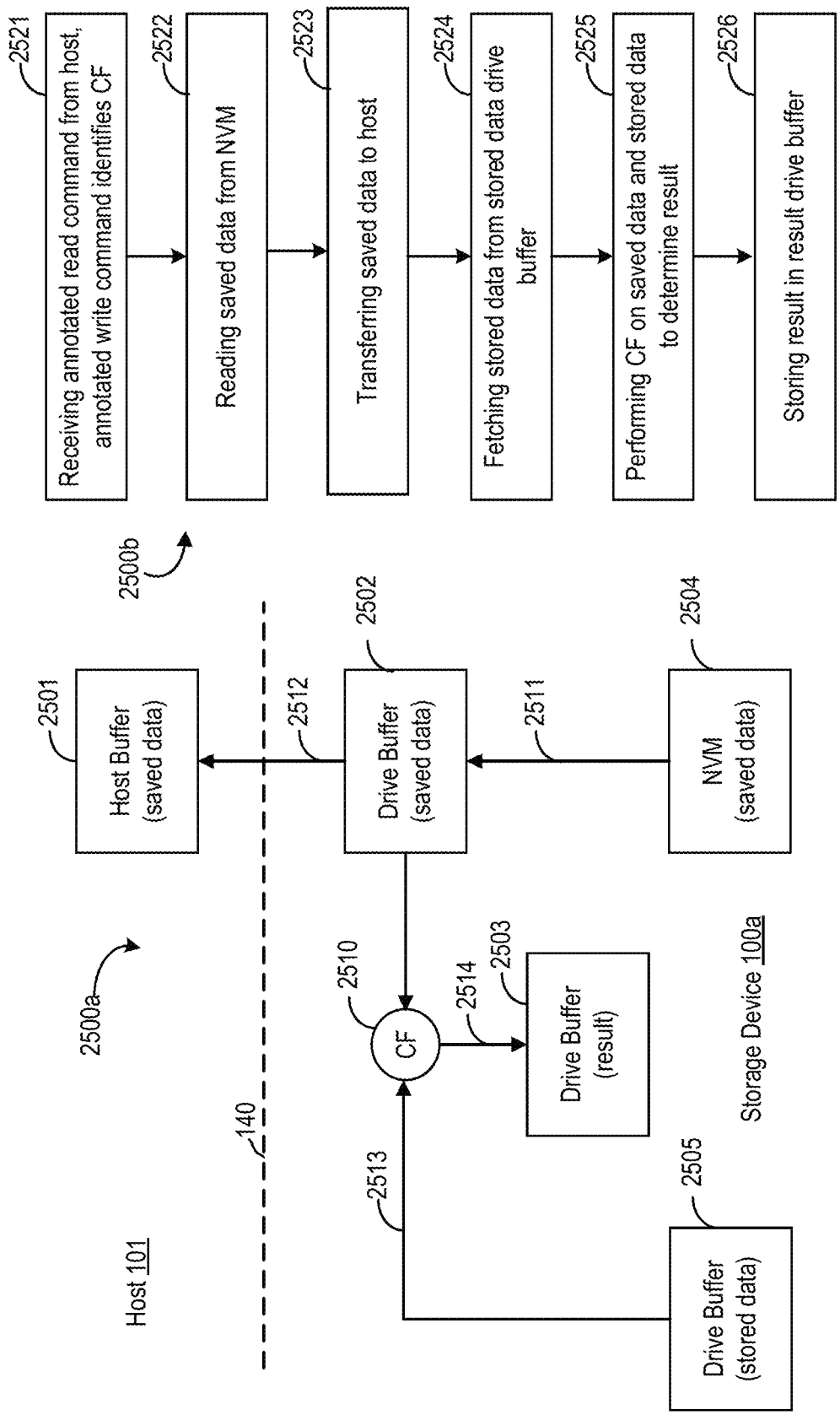

DATA EXCHANGE BETWEEN HOST AND STORAGE DEVICE USING COMPUTE FUNCTIONS

TECHNICAL FIELD

The present disclosure generally relates to systems, methods, and non-transitory processor-readable media for data copy in data storage devices.

BACKGROUND

Since the invention of storage devices, the primary purpose of storage devices has been storing and retrieving data by writing data to and reading data from the storage devices. To communicate with the storage devices, an interface has been defined. The interface typically includes a set of commands (e.g., write data commands, read data commands, and so on) supported both on the host and the storage device. The write data command (also referred to as a "write command") is used to transfer data from a host buffer memory into a buffer memory of the storage device across the interface. The data is then written by the storage device into its storage media. The read data command (also referred to as "write command") is used to read from the storage media of the storage device into a buffer memory of the storage device, and to transfer the data from the buffer memory across the interface into the buffer memory of the host.

SUMMARY

In some arrangements, the present disclosure relate to systems, methods, and non-transitory computer-readable media for copying data in data storage devices, including receiving a command from a host, wherein the command identifies a Compute Function (CF), and in response to receiving the command, performing the CF on at least one of internal data stored in the storage device or external data transferred from the host to determine a computation result.

BRIEF DESCRIPTION OF THE FIGURES

FIGS. 4A, 5A, 6A, 7A, 8A, 9A, 10A, 11A, 12A, 13A, 14A, 15A, 16A, and 17A are block diagrams illustrating example methods for performing CF in write operations, according to some implementations.

FIGS. 4B, 5B, 6B, 7B, 8B, 9B, 10B, 11B, 12B, 13B, 14B, 15B, 16B, and 17B are flowchart diagrams illustrating example methods for performing CF in write operations, according to some implementations.

FIGS. 18A, 19A, 20A, 21A, 22A, 23A, 24A, and 25A are block diagrams illustrating example methods for performing CF in read operations, according to some implementations.

FIGS. 18B, 19B, 20B, 21B, 22B, 23B, 24B, and 25B are flowchart diagrams illustrating example methods for performing CF in read operations, according to some implementations.

DETAILED DESCRIPTION

Figure 1:
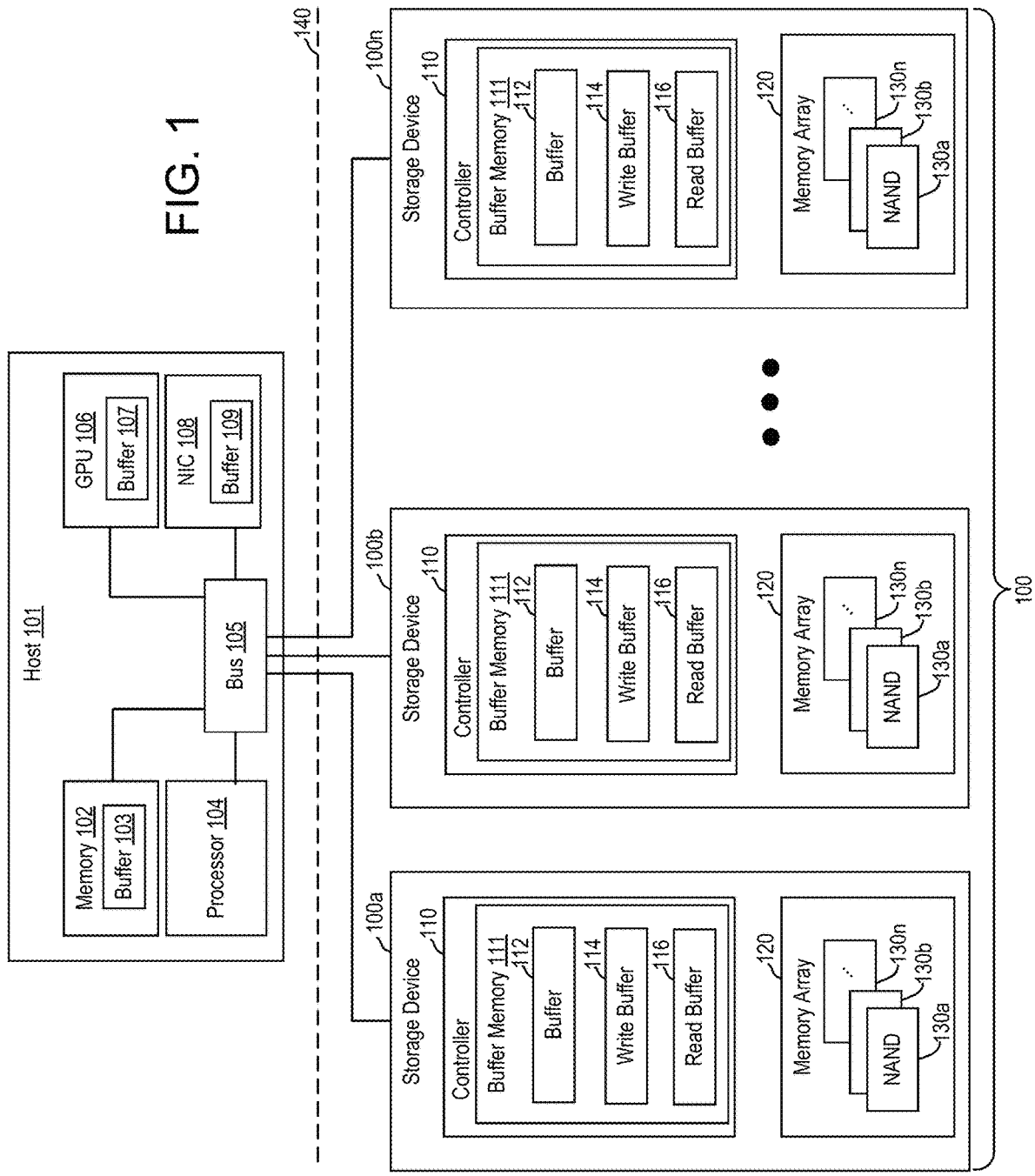
FIG. 1 shows a block diagram of an example system including storage devices and a host, according to some implementations.

The present disclosure relates to systems, methods, and non-transitory computer readable media for efficiently exchanging data between a host and at least one storage device (e.g., a Solid State Drive (SSD)) using CFs (e.g., annotated CFs) on read/write data transfers across a storage interface between the host and the storage device. As used herein, a computational transfer (or "XFER") method (or annotation method) refers to a method by which a data transfer is annotated to call out computation to be performed by the storage device on data before, after, or in parallel with reading the data from or writing the data to the storage device. A computational transfer can be used with respect to data to be written to (in a write operation) and data to be read from (in a read operation) non-volatile memory or volatile memory of the storage device. Annotation is used to increase utilization of Central Processing Units (CPUs) and memory resources of modern storage devices, in order to improve efficiency of Input/Output (I/O) communication between the host and the storage device. In particular, the number of data transfers between the host and the storage device can be reduced, which in turn improves efficiency in performance, reliability, and availability of the storage device while reducing cost, power consumption, and network utilization of the storage device.

In some arrangements, the computational transfer method enables the storage device to leverage its internal resources such as but not limited to, available processing bandwidth, memory capacity, and hardware automation to perform CFs described by the annotation. Examples of the CFs include but are not limited to, arithmetic operations such as add, subtract, multiply, divide, Galois field (GF) math operations; logical operations such as AND, OR, NAND, NOR, NOT (invert), XOR; Boolean (true/false result) operations such as AND, OR, XOR; bitwise operations such as logical shift, arithmetic shift, rotate; compare operations such as greater than, less than, not equal to; string operations like copy, find, compare; database query language functions such as AVG( ), FIRST( ), LAST( ), MAX( ), MIN( ), SUM( ), which may be used in sequence or in combination to perform more complex computation such as data compression, Reed-Solomon or Erasure coding, search, replace (if different), data encryption, database table manipulations and so on.

A CF described by an annotation is performed in conjunction with or in response to a computational transfer command which provides the framework for unidirectional and bidirectional transfers to/from the host. In other words, in response to receiving a computational transfer command including an annotation and data, the storage device performs the CF and the data referenced by the annotation. As described in further details herein, various types of computational transfer methods can be employed to suit different needs of the storage system and the applications running on the storage system.

To assist in illustrating the present implementations, FIG. 1 shows a block diagram of a system including storage devices 100a, 100b, 100n (collectively, storage devices 100) coupled to a host 101 according to some examples. The host 101 can be a user device operated by a user or an autonomous central controller of the storage devices, where the host 101 and storage devices 100 correspond to a storage subsystem or storage appliance. The host 101 can be connected to a communication network (via a Network Interface Card (NIC) 108) such that other host computers (not shown) may access the storage subsystem or storage appliance via the communication network. Examples of such a storage subsystem or appliance include an All Flash Array (AFA) or a Network Attached Storage (NAS) device. As shown, the host 101 includes a memory 102, a processor 104, a bus 105, a Graphical Processing Unit (GPU) 106, the NIC 108, and so on. The processor 104, memory 102, GPU 106, and NIC 108 are operatively coupled to one another via the bus 105. The processor 104 is sometimes referred to as a Central Processing Unit (CPU) of the host 101, and configured to perform processes of the host 101.

The memory 102 is a local memory of the host 101. In some examples, the memory 102 is or includes one or more buffers (e.g., the buffer 103). In some examples, the memory 102 is a volatile storage. In other examples, the memory 102 is a non-volatile persistent storage. Examples of the memory 102 include but are not limited to, Random Access Memory (RAM), Dynamic Random Access Memory (DRAM), Static RAM (SRAM), Magnetic RAM (MRAM), Phase Change Memory (PCM), and so on.

The bus 105 includes one or more of software, firmware, and hardware that provide an interface through components of the host 101 can communicate. Examples of components include but are not limited to, the processor 104, the NIC 108, internal storage devices, the memory 102, the GPU 106, and so on. In addition, the host 101 (e.g., the processor 104) can communicate with the storage devices 100 using the bus 105. In some examples, the storage devices 100 are directly attached or communicably coupled to the bus 105 over a suitable interface 140. The bus 105 is one or more of a serial, a PCIe bus or network, a PCIe root complex, an internal PCIe switch, and so on.

The processor 104 can execute an Operating System (OS), which provides a filesystem and applications which use the filesystem. The processor 104 can communicate with the storage devices 100 (e.g., a controller 110 of each of the storage devices 100) via a communication link or network. In that regard, the processor 104 can send data to and receive data from one or more of the storage devices 100 using the interface 140 to the communication link or network. The interface 140 allows the software (e.g., the filesystem) running on the processor 104 to communicate with the storage devices 100 (e.g., the controllers 110 thereof) via the bus 105. The storage devices 100 (e.g., the controllers 110 thereof) are operatively coupled to the bus 105 directly via the interface 140. While the interface 140 is conceptually shown as a dashed line between the host 101 and the storage devices 100, the interface 140 can include one or more controllers, one or more physical connectors, one or more data transfer protocols including namespaces, ports, transport mechanism, and connectivity thereof. While the connection between the host 101 and the storage devices 100 is shown as a direct link, in some implementations the link may include a network fabric which may include networking components such as bridges and switches.

To send and receive data, the processor 104 (the software or filesystem run thereon) communicates with the storage devices 100 using a storage data transfer protocol running on the interface 140. Examples of the protocol include but is not limited to, the Serial Attached SCSI (SAS), Serial ATA (SATA), and Non-Volatile Memory Express (NVMe) protocols. In some examples, the interface 140 includes hardware (e.g., controllers) implemented on or operatively coupled to the bus 105, the storage devices 100 (e.g., the controllers 110), or another device operatively coupled to the bus 105 and/or the storage device 100 via one or more suitable networks. The interface 140 and the storage protocol running thereon also includes software and/or firmware executed on such hardware. In some implementations, the storage devices 100 may be SSDs using non-volatile memory and may operate using a memory data transfer protocol running on the interface 140. Examples of a memory data transfer protocol include PCIe (PCI Express) memory read/write, CXL.mem, CXL.cache and CXL.io protocols.

In some examples the processor 104 can communicate, via the bus 105 and the NIC 108, with the communication network. Other host systems (not shown) attached or communicably coupled to the communication network can communicate with the host 101 using a suitable network storage protocol, examples of which include, but are not limited to, NVMe over Fabrics (NVMeoF), iSCSI, Fiber Channel (FC), Network File System (NFS), Server Message Block (SMB), and so on. The NIC 108 allows the software (e.g., the storage protocol or filesystem) running on the processor 104 to communicate with the external hosts attached to the communication network via the bus 105. In this manner, network storage commands may be issued by the external hosts and processed by the processor 104, which can issue storage commands to the storage devices 100 as needed. Data can thus be exchanged between the external hosts and the storage devices 100 via the communication network. In this example, any data exchanged is buffered in the memory 102 of the host 101.

The GPU 106 includes a buffer 107. For example, the buffer 107 can be a volatile or non-volatile memory located on a same hardware (e.g., a same chip) as the other components (e.g., processors) of the GPU 106. In other examples, the buffer 107 can be any suitable memory that buffers data for the GPU 106.

The NIC 108 includes a buffer 109. For example, the buffer 109 can be a volatile or non-volatile memory located on a same hardware (e.g., a same chip) as the other components (e.g., processors) of the NIC 108. In other examples, the buffer 109 can be any suitable memory that buffers data for the NIC 108.

In some examples, the buffers 103, 107, and 109 are referred to as buffers of a component of the host 101 or a host buffer. Each of the buffers 103, 107, and 109 may include one or more buffers connected to the bus 105, and each of those one or more buffers has a corresponding address (e.g., a PCIe address) on the bus 105. While the buffers 103, 107, and 109 are shown as example buffers of the host 101, other buffers of the host 101 can likewise benefit from the disclosed arrangements.

In some examples, the storage devices 100 are located in a datacenter (not shown for brevity). The datacenter may include one or more platforms or rack units, each of which supports one or more storage devices (such as but not limited to, the storage devices 100). In some implementations, the host 101 and storage devices 100 together form a storage node, with the host 101 acting as a node controller. An example of a storage node is a Kioxia Kumoscale storage node. One or more storage nodes within a platform are connected to a Top of Rack (TOR) switch, each storage node connected to the TOR via one or more network connections, such as Ethernet, Fiber Channel or InfiniBand, and can communicate with each other via the TOR switch or another suitable intra-platform communication mechanism. In some implementations, storage devices 100 may be network attached storage devices (e.g. Ethernet SSDs) connected to the TOR switch, with host 101 also connected to the TOR switch and able to communicate with the storage devices 100 via the TOR switch. In some implementations, at least one router may facilitate communications among the storage devices 100 in storage nodes in different platforms, racks, or cabinets via a suitable networking fabric. Examples of the storage devices 100 include non-volatile devices such as but are not limited to, Solid State Drive (SSDs), Ethernet attached SSDs, a Non-Volatile Dual In-line Memory Modules (NVDIMMs), a Universal Flash Storage (UFS), a Secure Digital (SD) devices, and so on.

Each of the storage devices 100 includes at least a controller 110 and a memory array 120. The memory array 120 includes non-volatile memory devices which retain the data written to them after the power to the devices is removed. Other components of the storage devices 100 are not shown for brevity. The memory array 120 includes NAND flash memory devices 130a-130n. Each of the NAND flash memory devices 130a-130n includes one or more individual NAND flash dies, which are NVM capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, non-volatile (battery-backed) DRAM, Magnetic Random Access Memory (MRAM), Phase Change Memory (PCM), Ferro-Electric RAM (FeRAM), and so on. The arrangements described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function logically as a single unit of storage. The controller 110 can include processors, microcontrollers, buffers (e.g., buffer 112, 114, 116), error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 includes suitable processing and memory capabilities for executing functions described herein, among other functions. As described, the controller 110 manages various features for the NAND flash memory devices 130a-130n including but not limited to, I/O handling, reading, writing/programming, erasing, monitoring, logging, error handling, garbage collection, wear leveling, logical to physical address mapping, data protection (encryption/decryption, Cyclic Redundancy Check (CRC)), Error Correction Coding (ECC), data scrambling, and the like. Thus, the controller 110 provides access to the NAND flash memory devices 130a-130n for performing reading and writing of data.

The buffer memory 111 is a memory device local to operatively coupled to the controller 110. For instance, the buffer memory 111 can be an on-chip SRAM memory located on the chip of the controller 110. In some implementations, the buffer memory 111 can be implemented using a memory device of the storage device 110 external to the controller 110. For instance, the buffer memory 111 can be DRAM located on a chip other than the chip of the controller 110. In some implementations, the buffer memory 111 can be implemented using memory devices both internal and external to the controller 110 (e.g., both on and off the chip of the controller 110). For example, the buffer memory 111 can be implemented using both an internal SRAM and an external DRAM, which are transparent/exposed and accessible by other devices via the interface 140, such as the host 101 and other storage devices 100. In this example, the controller 110 includes an internal processor that uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory. As shown, the buffer memory 111 includes the buffer 112, the write buffer 114, and the read buffer 116. In other words, the buffer 112, the write buffer 114, and the read buffer 116 can be implemented using the buffer memory 111. In some implementations, the buffer memory 111 may be in whole or in part implemented using fast access non-volatile memory, such as MRAM or PCM. In such implementations, data stored temporarily in buffer memory which needs to be persisted over a power cycle may be stored in non-volatile memory within buffer memory 111, thus obviating the need to persist such data by copying the data into memory array 120 in the event of a power loss.

The controller 110 includes a buffer 112, which is sometimes referred to as a drive buffer or a Controller Memory Buffer (CMB). Besides being accessible by the controller 110, the buffer 112 is accessible by other devices via the interface 140, such as the host 101 and other ones of the storage devices 100. In that manner, the buffer 112 (e.g., addresses of memory locations within the buffer 112) is exposed across the bus 105 and devices on the bus 105 may issue read and write commands using addresses which correspond to either physical memory locations within the buffer 112 or logical addresses (e.g., Logical Block Address (LBAs)) in order to read and write data within the buffer. In some examples, the buffer 112 is a volatile storage. In some examples, the buffer 112 is a non-volatile persistent storage. Examples of the buffer 112 include but are not limited to, RAM, DRAM, SRAM, MRAM, PCM, and so on. The buffer 112 may refer to multiple buffers each configured to store data of a different type, as described herein.

In some implementations, as shown in FIG. 1, the buffer 112 is a local memory of the controller 110. For instance, the buffer 112 can be an on-chip SRAM memory located on the chip of the controller 110. In some implementations, the buffer 112 can be implemented using a memory device of the storage device 110 external to the controller 110. For instance, the buffer 112 can be DRAM located on a chip other than the chip of the controller 110. In some implementations, the buffer 112 can be implemented using memory devices both internal and external to the controller 110 (e.g., both on and off the chip of the controller 110). For example, the buffer 112 can be implemented using both an internal SRAM and an external DRAM, which are transparent/exposed and accessible by other devices via the interface 140, such as the host 101 and other storage devices 100. In this example, the controller 110 includes an internal processor uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory.

In one example concerning a write operation (without CF), in response to receiving data from the host 101 (via the host interface 140), the controller 110 acknowledges the write commands to the host 101 after writing the data to a write buffer 114. In some implementations the write buffer 114 may be implemented in a separate, different memory than the buffer 112, or the write buffer 114 may be a defined area or part of the memory including buffer 112, where only the CMB part of the memory is accessible by other devices, but not the write buffer 114. The controller 110 can write the data stored in the write buffer 114 to the memory array 120 (e.g., the NAND flash memory devices 130a-130n). Once writing the data to physical addresses of the memory array 120 is complete, the FTL updates mapping between logical addresses (e.g., LBAs) used by the host 101 to associate with the data and the physical addresses used by the controller 110 to identify the physical locations of the data.

In another example concerning a read operation, the controller 110 includes another buffer 116 (e.g., a read buffer) different from the buffer 112 and the buffer 114 to store data read from the memory array 120. In some implementations the read buffer 116 may be implemented in a separate, different memory than the buffer 112, or the read buffer 116 may be a defined area or part of the memory including buffer 112, where only the CMB part of the memory is accessible by other devices, but not the read buffer 116.

While non-volatile memory devices (e.g., the NAND flash memory devices 130a-130n) are presented as examples herein, the disclosed schemes can be implemented on any storage system or device that is connected to the host 101 over an interface, where such system temporarily or permanently stores data for the host 101 for later retrieval.

While the storage devices 100 are shown and described as separate physical devices, the arrangements disclosed herein are likewise applicable to storage devices 100 that are virtualized. For instance, the controller 110 and the memory array 120 of each of the storage devices 100 can be virtualized from hardware components such as processors and memories.

In some arrangements, the host 101 can send a read command or a write command across the interface 140 to one of the storage devices 100 (e.g., the storage device 100a), where such read command or write command specifies or otherwise identifies a CF to be performed by the storage device 100a. In one example, such read command or write command can be an NVMe read command or write command suitably modified to specify or otherwise identify a CF to be performed. In one example, such modified NVMe read command or write command can use input/output parameters that are based on definitions for a 128-bit Data Pointer Register (DPTR) and 64-bit starting LBA (SLBA) to refer to memory operands for the CF operation. DPTR is a pointer to a memory buffer of the host 101 or to a Scatter Gather List (SGL) of memory descriptors of the host 101.

An example expression for a CF operation can be expressed as:

StatusResult=CF(Operand1,Operand2,OpNLB1, OpNLB2,OTYPE,ComFun)

where StatusResult is the status of the completion result (e.g. Success/Failure) of the CF operation, which is different from the computation result described herein. Operand1 and Operand2 act as input parameters to the computation and the computation result of the computation is written to either Operand1 or Operand2, depending on the type of CF. Thus, for a CF with a type of 'write', the computation result is written to Operand2, such that Operand2 acts as both an input and an output parameter (i.e. an input/output parameter or I/O parameter). For a CF with a type of 'read', the computation result is returned or written to Operand1, such that Operand1 acts as both an input and an output parameter (i.e. an input/output parameter or I/O parameter). In some examples (e.g., FIG. 4A), a flag in OTYPE may indicate that Operand2 may be ignored as an input parameter, such that the CF only operates on Operand1. In some examples (e.g., FIG. 18A), a flag in OTYPE may indicate that Operand1 may be ignored as an input parameter, such that the CF only operates on Operand2. Operand1 may be of two types of address, referring to either: (1) one or more physical memory buffer address locations of a device connected to the storage device 100a via the interface 140 and/or the bus 105; or (2) a logical address of a location in the non-volatile memory (e.g., the memory array 120) of the storage device 100a, or so on. The address type of Operand1 is dependent on the value of OTYPE. OTYPE is parameter with one or more flags having values indicative of the type of address of Operand1 (whether a physical memory buffer address, logical address, or so on). In some examples, OTYPE may also indicate that the output parameter is a temporary buffer. The types of address of Operand1 include but are not limited to, a logical address of a location in the non-volatile memory of the storage device 100, an address of a buffer of a device connected to the storage device 100a via the interface 140 and/or the bus 105, or so on. Examples of the buffer of a device connected to the storage device 100a via the interface 140 and/or the bus 105 include but are not limited to, a buffer location in the host 101, a buffer location in the storage devices 100b-100n, and so on. Examples of the a buffer location in the host 101 include but are not limited to, a location in the buffer 103 of the memory 102, a location in the buffer 107 of the GPU 106, a location in the buffer 109 of the NIC 108, and so on. Examples of the buffer location in the storage devices 100b-100n include but are not limited to, a location in the buffers 112 of the storage devices 100b-100n. The address of buffer of the device connected to the storage device 100a via the interface 140 and/or the bus 105 can be an address (e.g., a PCIe address) on the bus 105, as described.

OpNLB1 defines a number of logical blocks from the location(s) indicated by Operand1 that are involved in the CF. Operand2 is a logical address of the first logical block of an area of memory in the in the non-volatile memory (e.g., the memory array 120) of the storage device 100a. In some cases, Operand1 and Operand2 may refer to different logical block addresses within the non-volatile memory (e.g., the memory array 120) of the storage device 100a and while both Operand1 and Operand2 are input parameters, one of Operand1 or Operand2 may be both an input and an output parameter, or I/O parameter. This enables a computation to be performed on two data operands located in the memory array 120, while the computation result of the computation is stored back into the memory array 120 and overwrites one of the input operands. In this way, a computation may be performed on data in the memory array 120 and the computation result stored in the memory array 120, without any data being required to be transferred to the storage device 100 from the host 101 or returned from the storage device 100 to the host 101, thereby saving in time and bandwidth utilization on the bus 105. OpNLB2 defines a number of logical blocks from the logical block indicated by Operand2 that are involved in the CF. ComFun is a parameter which defines what compute function is to be used for the CF operation. For example, it may be a unique identifier which is associated with a particular compute function. The association may be pre-defined by a published standard specification, so that both host 101 and storage device 100a have a common understanding of what compute function is associated with a particular identifier. In some implementations, the storage device 100a may define its own proprietary associations and the host may discover what compute functions are supported by the device by issuing a query command to the controller 110, which responds with a list of supported compute functions. An example of a query command is the Identify Controller command in the NVMe protocol.

In other words, in the CF operation shown in expression (1), in some cases, Operand1 and OpNLB1 are used to define data located in a physical memory buffer addressable on the bus 105. In other cases, Operand1 and OpNLB1 can also be used to define the logical address of data located in the non-volatile memory (e.g., the memory array 120) of the storage device 100a. In the CF operation shown in expression (1), Operand2 and OpNLB2 are used to define data located in the non-volatile memory (e.g., the memory array 120) of the storage device 100a. In some implementations, the roles of Operand1, OpNLB1 and Operand2, OpNLB1 may be interchanged, such that Operand2 and OpNLB2 are used to define data located in a physical memory buffer addressable on the bus 105 and Operand1 and OpNLB1 are used to define data located in the non-volatile memory (e.g., the memory array 120) of the storage device 100a.

In some examples, a write with CF includes writing the computation result of the CF to the logical address of the storage device 100a that is identified by Operand2, similar to executing a write command in which data is written to the location defined by the SLBA parameter. This enables the result of the computation to be stored in memory array 120 as well as using the data currently stored in that location as an input operand to the computation, since Operand2 in a write with CF acts as an I/O parameter. Accordingly, Operand1 can behave as a combined I/O parameter for write operations.

In some examples in which OTYPE specifies that Operand1 is an address of a buffer of a device connected to the storage device 100a via the interface 140 and/or the bus 105, a read with CF includes returning the computation result of the CF to the buffer of the device connected to the storage device 100a via the interface 140 and/or the bus 105. In these examples, a read with CF includes writing the computation result of the CF to the logical address indicated by Operand1. As described, the location corresponding to Operand1 can be a location in the buffers 103, 107, and 109 of the host 101 or in the buffer 112s of the storage devices 100a-100n. Thus, in a read with CF, the computation result of the computation can be written either in a buffer in the host 101 or the controller buffer memory of the same storage device performing the CF operation, for example to enable the latter to be used to temporarily store the computation result of a computation that will subsequently be used in a further computation, thus saving the time and bus bandwidth utilization when transferring temporary computation result data back to the host 101. In other examples, in a read with CF, the computation result of the computation can be transferred and written to the controller buffer memory of a different storage device 100a-100n to the storage device performing the CF operation, for example to enable the direct transfer of the computation result to another storage device on the same bus 105, without having to be transferred via the host 101 and back again, thus saving the time and bus bandwidth utilization when transferring temporary computation result data to the different storage device via the host 101 and back again. In other examples in which OTYPE specifies that Operand1 is a logical address, a read with CF includes writing the computation result of the CF to the logical address on the memory array 120 of the storage device 100a. Accordingly, Operand1 can behave as a combined I/O parameter for read operations.

In some examples, a single CF operation can perform the function of either a 'read with CF' operation or a 'write with CF' operation by including a flag in OTYPE specifying whether the computation result of the CF is to be written to the address specified by Operand1 or Operand2. Thus, a single CF operation can perform the equivalent of a 'read with CF' operation by specifying a flag indicating that Operand1 is the output parameter. Similarly, a single CF operation can perform the equivalent of a 'write with CF' operation by specifying a flag indicating that Operand2 is the output parameter. In some examples, in read or write commands that specify the CF to be performed by the storage device 100a, two parameters (e.g., OpNLB1 and OpNLB2) can be used to define the number of logical blocks, as shown in expression (1). In some arrangements, OpNLB1 and OpNLB2 may be the same for certain CFs that involve a same number of logical blocks referenced in Operand1 and referenced in Operand2.

Figure 2:
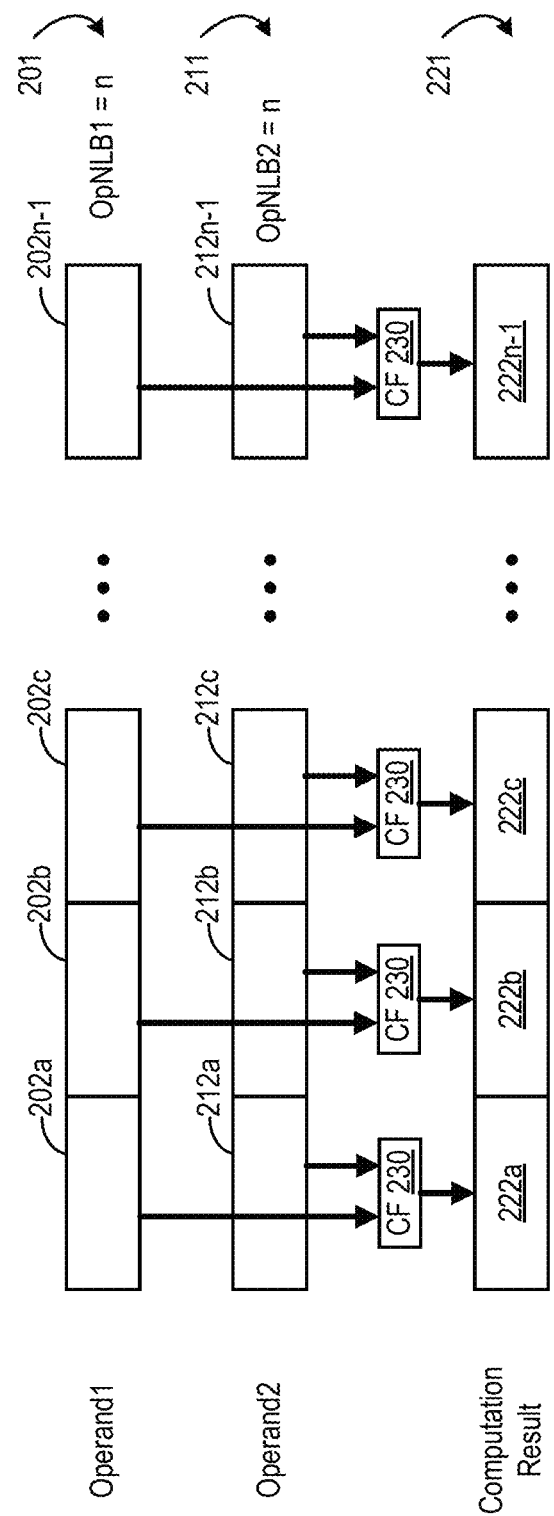
FIG. 2 shows a schematic diagram of a Compute Function (CF) involving data having a same number of logical blocks, according to some implementations.

In that regard, FIG. 2 shows a schematic diagram of a CF 230 involving data 201 and 211 that have a same number of logical blocks n, according to some implementations. Referring to FIGS. 1 and 2, the type of CF 230 (e.g., XOR, ADD, or so on) to be performed by the storage device 100a, Operand1, Operand2, OpNLB1, and OpNLB2 are specified in a read command or a write command received by the storage device 100a from the host 101. As shown, Operand1 specifies one or more memory buffer location for first data 201 while OpNLB1 defines the number of logical blocks (e.g., n) for the first data 201. In other words, the first data 201 includes n logical blocks, 202a, 202b, 202c, . . . , 202n−1. Operand2 specifies the logical address of the first logical block of an area of memory in the in the non-volatile memory (e.g., the memory array 120) of the storage device 100a for second data 211 while OpNLB2 defines the number of logical blocks (e.g., n) for the second data 211. In other words, the second data 211 includes n logical blocks, 212a, 212b, 212c, . . . , 212n−1.

The storage device 100a (e.g., the controller 110 thereof) can perform the CF 230 on the first data 201 and second data 211 to determine the computation result 221. As shown, a first logical block 202a of the first data 201 and a corresponding first logical block 212a of the second data 211 are inputted into the CF 230 to determine a first logical block 222a of the computation result 221, A second logical block 202b of the first data 201 and a corresponding second logical block 212b of the second data 211 are inputted into the CF 230 to determine a second logical block 222b of the computation result 221, a third logical block 202c of the first data 201 and a corresponding third logical block 212c of the second data 211 are inputted into the CF 230 to determine a third logical block 222c of the computation result 221 . . . , and a last logical block 202n−1 of the first data 201 and a corresponding last logical block 212n−1 of the second data 211 are inputted into the CF 230 to determine a last logical block 222n-1 of the computation result 221. Examples of the CF 230 include but are not limited to, XOR, ADD, or so on, where each logical block of the first data 201 is added or XORed with a corresponding logical block of the second data 211.

Accordingly, FIG. 2 shows that the logical blocks identified by Operand1 and corresponding logical blocks identified by Operand2 are added or XORed together by the storage device 100a, and the computation result 221 is stored in a buffer identified by either Operand1 or Operand2. In this case, OpNLB1 and OpNLB2 are the same. In other examples, instead of using two parameters OpNLB1 and OpNLB2, only one parameter needs to be specified by the read command or the write command. In some examples, a flag in OTYPE may indicate whether the numbers OpNLB1 and OpNLB2 are the same.

Figure 3:
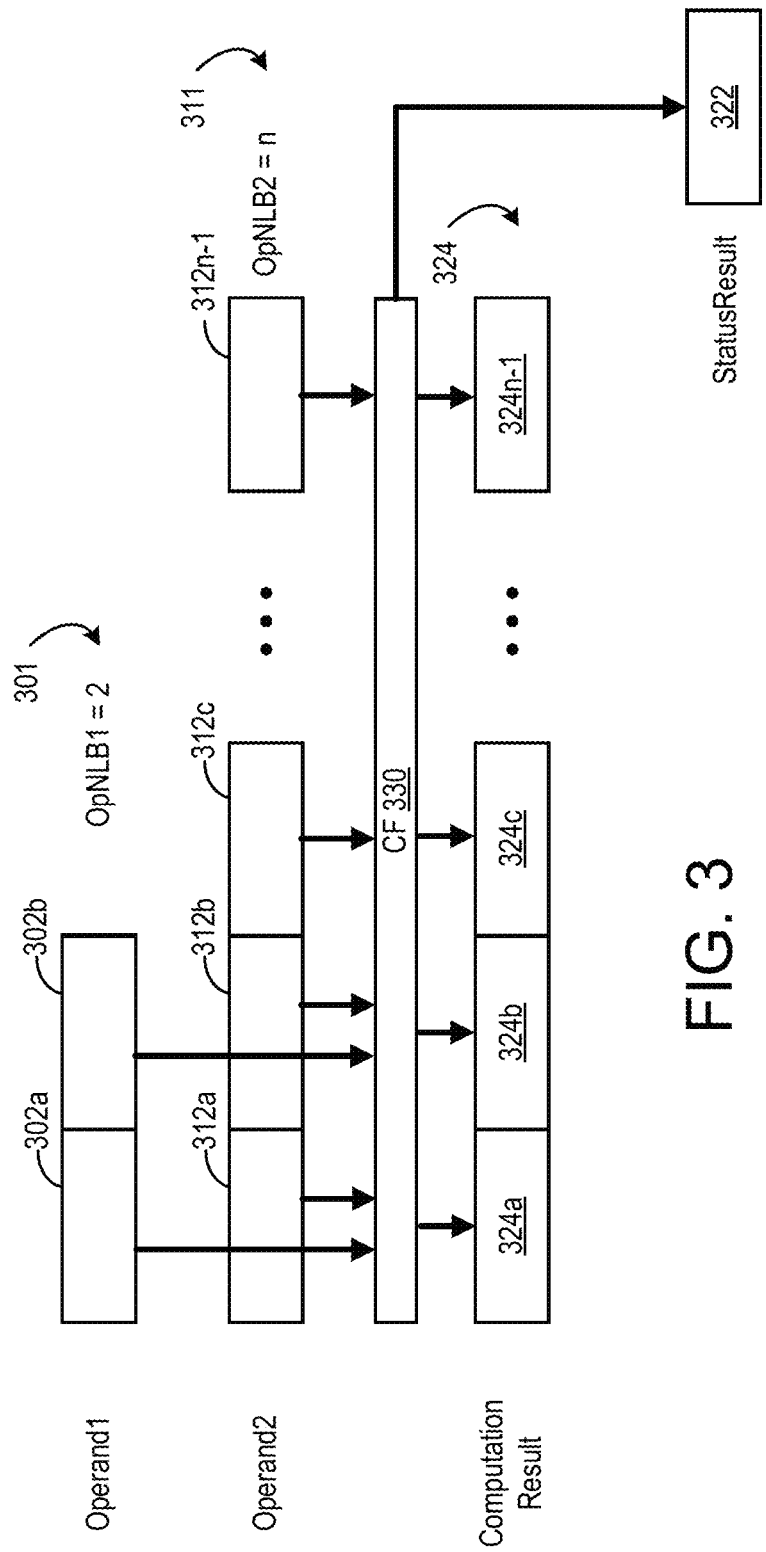
FIG. 3 shows a schematic diagram of a CF involving data having different numbers of logical blocks, according to some implementations.

In some arrangements, the second number of logical blocks (e.g., OpNLB2) can be used for certain CF involving a difference in the number of logical blocks referenced in Operand1 and the number of logical blocks referenced in Operand2. In that regard, FIG. 3 shows a schematic diagram of a CF 330 involving data 301 and 311 that have different numbers of logical blocks, according to some implementations. Referring to FIGS. 1 and 3, the type of CF 330 (e.g., search, XOR, or so on) to be performed by the storage device 100a, Operand1, Operand2, OpNLB1, and OpNLB2 are specified in a read command or a write command received by the storage device 100a from the host 101. As shown, Operand1 specifies one or more memory buffer location for first data 301 while OpNLB1 defines the number of logical blocks (e.g., 2) for the first data 301. In other words, the first data 301 includes 2 logical blocks, 302a and 302b. Operand2 specifies the logical address of the first logical block of an area of memory in the in the non-volatile memory (e.g., the memory array 120) of the storage device 100a for second data 311 while OpNLB2 defines the number of logical blocks (e.g., n) for the second data 311. In other words, the second data 311 includes n logical blocks, 312a, 312b, 312c, . . . , 312n-1.

The storage device 100a (e.g., the controller 110 thereof) can perform the CF 330 on the first data 301 and second data 311 to determine the StatusResult 322. In one example, the CF 330 is a search or find operation that attempts to identify the logical blocks in the second data 311 that matches the first data 301. In particular, the logical blocks 302a and 302b are compared with every consecutive two logical blocks of the logical blocks 312a-312n-1 to determine a match. The StatusResult 322 may indicate the result of the CF 330, e.g., found or not found, and includes the logical addresses of two consecutive ones of the logical blocks 312a-312n-1 that match the logical blocks 302a and 302b, if a match is found. For the search or find operation, no data is written to the compute result 324, and the contents of both Operand1 and Operand2 are untouched. In some examples, an Operand may be used to indicate some or all of the StatusResult 322. For example, Operand1 contains a string of text to search for and Operand2 contains the data to be searched. The position of where string in Operand1 has been found in Operand2 can be written to Operand1 in a 'read with CF (search)' operation. In other examples, that information may be written to Operand1 when a match is found. In such an example, computation result 324, including logical blocks 324a-324n-1 may not be written such that the original data in Operand2 312a-312n-1 is unchanged by the search operation.

In another example, the CF 330 is an XOR operation in which the logical blocks 302a and 302b are respectively XORed with each group of two consecutive ones of the logical blocks 312a-312n-1. The StatusResult 322 indicates success/failure of the operation, which Computation Result 324 includes n logical blocks 324a-324n-1, each of those logical blocks being the result of a corresponding one of the logical blocks 312a-312n-1 XORed with one of the logical blocks 302a and 302b.

Depending on whether a 'write with CF' or a 'read with CF' operation is being performed and the type of the CF operation (e.g., a search or XOR) of the CF 330, the Computation Result 324a-324n-1 is stored in a buffer identified by either Operand1 or Operand2. In this case, OpNLB1 (2) and OpNLB2 (n) are different. For some CF operations, such as 'search', there may be no Computation Result written to Operand1 or Operand2, but the StatusResult 322 may indicate found/not found in addition to success/failure, where success/failure may indicate a success/failure of reading of data in Operand2 to perform the search operation, and the StatusResult 322 may indicate success (Operand2 data successfully read) and not found, showing that while no error was encountered in reading the operands, the data being searched for (in Operand1) was not found in Operand2.

As described herein, the storage device 100a can perform a CF indicated by a read command (e.g., an annotated read command) or a write command (e.g., an annotated read command). FIGS. 4A-25B illustrate example methods for performing CFs.

FIG. 4A is a block diagram illustrating an example method 400a for performing CF in a write operation, according to some implementations. Referring to FIGS. 1 and 4A, the method 400a can be performed by the host 101 and the storage device 100a. One of the buffer 103, 107, or 109 includes a host buffer (new data) 401. The NVM (result) 404 refers to a memory location in the memory array 120 of the storage device 100a. Each of a drive buffer (new data) 402 and a drive buffer (result) 403 can be the write buffer 114 or the buffer 112. In some examples, the drive buffer (new data) 402 and the drive buffer (result) 403 are a same buffer (e.g., a same write buffer 114 or a same buffer 112) to save on buffer resources. In the method 400a, the controller 110 of the storage device 100a performs a CF 410 on data received from the host 101 and then writes the computation result of the CF 410 to the NVM (result) 404.

In the method 400a, the host 101 submits an annotated write command through the bus 105 and over the interface 140 to the controller 110 of the storage device 100a. The annotated write command includes an annotation or indication that identifies the type of the CF 410 to be performed on the new data stored in the host buffer (new data) 401.

The host 101 presents the host buffer (new data) 401 to the controller 110 to be written. In response, at 411, the controller 110 performs a data transfer to obtain the new data from the host buffer (new data) 401 through the bus 105 across the interface 140, and stores the new data into the drive buffer (new data) 402.

The controller 110 of the storage device 100a performs the CF 410 on the new data in the drive buffer (new data) 402. The input to the CF 410 is the new data in the drive buffer (new data) 402, and the output of the CF 410 is the computation result of the CF 410. At 412, the controller 110 of the storage device 100a stores the computation result of the CF 410 in the drive buffer (result) 403. At 413, the controller 110 of the storage device 100a writes the computation result from the drive buffer (result) 403 into the NVM (result) 404. In some examples, instead of writing the computation result from the drive buffer (result) 403 into the NVM (result) 404, the controller 110 of the storage device 100a can write the computation result from the drive buffer (result) 403 to the buffer 112 of the storage device 100a. In accordance with the sample expression of a CF previously discussed, method 400a corresponds to a write with CF where Operand1 is the location of the host buffer 401, Operand2 is the logical address of the NVM (result) 404 and OTYPE indicates that Operand2 can be ignored as an input parameter and only functions as an output parameter. In other words, the compute function CF 410 only operates on the new data located at Operand1 and writes the computation result to Operand2.

FIG. 4B is a flowchart diagram illustrating an example method 400b for performing CF in a write operation, according to some implementations. Referring to FIGS. 1, 4A, and 4B, the method 400b corresponds to the method 400a. The method 400b can be performed by the controller 110 of the storage device 100a.

At 421, the controller 110 receives an annotated write command from the host 101 operatively coupled to the storage device 100a. The annotated write command identifies the CF 410 to be performed. At 422, in response to receiving the annotated write command, the controller 110 transfers the new data from the host 101 (e.g., from the host buffer (new data) 401) to a drive buffer (e.g., the drive buffer (new data) 402) of the storage device 100a across through the bus 105 and via the interface 140. At 423, the controller 110 performs the CF 410 on the new data to determine the computation result. Transferring the new data from the host 101 at 422 can be performed incrementally based on a transfer unit size. Thus, the CF 410 can be performed incrementally on some of the new data already received in the drive buffer (new data) 402, while remainder of the new data is still being transferred to the drive buffer (new data) 402. Accordingly, the CF 410 can be performed concurrently, on-the-fly, as the new data is being received and as the computation results are being stored to the drive buffer (result) 403. At 424, the controller 110 of the storage device 100a stores the computation result of the CF 410 in a result drive buffer (e.g., the drive buffer (result) 403). At 425, the controller 110 of the storage device 100a writes the computation result to the NVM (result) 404.

FIG. 5A is a block diagram illustrating an example method 500a for performing CF in a write operation, according to some implementations. Referring to FIGS. 1 and 5A, the method 500a can be performed by the host 101 and the storage device 100a. One of the buffer 103, 107, or 109 includes a host buffer (new data) 501. The NVM (new data) 504 refers to a memory location in the memory array 120 of the storage device 100a. Each of a drive buffer (new data) 502 and a drive buffer (result) 503 can be the write buffer 114 or the buffer 112. In some examples, the drive buffer (new data) 502 and the drive buffer (result) 503 are a same buffer (e.g., a same write buffer 114 or a same buffer 112) to save on buffer resources. In the method 500a, the controller 110 of the storage device 100a writes the new data from the host 101 to the NVM (new data) 504 before performing a CF 510 on the data. In other examples, the controller 110 writes the new data from the host 101 to the NVM (new data) 504 while (in parallel or simultaneously with) or after performing the CF 510 on the data. In accordance with the sample expression of a CF previously discussed, method 500a corresponds to a write with CF where Operand1 is the location of the host buffer 501, Operand2 is the logical address of the NVM (new data) 504 and OTYPE indicates that Operand2 can be ignored as an input parameter and Operand2 only functions as an output parameter. In other words, the compute function CF 510 only operates on the new data located at Operand1 and writes the computation result to Operand2.

In the method 500a, the host 101 submits an annotated write command through the bus 105 and over the interface 140 to the controller 110 of the storage device 100a. The annotated write command includes an annotation or indication that identifies the type of the CF 510 to be performed on the new data stored in the host buffer (new data) 501.

The host 101 presents the host buffer (new data) 501 to the controller 110 to be written. In response, at 511, the controller 110 performs a data transfer to obtain the new data from the host buffer (new data) 501 through the bus 105 across the interface 140, and stores the new data into the drive buffer (new data) 502. At 513, the controller 110 of the storage device 100a writes the new data from the drive buffer (new data) 502 into the NVM (new data) 504.

The controller 110 of the storage device 100a performs the CF 510 on the new data in the drive buffer (new data) 502. The input to the CF 510 is the new data in the drive buffer (new data) 502, and the output of the CF 510 is the computation result of the CF 510. In some examples, 513 is performed (e.g., initiated or completed) before the CF 510 is performed. In other examples, 513 is performed while (in parallel or simultaneously with) or after the CF 510 is performed. At 512, the controller 110 of the storage device 100a stores the computation result of the CF 510 in the drive buffer (result) 503.

FIG. 5B is a flowchart diagram illustrating an example method 500b for performing CF in a write operation, according to some implementations. Referring to FIGS. 1, 5A, and 5B, the method 500b corresponds to the method 500a. The method 500b can be performed by the controller 110 of the storage device 100a.

At 521, the controller 110 receives an annotated write command from the host 101 operatively coupled to the storage device 100a. The annotated write command identifies the CF 510 to be performed. At 522, in response to receiving the annotated write command, the controller 110 transfers the new data from the host 101 (e.g., from the host buffer (new data) 501) to a drive buffer (e.g., the drive buffer (new data) 502) of the storage device 100a across through the bus 105 and via the interface 140. At 523, the controller 110 of the storage device 100a writes the new data from the drive buffer to the NVM (result) 504. At 524, the controller 110 performs the CF 510 on the new data to determine the computation result. At 525, the controller 110 of the storage device 100a stores the computation result of the CF 510 in a result drive buffer (e.g., the drive buffer (result) 503).

FIG. 6A is a block diagram illustrating an example method 600a for performing CF in a write operation, according to some implementations. Referring to FIGS. 1 and 6A, the method 600a can be performed by the host 101 and the storage device 100a. One of the buffer 103, 107, or 109 includes a host buffer (new data) 601. The NVM (result) 604 refers to a first memory location in the memory array 120 of the storage device 100a. The NVM (old data) 605 refers to a second memory location in the memory array 120 of the storage device 100a. Each of a drive buffer (new data) 602 and a drive buffer (result) 603 can be the write buffer 114 or the buffer 112. In some examples, the drive buffer (new data) 602 and the drive buffer (result) 603 are a same buffer (e.g., a same write buffer 114 or a same buffer 112) to save on buffer resources. In the method 600a, the controller 110 of the storage device 100a performs a CF 610 on the new data received from the host 101 and the old data stored in the NVM (old data) 605. The new data and the old data have the same logical address. Then, the computation result is written to the NVM (result) 604 to replace the old data. Thus, the memory location (e.g., a physical location) of the NVM (old data) 605 and the memory location (e.g., a physical location) of the NVM (result) 604 correspond to same address, such that the old data at the logical address of NVM (old data) 605 is replaced by the computation result at the same logical address. In accordance with the sample expression of a CF previously discussed, method 600a corresponds to a write with CF where Operand1 is the location of the host buffer 601, Operand2 is the logical address of the NVM (old data) 605 (which is the same address as NVM (result) 604), and OTYPE indicates that logical address in Operand2 functions as both an input parameter and an output parameter and Operand1 functions as an input parameter. In other words, the compute function CF 610 operates on both the new data located at Operand1 and the old data at Operand2 and writes the computation result to Operand2.

In the method 600a, the host 101 submits an annotated write command through the bus 105 and over the interface 140 to the controller 110 of the storage device 100a. The annotated write command includes an annotation or indication that identifies the type of the CF 610 to be performed on the new data stored in the host buffer (new data) 401 and the old data stored in the NVM (old data) 605. The annotated write command identifies the new data using Operand1 (an address on the bus 105 corresponding to host buffer (new data) 601) and OpNLB1 and identifies the logical address of the old data using Operand2 and OpNLB2. The annotated write command can further include a flag that specifies that the computation result of the CF 610 is to be written to the logical address corresponding to Operand2.

The host 101 presents the host buffer (new data) 601 to the controller 110 to be written. In response, at 611, the controller 110 performs a data transfer to obtain the new data from the host buffer (new data) 601 through the bus 105 across the interface 140, and stores the new data into the drive buffer (new data) 602. At 612, the controller 110 of the storage device 100a performs a NAND read into the NVM (old data) 605. In other words, the controller 110 reads the old and existing data corresponding to the logical address (Operand2) in the annotated write command from the memory array 120.

The controller 110 of the storage device 100a performs the CF 610 on the new data in the drive buffer (new data) 602 and the old data read from NVM (old data) 605. The inputs to the CF 610 are the new data in the drive buffer (new data) 602 and the old data read from NVM (old data) 605. The output of the CF 610 is the computation result of the CF 610. At 613, the controller 110 of the storage device 100a stores the computation result of the CF 610 in the drive buffer (result) 603. At 614, the controller 110 of the storage device 100a writes the computation result from the drive buffer (result) 603 into the NVM (result) 604. In other words, at 614, the controller 110 then updates the old data with the computation result by writing the computation result from the drive buffer (result) 603 into the NVM (result) 604. The controller 110 (e.g., the FTL) updates the addressing mapping table to correspond the physical address of the NVM (result) 604 with the logical address (Operand2). The controller 110 marks the physical address of the NVM (old data) 605 for garbage collection.

FIG. 6B is a flowchart diagram illustrating an example method 600b for performing CF in a write operation, according to some implementations. Referring to FIGS. 1, 6A, and 6B, the method 600b corresponds to the method 600a. The method 600b can be performed by the controller 110 of the storage device 100a.

At 621, the controller 110 receives an annotated write command from the host 101 operatively coupled to the storage device 100a. The annotated write command identifies the CF 610 to be performed. At 622, in response to receiving the annotated write command, the controller 110 transfers the new data from the host 101 (e.g., from the host buffer (new data) 601) to a drive buffer (e.g., the drive buffer (new data) 602) of the storage device 100a across through the bus 105 and via the interface 140. At 623, the controller 110 reads the old data from the NVM (old data) 605. At 624, the controller 110 performs the CF 610 on the new data and the old data to determine the computation result. Transferring the new data from the host 101 at 622 and reading the old data can be performed incrementally based on one or more transfer unit sizes. Thus, the CF 610 can be performed incrementally on some of the new data already received in the drive buffer (new data) 602 and on some of the corresponding old data already read from the NVM (old data) 605, while remainder of the new data is still being transferred to the drive buffer (new data) 602 and while the remainder of the old data is still being read. Accordingly, the CF 610 can be performed concurrently, on-the-fly, as the new data is being received, as the old data is being read, and as the computation results are being stored to the drive buffer (result) 603. At 625, the controller 110 of the storage device 100a stores the computation result of the CF 610 in a result drive buffer (e.g., the drive buffer (result) 603). At 626, the controller 110 of the storage device 100a writes the computation result to the NVM (result) 604.

Figures 7A, 7B:
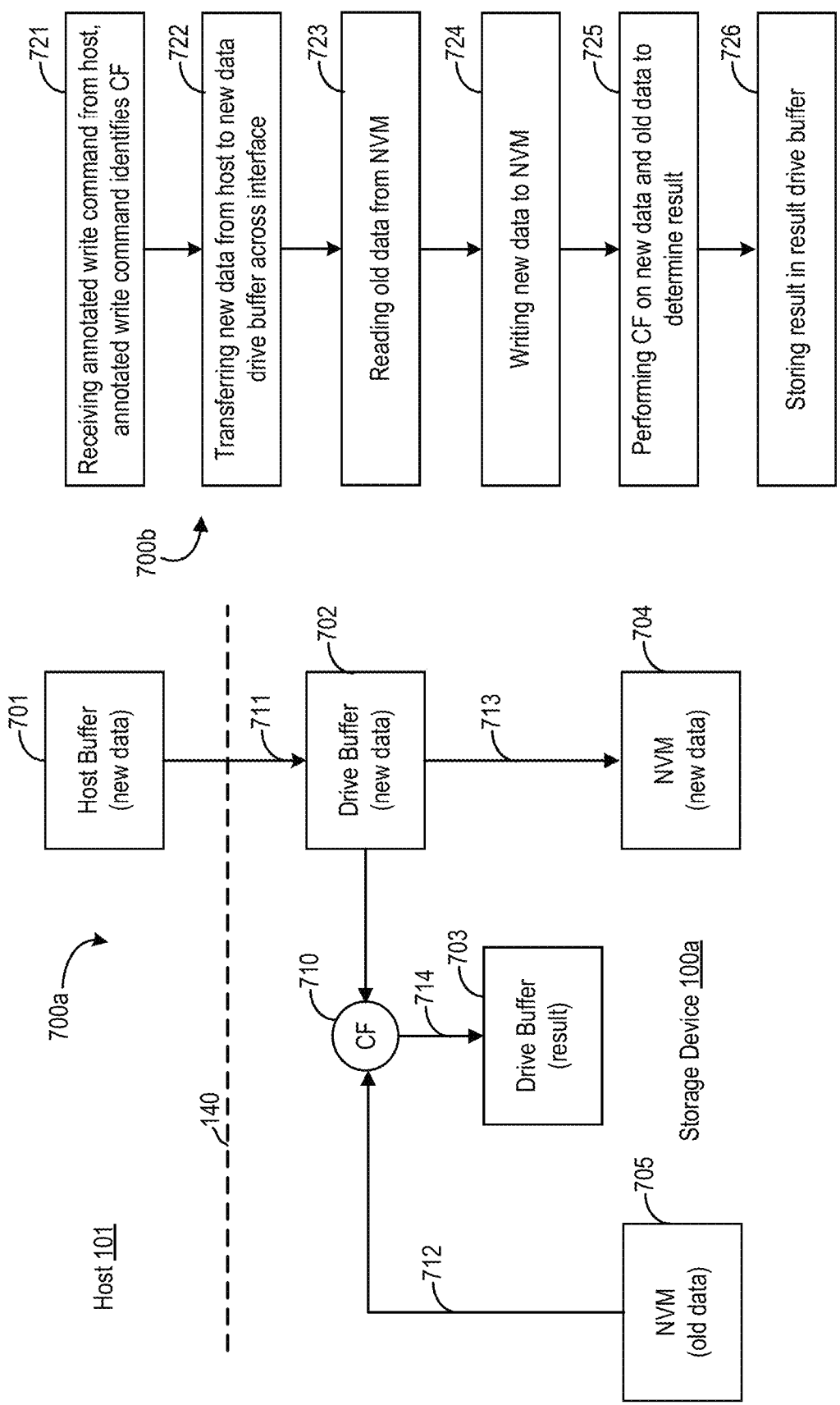

FIG. 7A is a block diagram illustrating an example method 700a for performing CF in a write operation, according to some implementations. Referring to FIGS. 1 and 7A, the method 700a can be performed by the host 101 and the storage device 100a. One of the buffer 103, 107, or 109 includes a host buffer (new data) 701. The NVM (new data) 704 refers to a first memory location in the memory array 120 of the storage device 100a. The NVM (old data) 705 refers to a second memory location in the memory array 120 of the storage device 100a. Each of a drive buffer (new data) 702 and a drive buffer (result) 703 can be the write buffer 114 or the buffer 112. In some examples, the drive buffer (new data) 702 and the drive buffer (result) 703 are a same buffer (e.g., a same write buffer 114 or a same buffer 112) to save on buffer resources. In the method 700a, the controller 110 of the storage device 100a performs a CF 710 on the new data received from the host 101 and the old data stored in the NVM (old data) 705. Before the CF 710 is performed, the new data is written to the NVM (new data) 704 to replace the old data. In other examples, the controller 110 writes the new data from the host 101 to the NVM (new data) 704 while (in parallel or simultaneously with) or after performing the CF 710 on the data. Thus, the memory location (e.g., a physical location) of the NVM (old data) 705 and the memory location (e.g., a physical location) of the NVM (new data) 704 may be different but correspond to the same logical address. In accordance with the sample expression of a CF previously discussed, method 700a corresponds to a write with CF where Operand1 is the location of the host buffer 701, Operand2 is the logical address of the NVM (old data) 705 (which is the same address as NVM (new data) 704), and OTYPE indicates that logical address in Operand2 functions as both an input parameter and an output parameter and Operand1 functions as an input parameter. In other words, the compute function CF 710 operates on both the new data located at Operand1 and the old data at Operand2, then writes drive buffer 702 to the logical address in Operand2 and writes the computation result to a temporary buffer 703, which may be identified by one or more flags in OTYPE.

In the method 700a, the host 101 submits an annotated write command through the bus 105 and over the interface 140 to the controller 110 of the storage device 100a. The annotated write command includes an annotation or indication that identifies the type of the CF 710 to be performed on the new data stored in the host buffer (new data) 701 and the old data stored in the NVM (old data) 705. The annotated write command further includes a logical address.

The host 101 presents the host buffer (new data) 701 to the controller 110 to be written. In response, at 711, the controller 110 performs a data transfer to obtain the new data from the host buffer (new data) 701 through the bus 105 across the interface 140, and stores the new data into the drive buffer (new data) 702. At 712, the controller 110 of the storage device 100a performs a NAND read into the NVM (old data) 705. In other words, the controller 110 reads the old and existing data corresponding to the logical address in the annotated write command from the memory array 120.

At 713, the controller 110 of the storage device 100a writes the new data from the drive buffer (new data) 702 into the NVM (new data) 704. In other words, at 713, the controller 110 then updates the old data with the new data by writing the new data from the drive buffer (new data) 702 into the NVM (new data) 704. The controller 110 (e.g., the FTL) updates the addressing mapping table to correspond the physical address of the NVM (new data) 704 with the logical address. The controller 110 marks the physical address of the NVM (old data) 705 for garbage collection.

After 712, the controller 110 of the storage device 100a performs the CF 710 on the new data in the drive buffer (new data) 702 and the old data read from NVM (old data) 705. The inputs to the CF 710 are the new data in the drive buffer (new data) 702 and the old data read from NVM (old data) 705. The output of the CF 710 is the computation result of the CF 710. At 714, the controller 110 of the storage device 100a stores the computation result of the CF 710 in the drive buffer (result) 703. The host 101 or another one of the storage devices 100 can retrieve the computation result from the drive buffer (result) 703, in the example in which the drive buffer (result) 703 is the buffer 112.

FIG. 7B is a flowchart diagram illustrating an example method 700b for performing CF in a write operation, according to some implementations. Referring to FIGS. 1, 7A, and 7B, the method 700b corresponds to the method 700a. The method 700b can be performed by the controller 110 of the storage device 100a.

At 721, the controller 110 receives an annotated write command from the host 101 operatively coupled to the storage device 100a. The annotated write command identifies the CF 710 to be performed. At 722, in response to receiving the annotated write command, the controller 110 transfers the new data from the host 101 (e.g., from the host buffer (new data) 701) to a drive buffer (e.g., the drive buffer (new data) 702) of the storage device 100a across through the bus 105 and via the interface 140. At 723, the controller 110 reads the old data from the NVM (old data) 705. At 724, the controller 110 of the storage device 100a writes the new data to the NVM (new data) 704. In accordance with the sample expression of a CF previously discussed, method 700a corresponds to a write with CF where Operand1 is the location of the host buffer 701, Operand2 is the logical address of the NVM (old data) 705 (which is the same address as NVM (new data) 704) and OTYPE indicates that logical address in Operand2 functions as both an input parameter and an output parameter and Operand1 functions as an input parameter. In other words, the compute function CF 710 operates on both the new data located at Operand1 and the old data at Operand2, then writes drive buffer 702 to the logical address in Operand2 and writes the computation result to a temporary buffer 703, which may be identified by one or more flags in OTYPE.

At 725, the controller 110 performs the CF 710 on the new data and the old data to determine the computation result. Transferring the new data from the host 101 at 722 and reading the old data at 723 can be performed incrementally based on one or more transfer unit sizes. Thus, the CF 710 can be performed incrementally on some of the new data already received in the drive buffer (new data) 702 and on some of the corresponding old data already read from the NVM (old data) 705, while remainder of the new data is still being transferred to the drive buffer (new data) 702 and while the remainder of the old data is still being read. Accordingly, the CF 710 can be performed concurrently, on-the-fly, as the new data is being received, as the old data is being read, and as the computation results are being stored to the drive buffer (result) 703. At 726, the controller 110 of the storage device 100a stores the computation result of the CF 710 in a result drive buffer (e.g., the drive buffer (result) 703).

As shown in both FIGS. 6A and 7A, the computation result is stored in a buffer e.g., the drive buffer (result) 603 or 704. In FIG. 7A, the CF 710 may be performed after NVM write at 713 while in 6A, the CF 610 is performed before the result can be written to the NVM result 604 at 614. In both cases, the controller 110 allocates at least two buffers with addresses selected by the controller 110 and not specified by the host 101. The first buffer (e.g., 602 or 702) is for receiving new data, and the second buffer (e.g., 603 or 703) for holding the computation result. In addition, while not shown, the old data read from NMV (old data) 605 or 705 is also temporarily stored in a buffer before performing the CF. This buffer can be a third buffer in the storage device 100a, or the same as the second buffer in which chunks of the new data in the second buffer are replaced by the resulting data bytes as they are computed. Thus, in one example, as the CF is in progress, mixed data types of data sitting in the second buffer. When the CF is complete, the second buffer stores only the result data.

The controller 110 can allocated the buffer 603 and 703 with a buffer memory size of OpNLB1 or OpNLB2, or another size (e.g., a location value, 8 bits, 16 bits, 32 bits, and so on) within the LBAs being searched if the CF is a search. In some examples, the buffer 603 or 703 may be referenced in a subsequent CF. In other examples, bits in the flag of OTYPE can correspond to a buffer number of the buffer 603 or 703, where the buffer 603 and 703 is indicated to have a size indicated by OpNLB1 or OpNLB2.

Figures 8A, 8B:
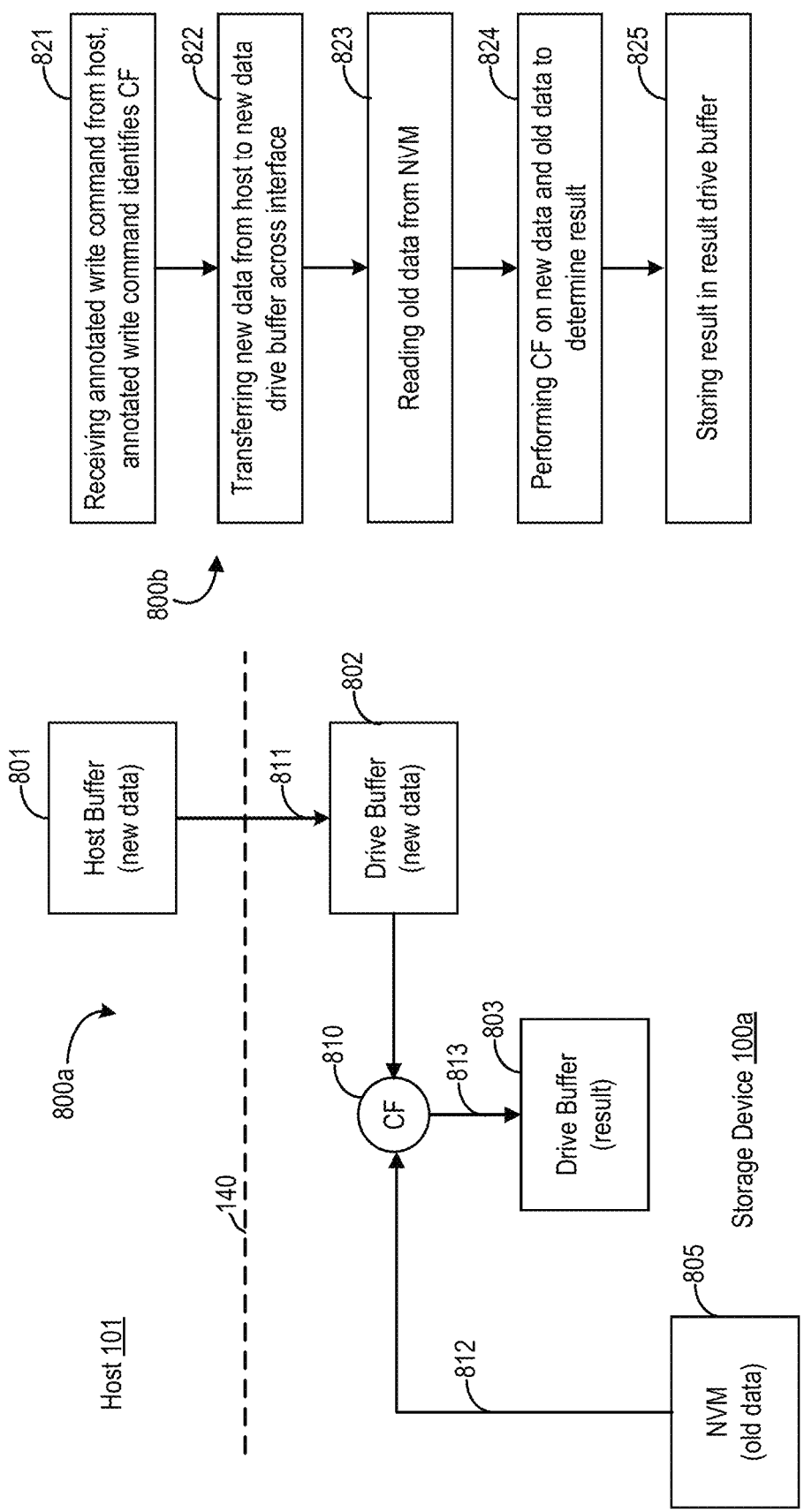

In some arrangements, OTYPE can be used to identify a buffer of the controller 110. In some arrangements, the controller 110 can select a buffer that is implied by the CF itself. In an example, three explicit commands include 1) "begin computation, store temp result size OpNLB2in bufferID1" CF, followed by 2) "continue computation, use bufferID1 to retrieve Operand1 and to Store temp result", . . . <repeat>, and 3) "End computation, use bufferID1 to retrieve Operand1 and store end result in Operand2." The three commands in connection with a CF can be used specifically for performing chained computations and using an internal buffer, the location of which can be chosen by the controller 110. The internal buffer can be referred to by a BufferID=x and size of OpNLB1 or OpNLB2, for example, in the flag of OTYPE, FIG. 8A is a block diagram illustrating an example method 800a for performing CF in a write operation, according to some implementations. Referring to FIGS. 1 and 8A, the method 800a can be performed by the host 101 and the storage device 100a. One of the buffer 103, 107, or 109 includes a host buffer (new data) 801. The NVM (old data) 805 refers to a memory location in the memory array 120 of the storage device 100a. Each of a drive buffer (new data) 802 and a drive buffer (result) 803 can be the write buffer 114 or the buffer 112. In some examples, the drive buffer (new data) 802 and the drive buffer (result) 803 are a same buffer (e.g., a same write buffer 114 or a same buffer 112) to save on buffer resources. In the method 800a, the controller 110 of the storage device 100a performs a CF 810 on the new data received from the host 101 and the old data stored in the NVM (old data) 805. The logical address corresponding to the new data is the same as the logical address corresponding to the old data. Neither the new data nor the computation result of the CF 810 is saved in the NVM (e.g., the memory array 120) of the storage device 100a. In accordance with the sample expression of a CF previously discussed, method 800a corresponds to a write with CF where Operand1 is the location of the host buffer 801, Operand2 is the logical address of the NVM (old data) 805 and OTYPE indicates that logical address in Operand2 functions as an input parameter and Operand1 functions as an input parameter. In other words, the compute function CF 810 operates on both the new data located at Operand1 and the old data at Operand2, then writes the computation result to a temporary buffer 803, which may be identified by one or more flags in OTYPE.

In the method 800a, the host 101 submits an annotated write command through the bus 105 and over the interface 140 to the controller 110 of the storage device 100a. The annotated write command includes an annotation or indication that identifies the type of the CF 810 to be performed on the new data stored in the host buffer (new data) 801 and the old data stored in the NVM (old data) 805. The annotated write command further includes a logical address.

The host 101 presents the host buffer (new data) 801 to the controller 110 to be written. In response, at 811, the controller 110 performs a data transfer to obtain the new data from the host buffer (new data) 801 through the bus 105 across the interface 140, and stores the new data into the drive buffer (new data) 802. At 812, the controller 110 of the storage device 100a performs a NAND read into the NVM (old data) 805. In other words, the controller 110 reads the old and existing data corresponding to the logical address in the annotated write command from the memory array 120.

The controller 110 of the storage device 100a performs the CF 810 on the new data in the drive buffer (new data) 802 and the old data read from NVM (old data) 805. The inputs to the CF 810 are the new data in the drive buffer (new data) 802 and the old data read from NVM (old data) 805. The output of the CF 810 is the computation result of the CF 810. At 813, the controller 110 of the storage device 100a stores the computation result of the CF 810 in the drive buffer (result) 803. The host 101 or another one of the storage devices 100 can retrieve the computation result from the drive buffer (result) 803, in the example in which the drive buffer (result) 803 is the buffer 112. In accordance with the sample expression of a CF previously discussed, method 800a corresponds to a write with CF where Operand1 is the location of the host buffer 801, Operand2 is the logical address of the NVM (old data) 805 and OTYPE indicates that logical address in Operand2 functions as an input parameter and Operand1 functions as an input parameter. In other words, the compute function CF 810 operates on both the new data located at Operand1 and the old data at Operand2, then writes the computation result to a temporary buffer 803, which may be identified by one or more flags in OTYPE.

FIG. 8B is a flowchart diagram illustrating an example method 800b for performing CF in a write operation, according to some implementations. Referring to FIGS. 1, 8A, and 8B, the method 800b corresponds to the method 800a. The method 800b can be performed by the controller 110 of the storage device 100a.

At 821, the controller 110 receives an annotated write command from the host 101 operatively coupled to the storage device 100a. The annotated write command identifies the CF 810 to be performed. At 822, in response to receiving the annotated write command, the controller 110 transfers the new data from the host 101 (e.g., from the host buffer (new data) 801) to a drive buffer (e.g., the drive buffer (new data) 802) of the storage device 100a across through the bus 105 and via the interface 140. At 823, the controller 110 reads the old data from the NVM (old data) 805.

At 824, the controller 110 performs the CF 810 on the new data and the old data to determine the computation result. Transferring the new data from the host 101 at 822 and reading the old data at 823 can be performed incrementally based on one or more transfer unit sizes. Thus, the CF 810 can be performed incrementally on some of the new data already received in the drive buffer (new data) 802 and on some of the corresponding old data already read from the NVM (old data) 805, while remainder of the new data is still being transferred to the drive buffer (new data) 802 and while the remainder of the old data is still being read. Accordingly, the CF 810 can be performed concurrently, on-the-fly, as the new data is being received, as the old data is being read, and as the computation results are being stored to the drive buffer (result) 803. At 825, the controller 110 of the storage device 100a stores the computation result of the CF 810 in a result drive buffer (e.g., the drive buffer (result) 803).

FIG. 9A is a block diagram illustrating an example method 900a for performing CF in a write operation, according to some implementations. Referring to FIGS. 1 and 9A, the method 900a can be performed by the host 101 and the storage device 100a. One of the buffer 103, 107, or 109 includes a host buffer (new data) 901. The NVM (stored data) 905 refers to a memory location in the memory array 120 of the storage device 100a. Each of a drive buffer (new data) 902 and a drive buffer (result) 903 can be the write buffer 114 or the buffer 112. In some examples, the drive buffer (new data) 902 and the drive buffer (result) 903 are a same buffer (e.g., a same write buffer 114 or a same buffer 112) to save on buffer resources. In the method 900a, the controller 110 of the storage device 100a performs a CF 910 on the new data received from the host 101 and the stored data stored in the NVM (stored data) 905. The logical address corresponding to the new data is different from the logical address corresponding to the stored data. Neither the new data nor the computation result of the CF 910 is saved in the NVM (e.g., the memory array 120) of the storage device 100a. In accordance with the sample expression of a CF previously discussed, method 900a corresponds to a write with CF where Operand1 is the location of the host buffer 901, Operand2 is the logical address of the NVM (stored data) 905 and OTYPE indicates that logical address in Operand2 functions as an input parameter and Operand1 functions as an input parameter. In other words, the compute function CF 910 operates on both the new data located at Operand1 and the old data at Operand2, then writes the computation result to a temporary buffer 903, which may be identified by one or more flags in OTYPE.

In the method 900*a*, the host 101 submits an annotated write command through the bus 105 and over the interface 140 to the controller 110 of the storage device 100*a*. The annotated write command includes an annotation or indication that identifies the type of the CF 910 to be performed on the new data stored in the host buffer (new data) 901 and the stored data stored in the NVM (stored data) 905. The annotated write command further includes a logical address for the stored data, which is different from the logical address for the new data in the host buffer (new data) 901.

The host 101 presents the host buffer (new data) 901 to the controller 110 to be written. In response, at 911, the controller 110 performs a data transfer to obtain the new data from the host buffer (new data) 901 through the bus 105 across the interface 140, and stores the new data into the drive buffer (new data) 902. At 912, the controller 110 of the storage device 100*a* performs a NAND read into the NVM (stored data) 905. In other words, the controller 110 reads the stored data corresponding to the logical address in the annotated write command from the memory array 120.

The controller 110 of the storage device 100*a* performs the CF 910 on the new data in the drive buffer (new data) 902 and the stored data read from NVM (stored data) 905. The inputs to the CF 910 are the new data in the drive buffer (new data) 902 and the stored data read from NVM (stored data) 905. The output of the CF 910 is the computation result of the CF 910. At 913, the controller 110 of the storage device 100*a* stores the computation result of the CF 910 in the drive buffer (result) 903. The host 101 or another one of the storage devices 100 can retrieve the computation result from the drive buffer (result) 903, in the example in which the drive buffer (result) 903 is the buffer 112.

FIG. 9B is a flowchart diagram illustrating an example method 900*b* for performing CF in a write operation, according to some implementations. Referring to FIGS. 1, 9A, and 9B, the method 900*b* corresponds to the method 900*a*. The method 900*b* can be performed by the controller 110 of the storage device 100*a*.

At 921, the controller 110 receives an annotated write command from the host 101 operatively coupled to the storage device 100*a*. The annotated write command identifies the CF 910 to be performed and the logical address of the stored data. At 922, in response to receiving the annotated write command, the controller 110 transfers the new data from the host 101 (e.g., from the host buffer (new data) 901) to a drive buffer (e.g., the drive buffer (new data) 902) of the storage device 100*a* across through the bus 105 and via the interface 140. At 923, the controller 110 reads the stored data from the NVM (stored data) 905. As described, the stored data and the new data have different logical addresses.

At 924, the controller 110 performs the CF 910 on the new data and the stored data to determine the computation result. Transferring the new data from the host 101 at 922 and reading the stored data at 923 can be performed incrementally based on one or more transfer unit sizes. Thus, the CF 910 can be performed incrementally on some of the new data already received in the drive buffer (new data) 902 and on some of the corresponding stored data already read from the NVM (stored data) 905, while remainder of the new data is still being transferred to the drive buffer (new data) 902 and while the remainder of the stored data is still being read. Accordingly, the CF 910 can be performed concurrently, on-the-fly, as the new data is being received, as the stored data is being read, and as the computation results are being stored to the drive buffer (result) 903. At 925, the controller 110 of the storage device 100*a* stores the computation result of the CF 910 in a result drive buffer (e.g., the drive buffer (result) 903).

Figures 10A, 10B:
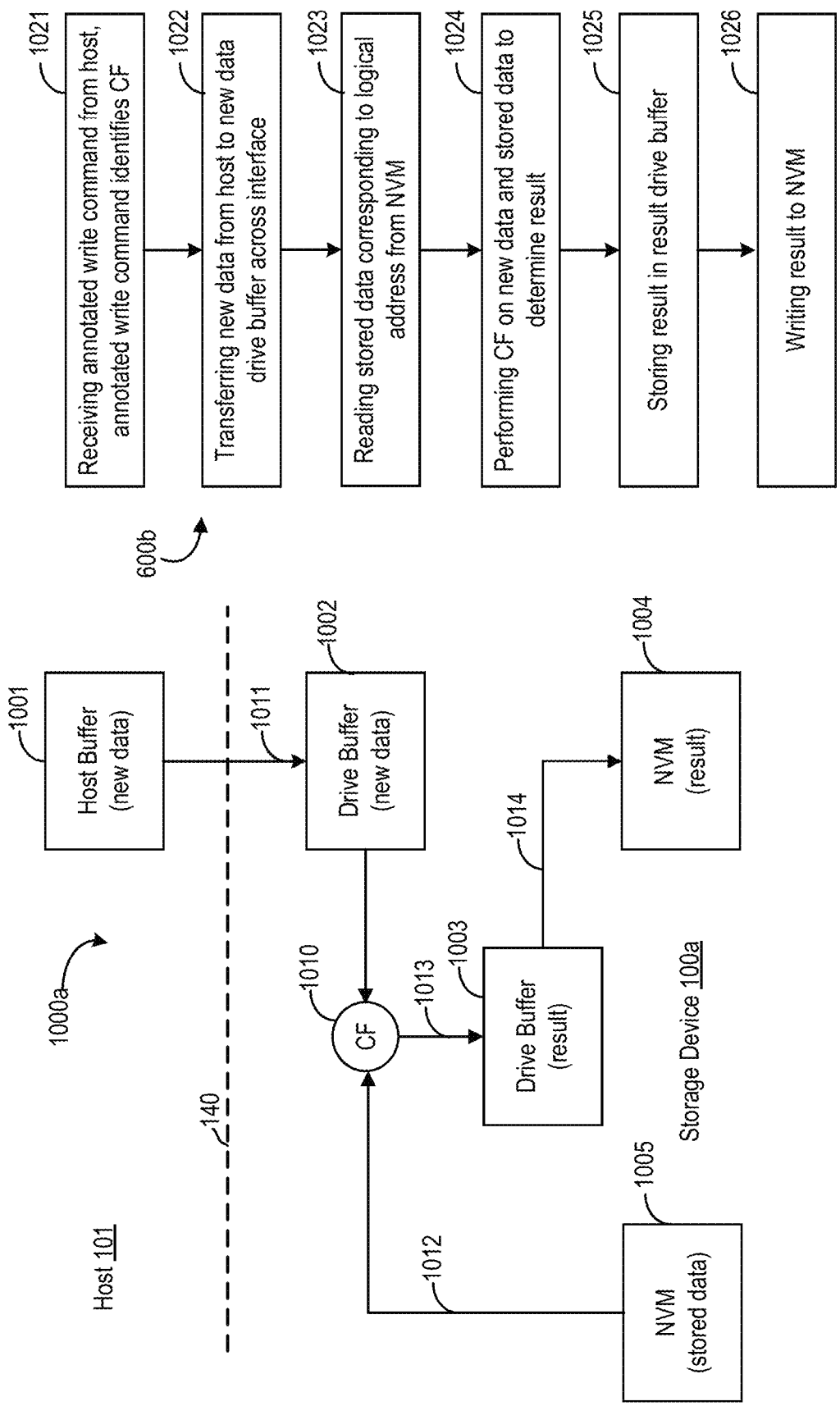

FIG. 10A is a block diagram illustrating an example method 1000*a* for performing CF in a write operation, according to some implementations. Referring to FIGS. 1 and 10A, the method 1000*a* can be performed by the host 101 and the storage device 100*a*. One of the buffer 103, 107, or 109 includes a host buffer (new data) 1001. The NVM (stored data) 1005 refers to a memory location in the memory array 120 of the storage device 100*a*. The NVM (result) 1004 refers to another memory location in the memory array 120 of the storage device 100*a*. Each of a drive buffer (new data) 1002 and a drive buffer (result) 1003 can be the write buffer 114 or the buffer 112. In some examples, the drive buffer (new data) 1002 and the drive buffer (result) 1003 are a same buffer (e.g., a same write buffer 114 or a same buffer 112) to save on buffer resources. In the method 1000*a*, the controller 110 of the storage device 100*a* performs a CF 1010 on the new data received from the host 101 and the stored data stored in the NVM (stored data) 1005. The logical address corresponding to the new data is different from the logical address corresponding to the stored data. The computation result of the CF 1010 is saved in the NVM (e.g., the memory array 120) of the storage device 100*a* at an address specified by the annotated write command.

In the method 1000*a*, the host 101 submits an annotated write command through the bus 105 and over the interface 140 to the controller 110 of the storage device 100*a*. The annotated write command includes an annotation or indication that identifies the type of the CF 1010 to be performed on the new data stored in the host buffer (new data) 1001 and the stored data stored in the NVM (stored data) 1005. The annotated write command identifies the new data using Operand1 (an address on the bus 105 corresponding to host buffer (new data) 1001) and OpNLB1 and identifies the logical address of the stored data using Operand2 and OpNLB2. The annotated write command can further include a flag that specifies that the computation result of the CF 1010 is to be written to the logical address corresponding to Operand1, the logical address corresponding to Operand2, or another logical address specified by the annotated write command.

The host 101 presents the host buffer (new data) 1001 to the controller 110 to be written. In response, at 1011, the controller 110 performs a data transfer to obtain the new data from the host buffer (new data) 1001 through the bus 105 across the interface 140, and stores the new data into the drive buffer (new data) 1002. At 1012, the controller 110 of the storage device 100*a* performs a NAND read into the NVM (stored data) 1005. In other words, the controller 110 reads the stored data corresponding to the specified logical address (Operand2 and OpNLB2) in the annotated write command from the memory array 120.

The controller 110 of the storage device 100*a* performs the CF 1010 on the new data in the drive buffer (new data) 1002 and the stored data read from NVM (stored data) 1005. The inputs to the CF 1010 are the new data in the drive buffer (new data) 1002 and the stored data read from NVM (stored data) 1005. The output of the CF 1010 is the computation result of the CF 1010. At 1013, the controller 110 of the storage device 100a stores the computation result of the CF 1010 in the drive buffer (result) 1003.

At 1014, the controller 110 of the storage device 100a writes the computation result from the drive buffer (result) 1003 into the NVM (result) 1004. In the example in which the annotated write command specifies that the computation result is to be written to the logical address of the new data, at 1014, the controller 110 (e.g., the FTL) updates the addressing mapping table to correspond the physical address of the NVM (result) 1004 with the logical address of the new data (Operand1). In the example in which the annotated write command specifies that the computation result is to be written to the logical address of the stored data, at 1014, the controller 110 (e.g., the FTL) updates the addressing mapping table to correspond the physical address of the NVM (result) 1004 with the logical address of the stored data (Operand2). In the example in which the annotated write command specifies that the computation result is to be written to another logical address, at 1014, the controller 110 (e.g., the FTL) updates the addressing mapping table to correspond the physical address of the NVM (result) 1004 with that logical address. The controller 110 marks any outdated physical address for garbage collection.

FIG. 10B is a flowchart diagram illustrating an example method 1000b for performing CF in a write operation, according to some implementations. Referring to FIGS. 1, 10A, and 10B, the method 1000b corresponds to the method 1000a. The method 1000b can be performed by the controller 110 of the storage device 100a.

At 1021, the controller 110 receives an annotated write command from the host 101 operatively coupled to the storage device 100a. The annotated write command identifies the CF 1010 to be performed, the logical address of the stored data, as well as the logical address to which the computation result of the CF 1010 is to be stored. At 1022, in response to receiving the annotated write command, the controller 110 transfers the new data from the host 101 (e.g., from the host buffer (new data) 1001) to a drive buffer (e.g., the drive buffer (new data) 1002) of the storage device 100a across through the bus 105 and via the interface 140. At 1023, the controller 110 reads the stored data from the NVM (stored data) 1005. As described, the stored data and the new data have different logical addresses.

At 1024, the controller 110 performs the CF 1010 on the new data and the stored data to determine the computation result. Transferring the new data from the host 101 at 1022 and reading the stored data at 1023 can be performed incrementally based on one or more transfer unit sizes. Thus, the CF 1010 can be performed incrementally on some of the new data already received in the drive buffer (new data) 1002 and on some of the corresponding stored data already read from the NVM (stored data) 1005, while remainder of the new data is still being transferred to the drive buffer (new data) 1002 and while the remainder of the stored data is still being read. Accordingly, the CF 1010 can be performed concurrently, on-the-fly, as the new data is being received, as the stored data is being read, and as the computation results are being stored to the drive buffer (result) 1003. At 1025, the controller 110 of the storage device 100a stores the result of the CF 1010 in a result drive buffer (e.g., the drive buffer (result) 1003). At 1026, the controller 110 of the storage device 100a writes the computation result from the result drive buffer to the NVM (result) 1004.

Figure 11B:
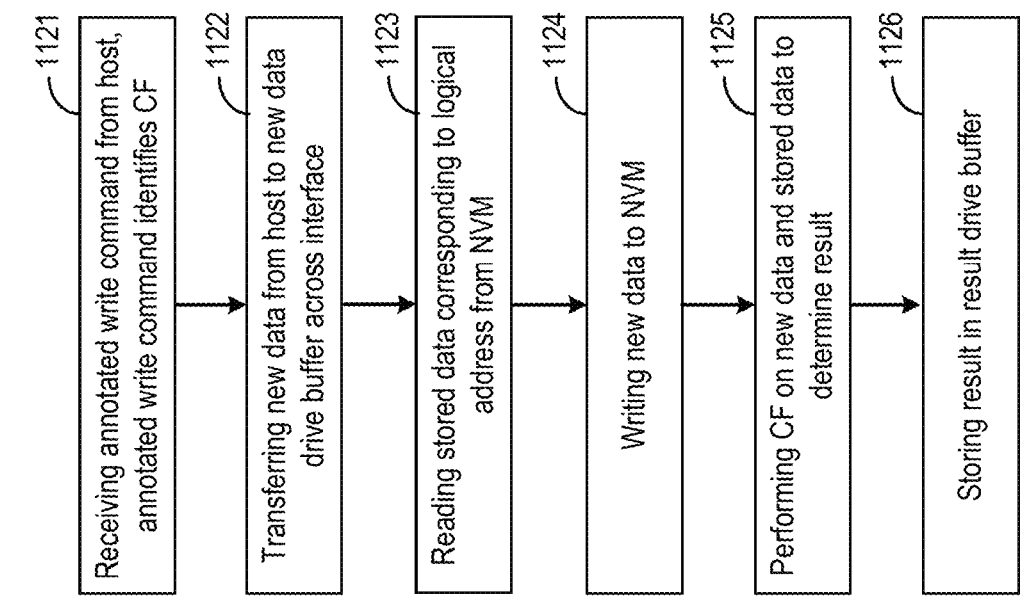
Figure 11A:
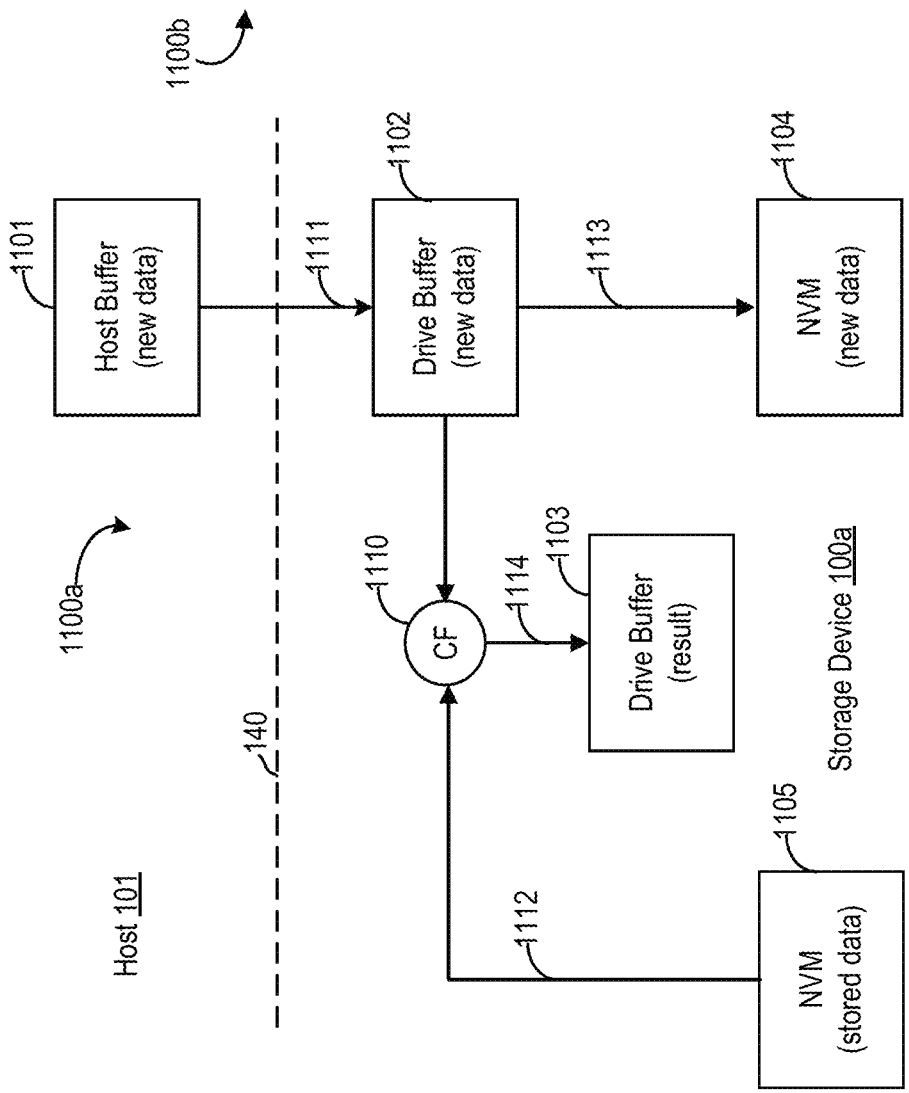

FIG. 11A is a block diagram illustrating an example method 1100a for performing CF in a write operation, according to some implementations. Referring to FIGS. 1 and 11A, the method 1100a can be performed by the host 101 and the storage device 100a. One of the buffer 103, 107, or 109 includes a host buffer (new data) 1101. The NVM (stored data) 1105 refers to a memory location in the memory array 120 of the storage device 100a. Each of a drive buffer (new data) 1102 and a drive buffer (result) 1103 can be the write buffer 114 or the buffer 112. In some examples, the drive buffer (new data) 1102 and the drive buffer (result) 1103 are a same buffer (e.g., a same write buffer 114 or a same buffer 112) to save on buffer resources. In the method 1100a, the controller 110 of the storage device 100a performs a CF 1110 on the new data received from the host 101 and the stored data stored in the NVM (stored data) 1105. The logical address corresponding to the new data is different from the logical address corresponding to the stored data. The new data is written to the NVM (e.g., the memory array 120) of the storage device 100a before the CF 1110 is performed. In other examples, the new data is written to the NVM (new data) 1104 while (in parallel or simultaneously with) or after performing the CF 1110 on the data.

In the method 1100a, the host 101 submits an annotated write command through the bus 105 and over the interface 140 to the controller 110 of the storage device 100a. The annotated write command includes an annotation or indication that identifies the type of the CF 1110 to be performed on the new data stored in the host buffer (new data) 1101 and the stored data stored in the NVM (stored data) 1105. The annotated write command identifies the new data using Operand1 (an address on the bus 105 corresponding to host buffer (new data) 1001) and OpNLB1 and identifies the logical address of the stored data using Operand2 and OpNLB2. The annotated write command can further specify that the new data is to be written to the logical address corresponding to Operand1.

The host 101 presents the host buffer (new data) 1001 to the controller 110 to be written. In response, at 1111, the controller 110 performs a data transfer to obtain the new data from the host buffer (new data) 1101 through the bus 105 across the interface 140, and stores the new data into the drive buffer (new data) 1102. At 1112, the controller 110 of the storage device 100a performs a NAND read into the NVM (stored data) 1105. In other words, the controller 110 reads the stored data corresponding to the specified logical address (Operand2 and OpNLB2) in the annotated write command from the memory array 120.

At 1113, the controller 110 of the storage device 100a writes the new data from the drive buffer (new data) 1102 into the NVM (new data) 1104. In the example in which the annotated write command specifies that the computation result is to be written to the logical address of the new data, at 1014, the controller 110 (e.g., the FTL) updates the addressing mapping table to correspond the physical address of the NVM (result) 1104 with the logical address of the new data (Operand1). The controller 110 marks any outdated physical address for garbage collection.

After 1113, the controller 110 of the storage device 100a performs the CF 1110 on the new data in the drive buffer (new data) 1102 and the stored data read from NVM (stored data) 1105. The inputs to the CF 1110 are the new data in the drive buffer (new data) 1102 and the stored data read from NVM (stored data) 1105. The output of the CF 1110 is the computation result of the CF 1110. At 1114, the controller 110 of the storage device 100a stores the computation result of the CF 1110 in the drive buffer (result) 1103, for later retrieval.

FIG. 11B is a flowchart diagram illustrating an example method 1100b for performing CF in a write operation, according to some implementations. Referring to FIGS. 1, 11A, and 11B, the method 1100b corresponds to the method 1100a. The method 1100b can be performed by the controller 110 of the storage device 100a.

At 1121, the controller 110 receives an annotated write command from the host 101 operatively coupled to the storage device 100a. The annotated write command identifies the CF 1110 to be performed, the logical address of the stored data, as well as the logical address of the new data. At 1122, in response to receiving the annotated write command, the controller 110 transfers the new data from the host 101 (e.g., from the host buffer (new data) 1101) to a drive buffer (e.g., the drive buffer (new data) 1102) of the storage device 100a across through the bus 105 and via the interface 140. At 1123, the controller 110 reads the stored data from the NVM (stored data) 1105. As described, the stored data and the new data have different logical addresses. At 1124, the controller 110 of the storage device 100a writes the new data from the new data buffer to the NVM (new data) 1104.

At 1125, the controller 110 performs the CF 1110 on the new data and the stored data to determine the computation result. Transferring the new data from the host 101 at 1122 and reading the stored data at 1123 can be performed incrementally based on one or more transfer unit sizes. Thus, the CF 1110 can be performed incrementally on some of the new data already received in the drive buffer (new data) 1102 and on some of the corresponding stored data already read from the NVM (stored data) 1105, while remainder of the new data is still being transferred to the drive buffer (new data) 1102 and while the remainder of the stored data is still being read. Accordingly, the CF 1110 can be performed concurrently, on-the-fly, as the new data is being received, as the stored data is being read, and as the computation results are being stored to the drive buffer (result) 1103. At 1126, the controller 110 of the storage device 100a stores the computation result of the CF 1110 in a result drive buffer (e.g., the drive buffer (result) 1103).

Figures 12A, 12B:
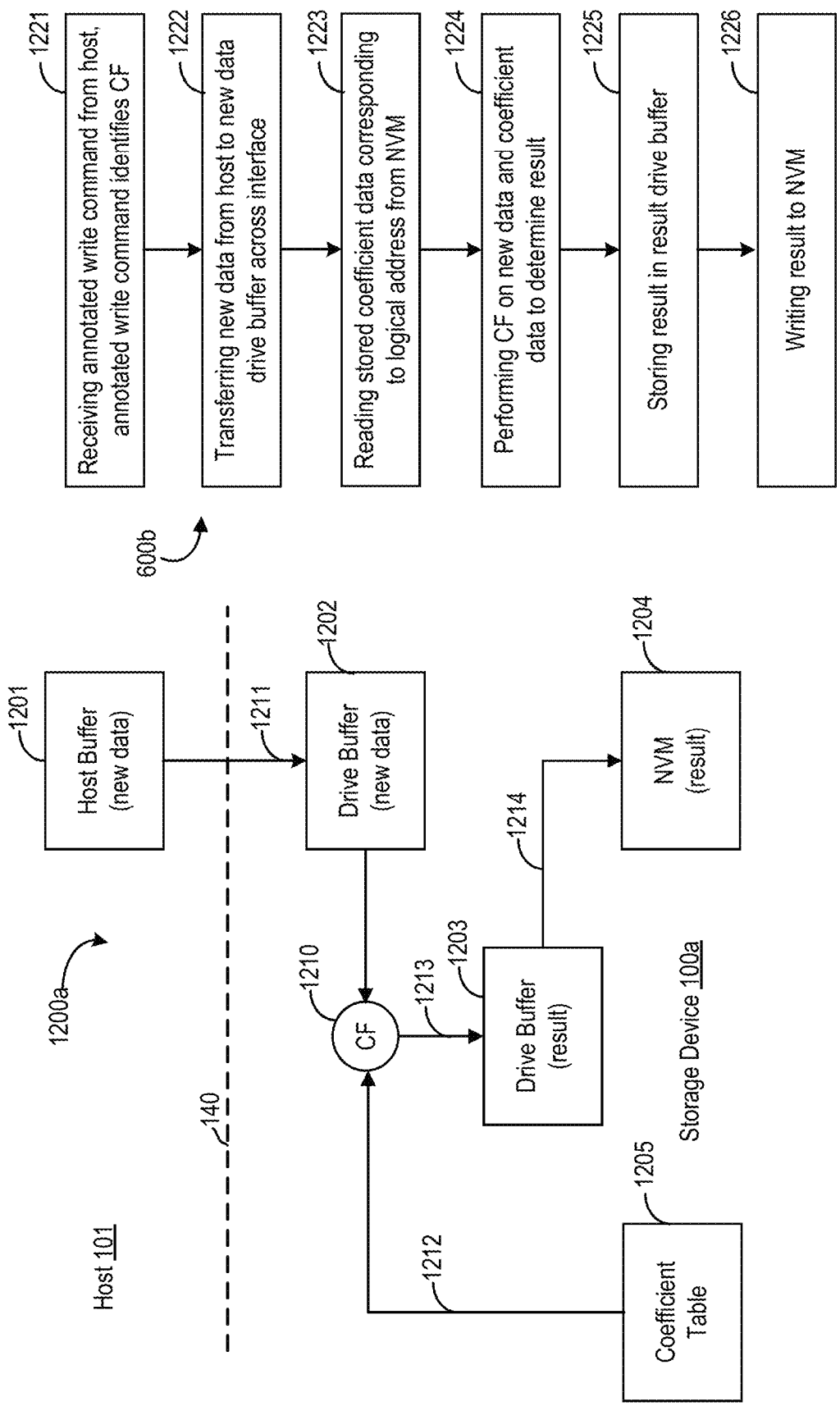

FIG. 12A is a block diagram illustrating an example method 1200a for performing CF in a write operation, according to some implementations. Referring to FIGS. 1 and 12A, the method 1200a can be performed by the host 101 and the storage device 100a. One of the buffer 103, 107, or 109 includes a host buffer (new data) 1201. A coefficient table 1205 refers to a memory location in the memory array 120 of the storage device 100a or in another suitable memory unit of the storage device 100a. Each of a drive buffer (new data) 1202 and a drive buffer (result) 1203 can be the write buffer 114 or the buffer 112. In some examples, the drive buffer (new data) 1202 and the drive buffer (result) 1203 are a same buffer (e.g., a same write buffer 114 or a same buffer 112) to save on buffer resources. In the method 1200a, the controller 110 of the storage device 100a performs a CF 1210 on the new data received from the host 101 and data (e.g., a set of coefficients) stored in the coefficient table 1205. The computation result of the CF 1210 is saved in the NVM (e.g., the memory array 120) of the storage device 100a at an address specified by the annotated write command. In some examples, the logical address to which the computation result is to be saved is the same as the logical address of the new data received from the host 101.

In the method 1200a, the host 101 submits an annotated write command through the bus 105 and over the interface 140 to the controller 110 of the storage device 100a. The annotated write command includes an annotation or indication that identifies the type of the CF 1210 to be performed on the new data stored in the host buffer (new data) 1201 and the data stored in the coefficient table 1205. The annotated write command identifies the new data using Operand1 (an address on the bus 105 corresponding to host buffer (new data) 1201) and OpNLB1 and identifies an address (e.g., a logical address) of the coefficient table 1205 using Operand2 and OpNLB2. The annotated write command can further specify that the computation result of the CF 1210 is to be written to the logical address corresponding to Operand1.

The host 101 presents the host buffer (new data) 1201 to the controller 110 to be written. In response, at 1211, the controller 110 performs a data transfer to obtain the new data from the host buffer (new data) 1201 through the bus 105 across the interface 140, and stores the new data into the drive buffer (new data) 1202. At 1212, the controller 110 of the storage device 100a performs a table fetch to retrieve the set of coefficients in the coefficient table 1205. In other words, the controller 110 reads the coefficient data corresponding to the specified logical address (Operand2 and OpNLB2) in the annotated write command from the memory array 120.

The controller 110 of the storage device 100a performs the CF 1210 on the new data in the drive buffer (new data) 1202 and the stored set of coefficients from coefficient table 1205. The inputs to the CF 1210 are the new data in the drive buffer (new data) 1202 and the stored set of coefficients from the coefficient table 1205. The output of the CF 1210 is the computation result of the CF 1210. At 1213, the controller 110 of the storage device 100a stores the computation result of the CF 1210 in the drive buffer (result) 1203.

At 1214, the controller 110 of the storage device 100a writes the computation result from the drive buffer (result) 1203 into the NVM (result) 1204. In the example in which the annotated write command specifies that the computation result is to be written to the logical address of the new data, at 1214, the controller 110 (e.g., the FTL) updates the addressing mapping table to correspond the physical address of the NVM (result) 1204 with the logical address of the new data (Operand1). The controller 110 marks any outdated physical address for garbage collection.

FIG. 12B is a flowchart diagram illustrating an example method 1200b for performing CF in a write operation, according to some implementations. Referring to FIGS. 1, 12A, and 12B, the method 1200b corresponds to the method 1200a. The method 1200b can be performed by the controller 110 of the storage device 100a.

At 1221, the controller 110 receives an annotated write command from the host 101 operatively coupled to the storage device 100a. The annotated write command identifies the CF 1210 to be performed, the logical address of the stored coefficients, as well as the logical address to which the computation result of the CF 1210 is to be stored. At 1222, in response to receiving the annotated write command, the controller 110 transfers the new data from the host 101 (e.g., from the host buffer (new data) 1201) to a drive buffer (e.g., the drive buffer (new data) 1202) of the storage device 100a across through the bus 105 and via the interface 140. At 1223, the controller 110 reads the stored coefficient data from the coefficient table 1205. As described, the stored coefficient data and the new data have different logical addresses.

At 1224, the controller 110 performs the CF 1210 on the new data and the stored coefficient data to determine the computation result. Transferring the new data from the host 101 at 1222 and reading the stored data at 1223 can be performed incrementally based on one or more transfer unit sizes. Thus, the CF 1210 can be performed incrementally on some of the new data already received in the drive buffer (new data) 1202 and on some of the corresponding coefficient data already read from the coefficient table 1205, while remainder of the new data is still being transferred to the drive buffer (new data) 1202 and while the remainder of the coefficient data is still being read. Accordingly, the CF 1210 can be performed concurrently, on-the-fly, as the new data is being received, as the stored data is being read, and as the computation results are being stored to the drive buffer (result) 1203. At 1225, the controller 110 of the storage device 100*a* stores the computation result of the CF 1210 in a result drive buffer (e.g., the drive buffer (result) 1203). At 1226, the controller 110 of the storage device 100*a* writes the computation result from the result drive buffer to the NVM (result) 1204.

Figures 13A, 13B:
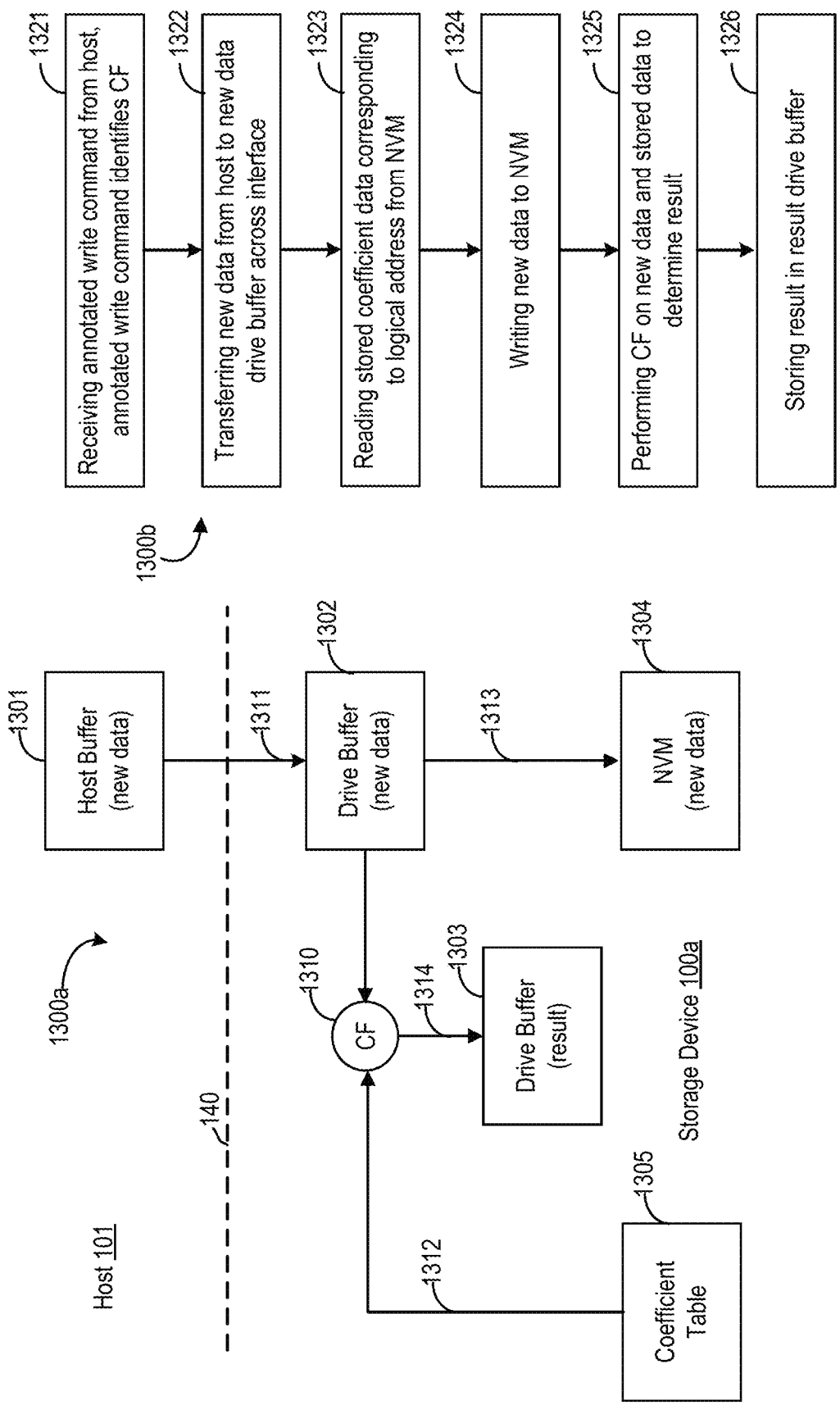

FIG. 13A is a block diagram illustrating an example method 1300*a* for performing CF in a write operation, according to some implementations. Referring to FIGS. 1 and 13A, the method 1300*a* can be performed by the host 101 and the storage device 100*a*. One of the buffer 103, 107, or 109 includes a host buffer (new data) 1301. A coefficient table 1305 refers to a memory location in the memory array 120 of the storage device 100*a* or in another suitable memory unit of the storage device 100*a*. Each of a drive buffer (new data) 1302 and a drive buffer (result) 1303 can be the write buffer 114 or the buffer 112. In some examples, the drive buffer (new data) 1302 and the drive buffer (result) 1303 are a same buffer (e.g., a same write buffer 114 or a same buffer 112) to save on buffer resources. In the method 1300*a*, the controller 110 of the storage device 100*a* performs a CF 1310 on the new data received from the host 101 and data (e.g., a set of coefficients) stored in the coefficient table 1205. Before the CF 1310 is performed, the new data is saved in the NVM (e.g., the memory array 120) of the storage device 100*a* at an address specified by the annotated write command. In other examples, the new data from the host 101 is written to the NVM (new data) 1304 while (in parallel or simultaneously with) or after performing the CF 1310 on the data. In some examples, the logical address to which the new data is to be saved is different from the logical address of the coefficient data.

In the method 1300*a*, the host 101 submits an annotated write command through the bus 105 and over the interface 140 to the controller 110 of the storage device 100*a*. The annotated write command includes an annotation or indication that identifies the type of the CF 1310 to be performed on the new data stored in the host buffer (new data) 1301 and the coefficient data stored in the coefficient table 1305. The annotated write command identifies the new data using Operand1 (an address on the bus 105 corresponding to host buffer (new data) 1301) and OpNLB1 and identifies an address (e.g., a logical address) of the coefficient table 1305 using Operand2 and OpNLB2. The annotated write command can further specify that the new data is to be written to the logical address corresponding to Operand1.

The host 101 presents the host buffer (new data) 1301 to the controller 110 to be written. In response, at 1311, the controller 110 performs a data transfer to obtain the new data from the host buffer (new data) 1301 through the bus 105 across the interface 140, and stores the new data into the drive buffer (new data) 1302. At 1312, the controller 110 of the storage device 100*a* performs a table fetch to retrieve the set of coefficients in the coefficient table 1305. In other words, the controller 110 reads the coefficient data corresponding to the specified logical address (Operand2 and OpNLB2) in the annotated write command from the memory array 120.

At 1313, the controller 110 of the storage device 100*a* writes the new data from the drive buffer (new data) 1302 into the NVM (new data) 1304. The controller 110 (e.g., the FTL) updates the addressing mapping table to correspond the physical address of the NVM (new data) 1304 with the logical address of the new data (Operand1). The controller 110 marks any outdated physical address for garbage collection.

After 1313, the controller 110 of the storage device 100*a* performs the CF 1310 on the new data in the drive buffer (new data) 1302 and the stored set of coefficients from coefficient table 1305. The inputs to the CF 1310 are the new data in the drive buffer (new data) 1302 and the stored set of coefficients from the coefficient table 1305. The output of the CF 1310 is the computation result of the CF 1310. At 1314, the controller 110 of the storage device 100*a* stores the computation result of the CF 1310 in the drive buffer (result) 1303.

FIG. 13B is a flowchart diagram illustrating an example method 1300*b* for performing CF in a write operation, according to some implementations. Referring to FIGS. 1, 13A, and 13B, the method 1300*b* corresponds to the method 1300*a*. The method 1300*b* can be performed by the controller 110 of the storage device 100*a*.

At 1321, the controller 110 receives an annotated write command from the host 101 operatively coupled to the storage device 100*a*. The annotated write command identifies the CF 1310 to be performed, the logical address of the stored coefficients, as well as the logical address to which the new data is to be stored. At 1322, in response to receiving the annotated write command, the controller 110 transfers the new data from the host 101 (e.g., from the host buffer (new data) 1301) to a drive buffer (e.g., the drive buffer (new data) 1302) of the storage device 100*a* across through the bus 105 and via the interface 140. At 1323, the controller 110 reads the stored coefficient data from the coefficient table 1305. As described, the stored coefficient data and the new data have different logical addresses. At 1324, the controller 110 of the storage device 100*a* writes the new data from the drive buffer (new data) 1302 to the NVM (new data) 1304.

At 1325, the controller 110 performs the CF 1310 on the new data and the stored coefficient data to determine the computation result. Transferring the new data from the host 101 at 1322 and reading the stored data at 1323 can be performed incrementally based on one or more transfer unit sizes. Thus, the CF 1310 can be performed incrementally on some of the new data already received in the drive buffer (new data) 1302 and on some of the corresponding coefficient data already read from the coefficient table 1305, while remainder of the new data is still being transferred to the drive buffer (new data) 1302 and while the remainder of the coefficient data is still being read. Accordingly, the CF 1310 can be performed concurrently, on-the-fly, as the new data is being received, as the stored data is being read, and as the computation results are being stored to the drive buffer (result) 1303. At 1326, the controller 110 of the storage device 100*a* stores the computation result of the CF 1310 in a result drive buffer (e.g., the drive buffer (result) 1303).

FIG. 14A is a block diagram illustrating an example method 1400*a* for performing CF in a write operation, according to some implementations. Referring to FIGS. 1 and 14A, the method 1400*a* can be performed by the host 101 and the storage device 100*a*. One of the buffer 103, 107, or 109 includes a host buffer (new data) 1401. The NVM (result) 1404 refers to a memory location in the memory array 120 of the storage device 100*a*. Each of a drive buffer (new data) 1402 and a drive buffer (result) 1403 can be the write buffer 114 or the buffer 112. In some examples, the drive buffer (new data) 1402 and the drive buffer (result) 1403 are a same buffer (e.g., a same write buffer 114 or a same buffer 112) to save on buffer resources. In some examples, the drive buffer (stored data) 1405 can be the buffer 112, the write buffer 114, or the read buffer 116 of the storage device 100*a*. In the method 1400*a*, the controller 110 of the storage device 100*a* performs a CF 1410 on the new data received from the host 101 and the stored data stored in the drive buffer (stored data) 1405. The logical address corresponding to the new data is different from the logical address corresponding to the stored data. The computation result of the CF 1410 is saved in the NVM (e.g., the memory array 120) of the storage device 100*a* at an address specified by the annotated write command.

In the method 1400*a*, the host 101 submits an annotated write command through the bus 105 and over the interface 140 to the controller 110 of the storage device 100*a*. The annotated write command includes an annotation or indication that identifies the type of the CF 1410 to be performed on the new data stored in the host buffer (new data) 1401 and the stored data stored in the drive buffer (stored data) 1405. The annotated write command identifies the new data using an address on the bus 105 corresponding to host buffer (new data) 1401). The annotated write command can also identify the logical address or a buffer address of the stored data (of the drive buffer (stored data) 1405). The annotated write command can further specify that the computation result of the CF 1410 corresponds to the logical address corresponding of the new data.

The host 101 presents the host buffer (new data) 1401 to the controller 110 to be written. In response, at 1411, the controller 110 performs a data transfer to obtain the new data from the host buffer (new data) 1401 through the bus 105 across the interface 140, and stores the new data into the drive buffer (new data) 1402. At 1412, the controller 110 of the storage device 100*a* performs a buffer fetch to fetch the stored data from the drive buffer (stored data) 1405.

The controller 110 of the storage device 100*a* performs the CF 1410 on the new data in the drive buffer (new data) 1402 and the stored data fetched from the drive buffer (stored data) 1405. The inputs to the CF 1410 are the new data in the drive buffer (new data) 1402 and the stored data fetched from drive buffer (stored data) 1405. The output of the CF 1410 is the computation result of the CF 1410. At 1413, the controller 110 of the storage device 100*a* stores the computation result of the CF 1410 in the drive buffer (result) 1403.

At 1414, the controller 110 of the storage device 100*a* writes the computation result from the drive buffer (result) 1403 into the NVM (result) 1404. In the example in which the annotated write command specifies that the computation result is to be written to the logical address of the new data, at 1414, the controller 110 (e.g., the FTL) updates the addressing mapping table to correspond the physical address of the NVM (result) 1404 with the logical address of the new data. The controller 110 marks any outdated physical address for garbage collection.

FIG. 14B is a flowchart diagram illustrating an example method 1400*b* for performing CF in a write operation, according to some implementations. Referring to FIGS. 1, 14A, and 14B, the method 1400*b* corresponds to the method 1400*a*. The method 1400*b* can be performed by the controller 110 of the storage device 100*a*.

At 1421, the controller 110 receives an annotated write command from the host 101 operatively coupled to the storage device 100*a*. The annotated write command identifies the CF 1410 to be performed, the address of the stored data, as well as the logical address to which the computation result of the CF 1410 is to be stored. At 1422, in response to receiving the annotated write command, the controller 110 transfers the new data from the host 101 (e.g., from the host buffer (new data) 1401) to a drive buffer (e.g., the drive buffer (new data) 1402) of the storage device 100*a* across through the bus 105 and via the interface 140. At 1423, the controller 110 fetches the stored data from the drive buffer (stored data) 1405.

At 1424, the controller 110 performs the CF 1410 on the new data and the stored data to determine the computation result. Transferring the new data from the host 101 at 1422 and fetching the stored data at 1423 can be performed incrementally based on one or more transfer unit sizes. Thus, the CF 1410 can be performed incrementally on some of the new data already received in the drive buffer (new data) 1402 and on some of the corresponding stored data already fetched from the drive buffer (stored data) 1405, while remainder of the new data is still being transferred to the drive buffer (new data) 1402 and while the remainder of the stored data is still being fetched. Accordingly, the CF 1410 can be performed concurrently, on-the-fly, as the new data is being received, as the stored data is being fetched, and as the computation results are being stored to the drive buffer (result) 1403. At 1425, the controller 110 of the storage device 100*a* stores the computation result of the CF 1410 in a result drive buffer (e.g., the drive buffer (result) 1403). At 1426, the controller 110 of the storage device 100*a* writes the computation result from the result drive buffer to the NVM (result) 1404.

FIG. 15A is a block diagram illustrating an example method 1500*a* for performing CF in a write operation, according to some implementations. Referring to FIGS. 1 and 15A, the method 1500*a* can be performed by the host 101 and the storage device 100*a*. One of the buffer 103, 107, or 109 includes a host buffer (new data) 1501. The NVM (result) 1504 refers to a memory location in the memory array 120 of the storage device 100*a*. Each of a drive buffer (new data) 1502 and a drive buffer (result) 1503 can be the write buffer 114 or the buffer 112. In some examples, the drive buffer (new data) 1502 and the drive buffer (result) 1503 are a same buffer (e.g., a same write buffer 114 or a same buffer 112) to save on buffer resources. In some examples, the drive buffer (stored data) 1505 can be the buffer 112, the write buffer 114, or the read buffer 116 of the storage device 100*a*. In the method 1500*a*, the controller 110 of the storage device 100*a* performs a CF 1510 on the new data received from the host 101 and the stored data stored in the drive buffer (stored data) 1505. The logical address corresponding to the new data is different from the logical address corresponding to the stored data. Before performing the CF 1510, the new data is saved in the NVM (e.g., the memory array 120) of the storage device 100*a*. In other examples, the new data from the host 101 is written to the NVM (new data) 1504 while (in parallel or simultaneously with) or after performing the CF 1510 on the data.

In the method 1500*a*, the host 101 submits an annotated write command through the bus 105 and over the interface 150 to the controller 110 of the storage device 100*a*. The annotated write command includes an annotation or indication that identifies the type of the CF 1510 to be performed on the new data stored in the host buffer (new data) 1501 and the stored data stored in the drive buffer (stored data) 1505. The annotated write command identifies the new data using an address on the bus 105 corresponding to host buffer (new data) 1501). The annotated write command can also identify the logical address or a buffer address of the stored data (of the drive buffer (stored data) 1505. The annotated write command can further specify that the computation result of the CF 1510 is to be written to the logical address corresponding to the new data.

The host 101 presents the host buffer (new data) 1501 to the controller 110 to be written. In response, at 1511, the controller 110 performs a data transfer to obtain the new data from the host buffer (new data) 1501 through the bus 105 across the interface 140, and stores the new data into the drive buffer (new data) 1502. At 1512, the controller 110 of the storage device 100*a* performs a buffer fetch to fetch the stored data from the drive buffer (stored data) 1505.

At 1513, the controller 110 of the storage device 100*a* writes the new data from the drive buffer (new data) 1503 into the NVM (new data) 1504. The controller 110 (e.g., the FTL) updates the addressing mapping table to correspond the physical address of the NVM (new data) 1504 with the logical address of the new data. The controller 110 marks any outdated physical address for garbage collection.

After 1513, the controller 110 of the storage device 100*a* performs the CF 1510 on the new data in the drive buffer (new data) 1502 and the stored data fetched from the drive buffer (stored data) 1505. The inputs to the CF 1510 are the new data in the drive buffer (new data) 1502 and the stored data fetched from drive buffer (stored data) 1505. The output of the CF 1510 is the computation result of the CF 1510. At 1513, the controller 110 of the storage device 100*a* stores the computation result of the CF 1510 in the drive buffer (result) 1503.

FIG. 15B is a flowchart diagram illustrating an example method 1500*b* for performing CF in a write operation, according to some implementations. Referring to FIGS. 1, 15A, and 15B, the method 1500*b* corresponds to the method 1500*a*. The method 1500*b* can be performed by the controller 110 of the storage device 100*a*.

At 1521, the controller 110 receives an annotated write command from the host 101 operatively coupled to the storage device 100*a*. The annotated write command identifies the CF 1510 to be performed, the address of the stored data, as well as the logical address to which the computation result of the CF 1510 is to be stored. At 1522, in response to receiving the annotated write command, the controller 110 transfers the new data from the host 101 (e.g., from the host buffer (new data) 1501) to a drive buffer (e.g., the drive buffer (new data) 1502) of the storage device 100*a* across through the bus 105 and via the interface 140. At 1523, the controller 110 fetches the stored data from the drive buffer (stored data) 1505. At 1524, the controller 110 of the storage device 100*a* writes the new data from the result drive buffer to the NVM (new data) 1504.

At 1525, the controller 110 performs the CF 1510 on the new data and the stored data to determine the computation result. Transferring the new data from the host 101 at 1522 and fetching the stored data at 1523 can be performed incrementally based on one or more transfer unit sizes. Thus, the CF 1510 can be performed incrementally on some of the new data already received in the drive buffer (new data) 1502 and on some of the corresponding stored data already fetched from the drive buffer (stored data) 1505, while remainder of the new data is still being transferred to the drive buffer (new data) 1502 and while the remainder of the stored data is still being fetched. Accordingly, the CF 1510 can be performed concurrently, on-the-fly, as the new data is being received, as the stored data is being fetched, and as the computation results are being stored to the drive buffer (result) 1503. At 1525, the controller 110 of the storage device 100*a* stores the computation result of the CF 1510 in a result drive buffer (e.g., the drive buffer (result) 1503).

FIG. 16A is a block diagram illustrating an example method 1600*a* for performing CF in a write operation, according to some implementations. Referring to FIGS. 1 and 16A, the method 1600*a* can be performed by the host 101 and the storage device 100*a*. One of the buffer 103, 107, or 109 includes a host buffer (new data) 1601. A coefficient table 1605 refers to a memory location in the memory array 120 of the storage device 100*a* or in another suitable memory unit of the storage device 100*a*. Each of a drive buffer (new data) 1602 and a drive buffer (result) 1603 can be the write buffer 114 or the buffer 112. In some examples, the drive buffer (new data) 1602 and the drive buffer (result) 1603 are a same buffer (e.g., a same write buffer 114 or a same buffer 112) to save on buffer resources. In the method 1600*a*, the controller 110 of the storage device 100*a* performs a CF 1610 on the new data received from the host 101 and data (e.g., a set of coefficients) stored in the coefficient table 1605. Neither the new data nor the computation result of the CF 1610 is saved in the NVM (e.g., the memory array 120) of the storage device 100*a*.

In the method 1600*a*, the host 101 submits an annotated write command through the bus 105 and over the interface 140 to the controller 110 of the storage device 100*a*. The annotated write command includes an annotation or indication that identifies the type of the CF 1610 to be performed on the new data stored in the host buffer (new data) 1601 and the data stored in the coefficient table 1605. The annotated write command further includes an address (e.g., a logical address or another suitable address) of the coefficient table 1605.

The host 101 presents the host buffer (new data) 1601 to the controller 110 to be written. In response, at 1611, the controller 110 performs a data transfer to obtain the new data from the host buffer (new data) 1601 through the bus 105 across the interface 140, and stores the new data into the drive buffer (new data) 1602. At 1612, the controller 110 of the storage device 100*a* performs a table fetch to retrieve the set of coefficients in the coefficient table 1605. In other words, the controller 110 fetches the coefficient data corresponding to the address in the annotated write command from the memory array 120.

The controller 110 of the storage device 100*a* performs the CF 1610 on the new data in the drive buffer (new data) 1602 and the stored set of coefficients from coefficient table 1605. The inputs to the CF 1610 are the new data in the drive buffer (new data) 1602 and the set of coefficients fetched from the coefficient table 1605. The output of the CF 1610 is the computation result of the CF 1610. At 1613, the controller 110 of the storage device 100*a* stores the computation result of the CF 1610 in the drive buffer (result) 1603. The host 101 or another one of the storage devices 100 can retrieve the computation result from the drive buffer (result) 1603, in the example in which the drive buffer (result) 1603 is the buffer 112.

FIG. 16B is a flowchart diagram illustrating an example method 1600*b* for performing CF in a write operation, according to some implementations. Referring to FIGS. 1, 16A, and 16B, the method 1600*b* corresponds to the method 1600*a*. The method 1600*b* can be performed by the controller 110 of the storage device 100*a*.

At 1621, the controller 110 receives an annotated write command from the host 101 operatively coupled to the storage device 100*a*. The annotated write command identifies the CF 1610 to be performed. At 1622, in response to receiving the annotated write command, the controller 110 transfers the new data from the host 101 (e.g., from the host buffer (new data) 1601) to a drive buffer (e.g., the drive buffer (new data) 1602) of the storage device 100*a* across through the bus 105 and via the interface 140. At 1623, the controller 110 reads the stored coefficient data from the coefficient table 1605. As described, the stored coefficient data and the new data have different logical addresses.

At 1624, the controller 110 performs the CF 1610 on the new data and the old data to determine the computation result. Transferring the new data from the host 101 at 1622 and fetching the coefficient data at 1623 can be performed incrementally based on one or more transfer unit sizes. Thus, the CF 1610 can be performed incrementally on some of the new data already received in the drive buffer (new data) 1602 and on some of the corresponding coefficient data already read from the coefficient table 1605, while remainder of the new data is still being transferred to the drive buffer (new data) 1602 and while the remainder of the coefficient data is still being read. Accordingly, the CF 1610 can be performed concurrently, on-the-fly, as the new data is being received, as the old data is being read, and as the computation results are being stored to the drive buffer (result) 1603. At 1625, the controller 110 of the storage device 100*a* stores the computation result of the CF 1610 in a result drive buffer (e.g., the drive buffer (result) 1603).

FIG. 17A is a block diagram illustrating an example method 1700*a* for performing CF in a write operation, according to some implementations. Referring to FIGS. 1 and 17A, the method 1700*a* can be performed by the host 101 and the storage device 100*a*. One of the buffer 103, 107, or 109 includes a host buffer (new data) 1701. Each of a drive buffer (new data) 1702 and a drive buffer (result) 1703 can be the write buffer 114 or the buffer 112. In some examples, the drive buffer (new data) 1702 and the drive buffer (result) 1703 are a same buffer (e.g., a same write buffer 114 or a same buffer 112) to save on buffer resources. In some examples, the drive buffer (stored data) 1705 can be the buffer 112, the write buffer 114, or the read buffer 116 of the storage device 100*a*. In the method 1700*a*, the controller 110 of the storage device 100*a* performs a CF 1710 on the new data received from the host 101 and the stored data stored in the drive buffer (stored data) 1705. The logical address corresponding to the new data is different from the logical address corresponding to the stored data. Neither the computation result of the CF 1710 nor the new data is saved in the NVM (e.g., the memory array 120) of the storage device 100*a*.

In the method 1700*a*, the host 101 submits an annotated write command through the bus 105 and over the interface 170 to the controller 110 of the storage device 100*a*. The annotated write command includes an annotation or indication that identifies the type of the CF 1710 to be performed on the new data stored in the host buffer (new data) 1701 and the stored data stored in the drive buffer (stored data) 1705. The annotated write command identifies the new data using an address on the bus 105 corresponding to host buffer (new data) 1701). The annotated write command can also identify the logical address or a buffer address of the stored data (of the drive buffer (stored data) 1705.

The host 101 presents the host buffer (new data) 1701 to the controller 110 to be written. In response, at 1711, the controller 110 performs a data transfer to obtain the new data from the host buffer (new data) 1701 through the bus 105 across the interface 140, and stores the new data into the drive buffer (new data) 1702. At 1712, the controller 110 of the storage device 100*a* performs a buffer fetch to fetch the stored data from the drive buffer (stored data) 1705.

The controller 110 of the storage device 100*a* performs the CF 1710 on the new data in the drive buffer (new data) 1702 and the stored data fetched from the drive buffer (stored data) 1705. The inputs to the CF 1710 are the new data in the drive buffer (new data) 1702 and the stored data fetched from drive buffer (stored data) 1705. The output of the CF 1710 is the computation result of the CF 1710. At 1713, the controller 110 of the storage device 100*a* stores the computation result of the CF 1710 in the drive buffer (result) 1703.

FIG. 17B is a flowchart diagram illustrating an example method 1700*b* for performing CF in a write operation, according to some implementations. Referring to FIGS. 1, 17A, and 17B, the method 1700*b* corresponds to the method 1700*a*. The method 1700*b* can be performed by the controller 110 of the storage device 100*a*.

At 1721, the controller 110 receives an annotated write command from the host 101 operatively coupled to the storage device 100*a*. The annotated write command identifies the CF 1710 to be performed, the address of the stored data. At 1722, in response to receiving the annotated write command, the controller 110 transfers the new data from the host 101 (e.g., from the host buffer (new data) 1701) to a drive buffer (e.g., the drive buffer (new data) 1702) of the storage device 100*a* across through the bus 105 and via the interface 140. At 1723, the controller 110 fetches the stored data from the drive buffer (stored data) 1705.

At 1724, the controller 110 performs the CF 1710 on the new data and the stored data to determine the computation result. Transferring the new data from the host 101 at 1722 and fetching the stored data at 1723 can be performed incrementally based on one or more transfer unit sizes. Thus, the CF 1710 can be performed incrementally on some of the new data already received in the drive buffer (new data) 1702 and on some of the corresponding stored data already fetched from the drive buffer (stored data) 1705, while remainder of the new data is still being transferred to the drive buffer (new data) 1702 and while the remainder of the stored data is still being fetched. Accordingly, the CF 1710 can be performed concurrently, on-the-fly, as the new data is being received, as the stored data is being fetched, and as the computation results are being stored to the drive buffer (result) 1703. At 1725, the controller 110 of the storage device 100*a* stores the computation result of the CF 1710 in a result drive buffer (e.g., the drive buffer (result) 1703).

Figures 18A, 18B:
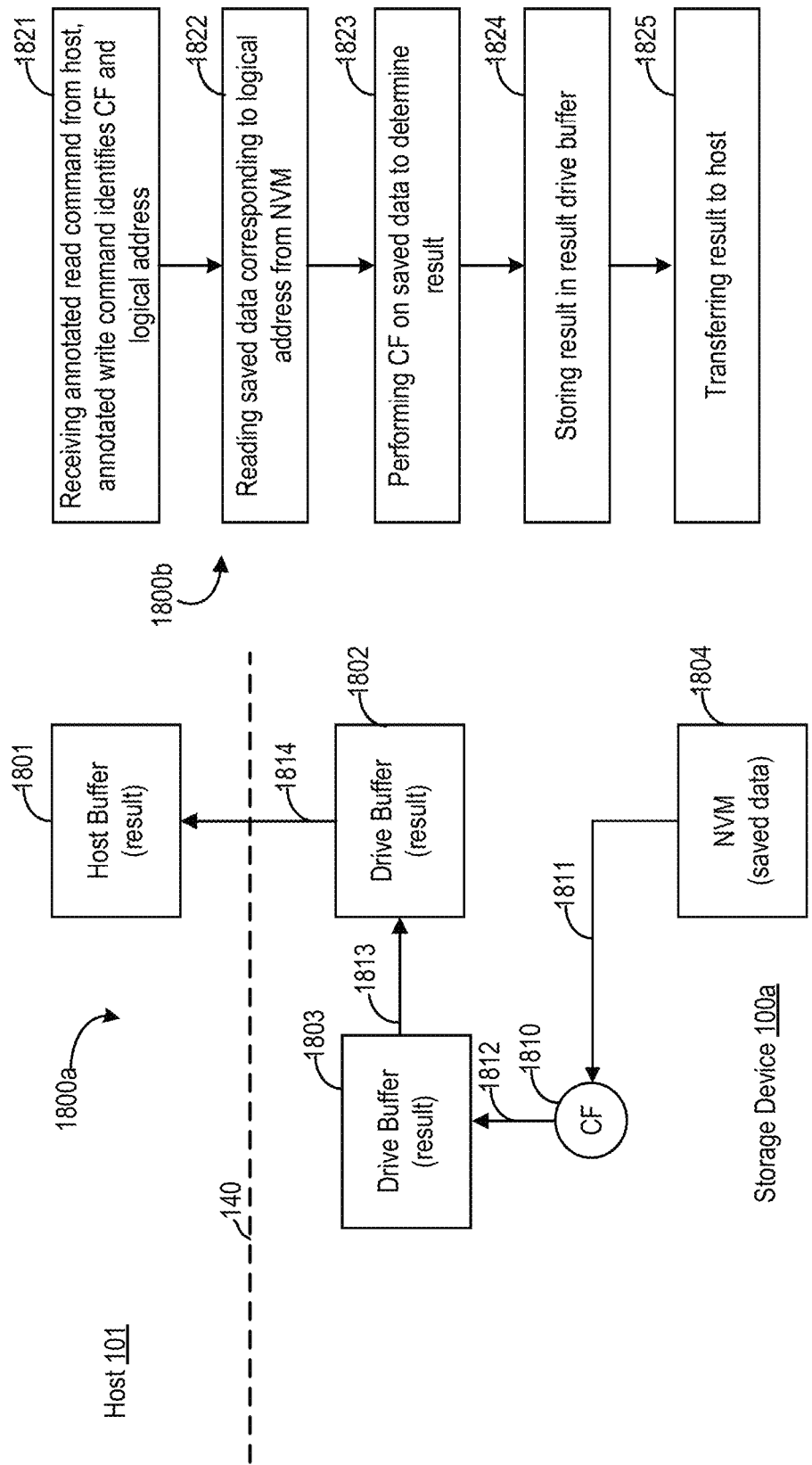

FIG. 18A is a block diagram illustrating an example method 1800*a* for performing CF in a read operation, according to some implementations. Referring to FIGS. 1 and 18A, the method 1800*a* can be performed by the host 101 and the storage device 100*a*. One of the buffer 103, 107, or 109 includes a host buffer (result) 1801. The NVM (saved data) 1804 refers to a memory location in the memory array 120 of the storage device 100*a*. In some examples, the drive buffer (result) 1803 is a read buffer 116 used to temporarily store the computation result of the CF 1810 while the drive buffer (result) 1802 is the buffer 112 used to transfer the computation result to the host buffer (result) 1801. In other examples, the drive buffer (result) 1803 is not used, and the computation result is directly stored by the drive buffer (result) 1802 which is the buffer 112. In the method 1800*a*, the controller 110 of the storage device 100*a* performs a CF 1810 on saved data stored in the memory array 120, and the computation result of the CF 1810 is transferred to the host 101. In accordance with the sample expression of a CF previously discussed, method 1800*a* corresponds to a read with CF where Operand1 is the location of the host buffer 1801, Operand2 is the logical address of the NVM (saved data) 1804 and OTYPE indicates that logical address in Operand2 functions as an input parameter and Operand1 functions as an output parameter. In other words, the compute function CF 1810 operates on the saved data at Operand2 and writes the computation result to Operand1.

In the method 1800a, the host 101 submits an annotated read command through the bus 105 and over the interface 140 to the controller 110 of the storage device 100a. The annotated read command includes an annotation or indication that identifies the type of the CF 1810 to be performed and a logical address identifying the saved data. In response, at 1811, the controller 110 of the storage device 100a reads the saved data corresponding to the logical address from the NVM (saved data) 1804. In other words, the controller 110 of the storage device 100a reads the saved data requested in the annotated read command from the memory array 120 (one or more of the NAND flash memory devices 130a-130n).

The controller 110 of the storage device 100a performs the CF 1810 on the saved data. The input to the CF 1810 is the saved data read from the NVM (saved data) 1804, and the output of the CF 1810 is the computation result of the CF 1810. At 1812, the controller 110 of the storage device 100a stores the computation result of the CF 1810 in the drive buffer (result) 1803. At 1813, the controller 110 of the storage device 100a may send the computation result to the drive buffer (result) 1802. At 1814, computation result is sent from the drive buffer (result) 1802 to the host buffer (result) 1801. For example, the controller 110 can transfers the result from the drive buffer (result) 1802 across the interface 140 into the host buffer (result) 1801. In some examples, the computation result provided to the host 101 corresponds to the logical address included in the annotated read command. In other words, the computation result is provided back to the host 101 as read data.

FIG. 18B is a flowchart diagram illustrating an example method 1800b for performing CF in a read operation, according to some implementations. Referring to FIGS. 1, 18A, and 18B, the method 1800b corresponds to the method 1800a. The method 1800b can be performed by the controller 110 of the storage device 100a.

At 1821, the controller 110 receives an annotated read command from the host 101 operatively coupled to the storage device 100a. The annotated read command identifies the CF 1810 to be performed and includes a logical address of the saved data. At 1822, in response to receiving the annotated read command, the controller 110 reads the saved data corresponding to the logical address from the NVM (saved data) 1804. At 1823, the controller 110 performs the CF 1810 on the saved data to determine the computation result. At 1824, the controller 110 stores the computation result in a drive buffer. For example, the controller 110 can store the computation result in the drive buffer (result) 1803, and then transfers the computation result to the drive buffer (result) 1802. Alternatively, the controller 110 can store the computation result in the drive buffer (result) 1802 directly. At 1825, the controller 110 transfers the computation result to the host 101 (e.g., to the host buffer (result) 1801).

Reading the saved data from the NVM (saved data) 1804 at 1822 can be performed incrementally based on a transfer unit size. Thus, the CF 1810 can be performed incrementally on some of the saved data already read from in the NVM (saved data) 1804, while remainder of the saved data is still being read. Accordingly, the CF 1810 can be performed concurrently, on-the-fly, as the saved data is being read and as the computation results are being stored to the drive buffer (result) 1803 or 1802.

Figures 19A, 19B:
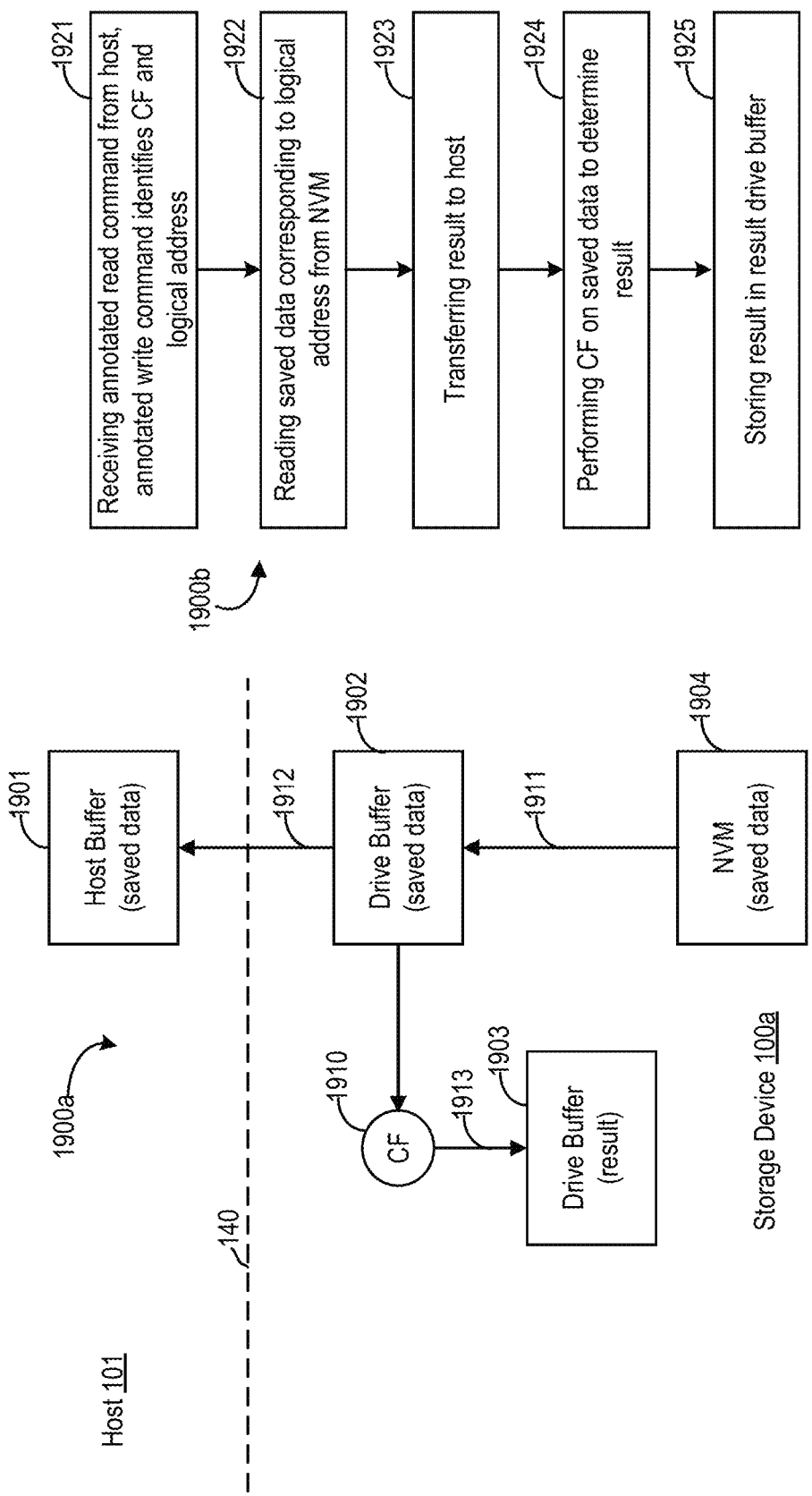

FIG. 19A is a block diagram illustrating an example method 1900a for performing CF in a read operation, according to some implementations. Referring to FIGS. 1 and 19A, the method 1900a can be performed by the host 101 and the storage device 100a. One of the buffer 103, 107, or 109 includes a host buffer (saved data) 1901. The NVM (saved data) 1904 refers to a memory location in the memory array 120 of the storage device 100a. Each of the drive buffer (result) 1903 and the drive buffer (saved data) 1902 is a read buffer 116 or a buffer 112. In some implementations, the drive buffer (result) 1903 can be the same as the drive buffer (saved data) 1902, to conserve buffer resources. In the method 1900a, the controller 110 of the storage device 100a performs a CF 1910 on saved data stored in the memory array 120 after the saved data is transferred to the host 101. In accordance with the sample expression of a CF previously discussed, method 190a corresponds to a read with CF where Operand1 is the location of the host buffer 1901, Operand2 is the logical address of the NVM (saved data) 1904 and OTYPE indicates that logical address in Operand2 functions as an input parameter, Operand1 functions as an output parameter and the computation result is stored in a temporary drive buffer 1903. In other words, the compute function CF 1910 operates on the saved data at Operand2, writes the saved data to Operand1 and writes the computation result to a temporary buffer.

In the method 1900a, the host 101 submits an annotated read command through the bus 105 and over the interface 140 to the controller 110 of the storage device 100a. The annotated read command includes an annotation or indication that identifies the type of the CF 1910 to be performed and a logical address identifying the saved data. In response, at 1911, the controller 110 of the storage device 100a reads the saved data corresponding to the logical address from the NVM (saved data) 1904 into the drive buffer (saved data) 1902. In other words, the controller 110 of the storage device 100a reads the saved data requested in the annotated read command from the memory array 120 (one or more of the NAND flash memory devices 130a-130n).

At 1912, the saved data is sent from the drive buffer (saved data) 1902 to the host buffer (saved data) 1901. For example, the controller 110 can transfers the saved data from the drive buffer (saved data) 1902 across the interface 140 into the host buffer (saved data) 1901. The saved data provided to the host 101 corresponds to the logical address included in the annotated read command.

After 1912, the controller 110 of the storage device 100a performs the CF 1910 on the saved data stored in the drive buffer (saved data) 1902. The input to the CF 1910 is the saved data, and the output of the CF 1910 is the computation result of the CF 1910. At 1913, the controller 110 of the storage device 100a stores the computation result of the CF 1910 in the drive buffer (result) 1903. In other examples, the saved data is sent from the drive buffer (saved data) 1902 to the host buffer (saved data) 1901 while (in parallel or simultaneously with) or after the CF 1910 is performed.

FIG. 19B is a flowchart diagram illustrating an example method 1900b for performing CF in a read operation, according to some implementations. Referring to FIGS. 1, 19A, and 19B, the method 1900b corresponds to the method 1900a. The method 1900b can be performed by the controller 110 of the storage device 100a.

At 1921, the controller 110 receives an annotated read command from the host 101 operatively coupled to the storage device 100a. The annotated read command identifies the CF 1910 to be performed and includes a logical address of the saved data. At 1922, in response to receiving the annotated read command, the controller 110 reads the saved data corresponding to the logical address from the NVM (saved data) 1904 into the saved data drive buffer (the drive buffer (saved data) 1902). At 1923, the controller 110 transfers the saved data to the host 101 from the saved data drive buffer to the host buffer (saved data) 1901. At 1924, the controller 110 performs the CF 1910 on the saved data to determine the computation result, after 1923. In other example, the controller 110 performs the CF 1910 on the saved data to determine the computation result before or while performing 1923. At 1925, the controller 110 stores the computation result in a result drive buffer (e.g., the drive buffer (result) 1903), for later retrieval.

Reading the saved data from the NVM (saved data) 1904 at 1922 and transferring the saved data to the host 101 at 1923 can be performed incrementally based on one or more transfer unit sizes. Thus, the CF 1910 can be performed incrementally on some of the saved data already read from in the NVM (saved data) 1904, while remainder of the saved data is still being read. Accordingly, the CF 1910 can be performed concurrently, on-the-fly, as the saved data is being read and transferred to the host 101, and as the computation results are being stored to the drive buffer (result) 1903.

Figures 20A, 20B:
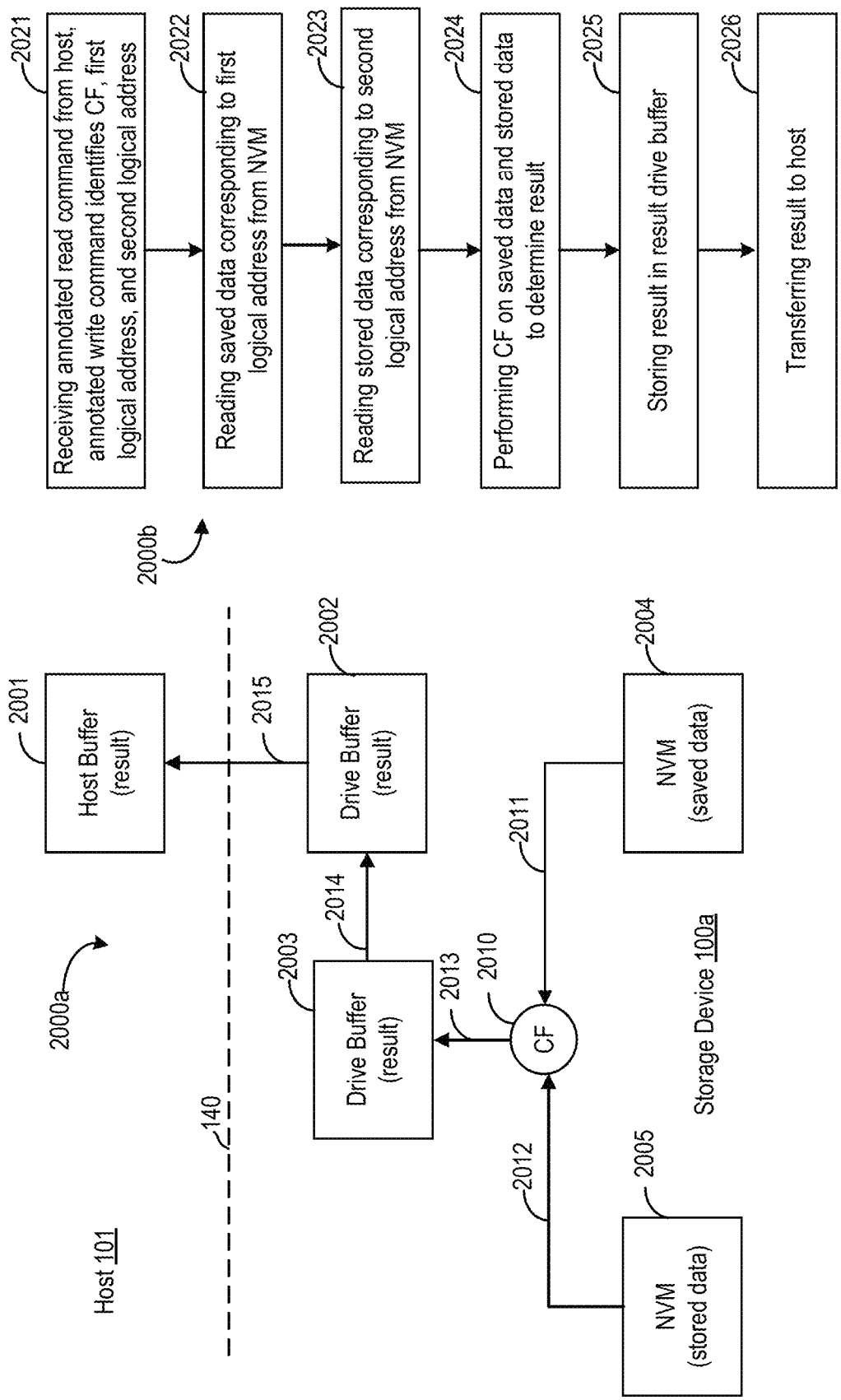

FIG. 20A is a block diagram illustrating an example method 2000a for performing CF in a read operation, according to some implementations. Referring to FIGS. 1 and 20A, the method 2000a can be performed by the host 101 and the storage device 100a. One of the buffer 103, 107, or 109 includes a host buffer (result) 2001. The NVM (saved data) 2004 refers to a first memory location in the memory array 120 of the storage device 100a. The NVM (stored data) 2005 refers to a second memory location in the memory array 120 of the storage device 100a. In some examples, the drive buffer (result) 2003 is a read buffer 116 used to temporarily store the computation result of the CF 2010 while the drive buffer (result) 2002 is the buffer 112 used to transfer the computation result to the host buffer (result) 2001. In other examples, the drive buffer (result) 2003 is not used, and the computation result is directly stored by the drive buffer (result) 2002 which is the buffer 112. In the method 2000a, the controller 110 of the storage device 100a performs a CF 2010 on saved data and stored data stored in different memory locations in the memory array 120, and the computation result of the CF 2010 is transferred to the host 101. The saved data saved in the NVM (saved data) 2004 and the stored data saved in NVM (stored data) 2005 correspond to different logical addresses.

In the method 2000a, the host 101 submits an annotated read command through the bus 105 and over the interface 140 to the controller 110 of the storage device 100a. The annotated read command includes an annotation or indication that identifies the type of the CF 2010 to be performed on the saved data and the stored data. The annotated read command identifies the saved data using a first logical address and a first number of logical blocks, and identifies the stored data using a second logical address and a second number of logical blocks. The annotated read command can further include a flag or indication that specifies an address (e.g., a PCIe address) of the host buffer (result) 2001 to which the computation result of the CF 2010 is to be written.

In response, at 2011, the controller 110 of the storage device 100a reads the saved data corresponding to the first logical address from the NVM (saved data) 2004. In other words, the controller 110 of the storage device 100a reads the saved data requested in the annotated read command from a first physical location of the memory array 120 (one or more of the NAND flash memory devices 130a-130n). At 2012, the controller 110 of the storage device 100a reads the stored data corresponding to the second logical address from the NVM (stored data) 2005. In other words, the controller 110 of the storage device 100a reads the stored data requested in the annotated read command from a second physical location of the memory array 120 (one or more of the NAND flash memory devices 130a-130n).

The controller 110 of the storage device 100a performs the CF 2010 on the saved data and the stored data. The inputs to the CF 2010 are the saved data read from the NVM (saved data) 2004 and the stored data read from the NVM (stored data) 2005. The output of the CF 2010 is the computation result of the CF 2010. At 2013, the controller 110 of the storage device 100a stores the computation result of the CF 2010 in the drive buffer (result) 2003. At 2014, the controller 110 of the storage device 100a may send the computation result to the drive buffer (result) 2002. At 2015, computation result is sent from the drive buffer (result) 2002 to the host buffer (result) 2001. For example, the controller 110 can transfers the computation result from the drive buffer (result) 2002 across the interface 140 into the host buffer (result) 2001. In some examples, the computation result provided to the host 101 corresponds to the first logical address included in the annotated read command. In some examples, the computation result provided to the host 101 corresponds to the second logical address or another logical address included in the annotated read command.

FIG. 20B is a flowchart diagram illustrating an example method 2000b for performing CF in a read operation, according to some implementations. Referring to FIGS. 1, 20A, and 20B, the method 2000b corresponds to the method 2000a. The method 2000b can be performed by the controller 110 of the storage device 100a.

At 2021, the controller 110 receives an annotated read command from the host 101 operatively coupled to the storage device 100a. The annotated read command identifies the CF 2010 to be performed and includes a first logical address of the saved data, a second logical address of the stored data, and flag or indication that specifies an address (e.g., a PCIe address) of the host buffer (result) 2001 to which the computation result of the CF 2010 is to be transferred. In response to receiving the annotated read command, the controller 110 reads the saved data corresponding to the first logical address from the NVM (saved data) 2004 at 2022, and reads the stored data corresponding to the second logical address from the NVM (stored data) 2005 at 2023. At 2024, the controller 110 performs the CF 2010 on the saved data and the stored data to determine the computation result. At 2025, the controller 110 stores the computation result in a drive buffer. For example, the controller 110 can store the computation result in the drive buffer (result) 2003, and then transfers the computation result to the drive buffer (result) 2002. Alternatively, the controller 110 can store the computation result in the drive buffer (result) 2002 directly. At 2026, the controller 110 transfers the computation result to the host 101 (e.g., to the host buffer (result) 2001).

Reading the saved data and the stored data at 2022 and 2023 can be performed incrementally based on a transfer unit size. Thus, the CF 2010 can be performed incrementally on some of the saved data and the corresponding stored data already read, while remainder of the saved data and the stored data is still being read. Accordingly, the CF 2010 can be performed concurrently, on-the-fly, as the saved data and the stored data are being read and as the computation results are being stored to the drive buffer (result) 2003 or 2002 and transferred to the host 101.

Figures 21A, 21B:
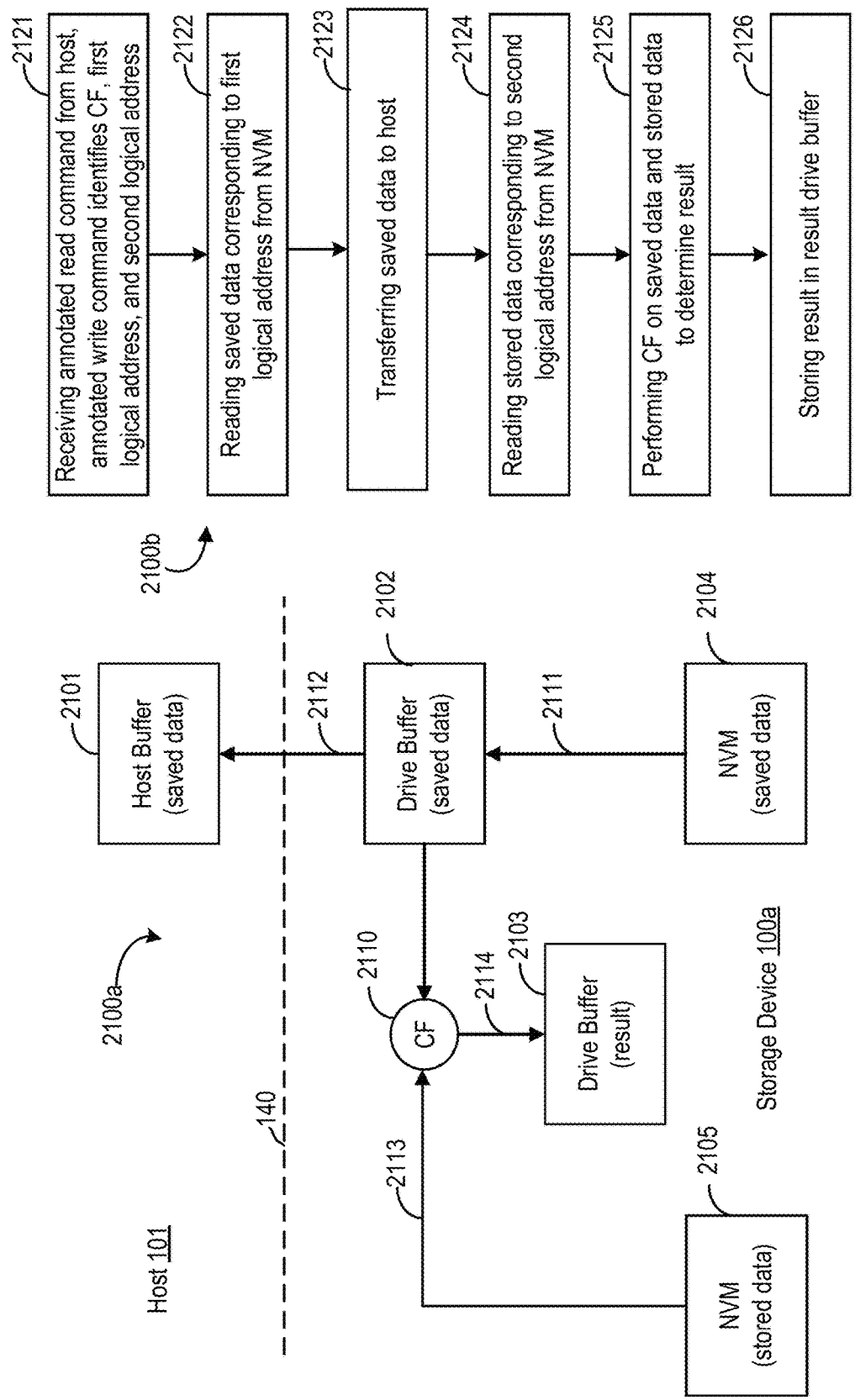

FIG. 21A is a block diagram illustrating an example method 2100a for performing CF in a read operation, according to some implementations. Referring to FIGS. 1 and 21A, the method 2100a can be performed by the host 101 and the storage device 100a. One of the buffer 103, 107, or 109 includes a host buffer (saved data) 2101. The NVM (saved data) 2104 refers to a first memory location in the memory array 120 of the storage device 100a. The NVM (stored data) 2105 refers to a second memory location in the memory array 120 of the storage device 100a. Each of the drive buffer (result) 2103 and the drive buffer (saved data) 2102 is a read buffer 116 or a buffer 112. In some implementations, the drive buffer (result) 2303 can be the same as the drive buffer (saved data) 2102, to conserve buffer resources. In the method 2100a, the controller 110 of the storage device 100a performs a CF 2110 on saved data and stored data stored in different memory locations in the memory array 120, after the saved data is provided to the host 101. The saved data saved in the NVM (saved data) 2104 and the stored data saved in NVM (stored data) 2105 correspond to different logical addresses.

In the method 2100a, the host 101 submits an annotated read command through the bus 105 and over the interface 140 to the controller 110 of the storage device 100a. The annotated read command includes an annotation or indication that identifies the type of the CF 2110 to be performed. The annotated read command identifies the saved data using a first logical address and a first number of logical blocks, and identifies the stored data using a second logical address and a second number of logical blocks. The annotated read command can further include a flag or indication that specifies an address (e.g., a PCIe address) of the host buffer (result) 2101 to which the computation result of the CF 2110 is to be written.

In response, at 2111, the controller 110 of the storage device 100a reads the saved data corresponding to the first logical address from the NVM (saved data) 2104 into the drive buffer (saved data) 2102. In other words, the controller 110 of the storage device 100a reads the saved data requested in the annotated read command from the memory array 120 (one or more of the NAND flash memory devices 130a-130n).

At 2112, the saved data is sent from the drive buffer (saved data) 2102 to the host buffer (saved data) 2101. For example, the controller 110 can transfers the saved data from the drive buffer (saved data) 2102 across the interface 140 into the host buffer (saved data) 2101. The saved data provided to the host 101 corresponds to the logical address included in the annotated read command.

After 2112, at 2113, the controller 110 of the storage device 100a reads the stored data corresponding to the second logical address from the NVM (stored data) 2105. In other words, the controller 110 of the storage device 100a reads the stored data requested in the annotated read command from a second physical location of the memory array 120 (one or more of the NAND flash memory devices 130a-130n). In other examples, the saved data is sent from the drive buffer (saved data) 2102 to the host buffer (saved data) 2101 while (in parallel or simultaneously with) or after the CF 2110 is performed.

The controller 110 of the storage device 100a performs the CF 2110 on the saved data and the stored data. The inputs to the CF 2110 are the saved data read from the NVM (saved data) 2104 and the stored data read from the NVM (stored data) 2105. The output of the CF 2110 is the computation result of the CF 2110. At 2114, the controller 110 of the storage device 100a stores the computation result of the CF 2110 in the drive buffer (result) 2103.

FIG. 21B is a flowchart diagram illustrating an example method 2100b for performing CF in a read operation, according to some implementations. Referring to FIGS. 1, 21A, and 21B, the method 2100b corresponds to the method 2100a. The method 2100b can be performed by the controller 110 of the storage device 100a.

At 2121, the controller 110 receives an annotated read command from the host 101 operatively coupled to the storage device 100a. The annotated read command identifies the CF 2110 to be performed and includes a first logical address of the saved data, a second logical address of the stored data, and flag or indication that specifies an address (e.g., a PCIe address) of the host buffer (result) 2101 to which the saved data is to be transferred. At 2122, in response to receiving the annotated read command, the controller 110 reads the saved data corresponding to the first logical address from the NVM (saved data) 2104 into the saved data drive buffer (the drive buffer (saved data) 2102). At 2123, the controller 110 transfers the saved data to the host 101 from the saved data drive buffer to the host buffer (saved data) 2101. At 2124, the controller 110 reads the stored data corresponding to the second logical address from the NVM (stored data) 2105. At 2125, the controller 110 performs the CF 2110 on the saved data and the stored data to determine the computation result, after 2123. In other examples, the controller 110 performs the CF 2110 before or while (in parallel or simultaneously with) transferring data at 2123. At 2126, the controller 110 stores the computation result in a result drive buffer (e.g., the drive buffer (result) 2103), for later retrieval.

Reading the saved data and the stored data at 2122 and 2124, and transferring the saved data to the host 101 at 2123 can be performed incrementally based on one or more transfer unit sizes. Thus, the CF 2110 can be performed incrementally on some of the saved data and the corresponding stored data already read, while remainder of the saved data and stored data are still being read. Accordingly, the CF 2110 can be performed concurrently, on-the-fly, as the saved data and the stored data are being read and as the saved data is being transferred to the host buffer (saved data) 2101.

Figures 22A, 22B:
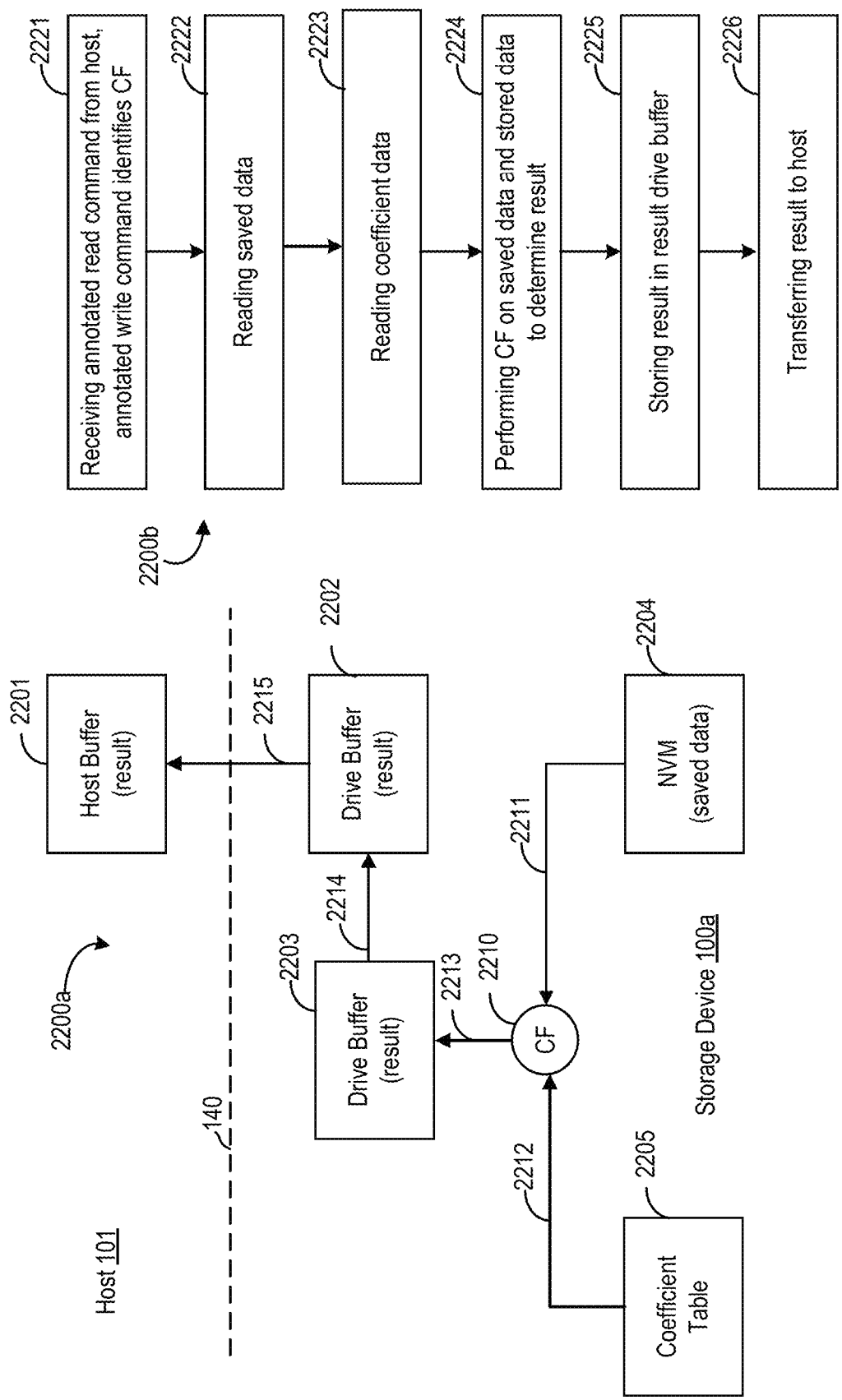

FIG. 22A is a block diagram illustrating an example method 2200a for performing CF in a read operation, according to some implementations. Referring to FIGS. 1 and 22A, the method 2200a can be performed by the host 101 and the storage device 100a. One of the buffer 103, 107, or 109 includes a host buffer (result) 2201. The NVM (saved data) 2204 refers to a memory location in the memory array 120 of the storage device 100a. A coefficient table 2205 refers to a memory location in the memory array 120 of the storage device 100a or in another suitable memory unit of the storage device 100a. In some examples, the drive buffer (result) 2203 is a read buffer 116 used to temporarily store the computation result of the CF 2210 while the drive buffer (result) 2202 is the buffer 112 used to transfer the computation result to the host buffer (result) 2201. In other examples, the drive buffer (result) 2203 is not used, and the computation result is directly stored by the drive buffer (result) 2202 which is the buffer 112. In the method 2200a, the controller 110 of the storage device 100a performs a CF 2210 on saved data and data (e.g., a set of coefficients) stored in the coefficient table 2205. The computation result of the CF 2210 is transferred to the host 101 at an address specified by the annotated read command. The saved data and the coefficient data correspond to different logical addresses. In some examples, the logical address to which the computation result is to be saved is the same as the logical address of the saved data.

In the method 2200a, the host 101 submits an annotated read command through the bus 105 and over the interface 140 to the controller 110 of the storage device 100a. The annotated read command includes an annotation or indication that identifies the type of the CF 2210 to be performed. The annotated read command identifies the saved data using a first logical address and a first number of logical blocks. The annotated read command identifies an address (e.g., a logical address) of the coefficient table 2205 using a second logical address and a second number of logical blocks. The annotated read command can further include a flag or indication that specifies an address (e.g., a PCIe address) of the host buffer (result) 2201 to which the computation result of the CF 2210 is to be written.

In response, at 2211, the controller 110 of the storage device 100a reads the saved data corresponding to the first logical address from the NVM (saved data) 2204. In other words, the controller 110 of the storage device 100a reads the saved data requested in the annotated read command from a first physical location of the memory array 120 (one or more of the NAND flash memory devices 130a-130n). At 2212, the controller 110 of the storage device 100a performs a table fetch to retrieve the set of coefficients in the coefficient table 2205. In other words, the controller 110 of the storage device 100a reads the coefficient data requested in the annotated read command from a second physical location of the memory array 120 (one or more of the NAND flash memory devices 130a-130n).

The controller 110 of the storage device 100a performs the CF 2210 on the saved data and the coefficient data. The inputs to the CF 2210 are the saved data read from the NVM (saved data) 2204 and the coefficient data read from the coefficient table 2205. The output of the CF 2210 is the computation result of the CF 2210. At 2213, the controller 110 of the storage device 100a stores the computation result of the CF 2210 in the drive buffer (result) 2203. At 2214, the controller 110 of the storage device 100a may send the computation result to the drive buffer (result) 2202. At 2215, computation result is sent from the drive buffer (result) 2202 to the host buffer (result) 2201. For example, the controller 110 can transfers the computation result from the drive buffer (result) 2202 across the interface 140 into the host buffer (result) 2201. In some examples, the computation result provided to the host 101 corresponds to the first logical address included in the annotated read command or another logical address.

FIG. 22B is a flowchart diagram illustrating an example method 2200b for performing CF in a read operation, according to some implementations. Referring to FIGS. 1, 22A, and 22B, the method 2200b corresponds to the method 2200a. The method 2200b can be performed by the controller 110 of the storage device 100a.

At 2220, the controller 110 receives an annotated read command from the host 101 operatively coupled to the storage device 100a. The annotated read command identifies the CF 2210 to be performed and includes a first logical address of the saved data, a second logical address of the coefficient data, and a flag or indication that specifies an address (e.g., a PCIe address) of the host buffer (result) 2201 to which the computation result of the CF 2210 is to be transferred. In response to receiving the annotated read command, the controller 110 reads the saved data corresponding to the first logical address from the NVM (saved data) 2204 at 2222, and reads the coefficient data corresponding to the second logical address from the coefficient table 2205 at 2223. At 2224, the controller 110 performs the CF 2210 on the saved data and the coefficient data to determine the computation result. At 2225, the controller 110 stores the computation result in a drive buffer. For example, the controller 110 can store the computation result in the drive buffer (result) 2203, and then transfers the computation result to the drive buffer (result) 2202. Alternatively, the controller 110 can store the computation result in the drive buffer (result) 2202 directly. At 2226, the controller 110 transfers the computation result to the host 101 (e.g., to the host buffer (result) 2201).

Reading the saved data and the coefficient data at 2222 and 2223 can be performed incrementally based on a transfer unit size. Thus, the CF 2210 can be performed incrementally on some of the saved data and the corresponding coefficient data already read, while remainder of the saved data and the coefficient data is still being read. Accordingly, the CF 2210 can be performed concurrently, on-the-fly, as the saved data and the coefficient data are being read and as the computation results are being stored to the drive buffer (result) 2203 or 2202 and transferred to the host 101.

FIG. 23A is a block diagram illustrating an example method 2300a for performing CF in a read operation, according to some implementations. Referring to FIGS. 1 and 23A, the method 2300a can be performed by the host 101 and the storage device 100a. One of the buffer 103, 107, or 109 includes a host buffer (saved data) 2301. The NVM (saved data) 2304 refers to a memory location in the memory array 120 of the storage device 100a. A coefficient table 2205 refers to a memory location in the memory array 120 of the storage device 100a or in another suitable memory unit of the storage device 100a. Each of the drive buffer (result) 2303 and the drive buffer (saved data) 2302 is a read buffer 116 or a buffer 112. In some implementations, the drive buffer (result) 2303 can be the same as the drive buffer (saved data) 2302, to conserve buffer resources. In the method 2300a, the controller 110 of the storage device 100a performs a CF 2310 on saved data and data (e.g., a set of coefficients) stored in the coefficient table 2205, after the saved data is provided to the host 101. The saved data and the coefficient data correspond to different logical addresses.

In the method 2300a, the host 101 submits an annotated read command through the bus 105 and over the interface 140 to the controller 110 of the storage device 100a. The annotated read command includes an annotation or indication that identifies the type of the CF 2310 to be performed. The annotated read command identifies the saved data using a first logical address and a first number of logical blocks. The annotated read command identifies an address (e.g., a logical address) of the coefficient table 2305 using a second logical address and a second number of logical blocks. The annotated read command can further include a flag or indication that specifies an address (e.g., a PCIe address) of the host buffer (result) 2301 to which the saved data is to be written.

In response, at 2311, the controller 110 of the storage device 100a reads the saved data corresponding to the first logical address from the NVM (saved data) 2304 into the drive buffer (saved data) 2302. In other words, the controller 110 of the storage device 100a reads the saved data requested in the annotated read command from the memory array 120 (one or more of the NAND flash memory devices 130a-130n).

At 2312, the saved data is sent from the drive buffer (saved data) 2302 to the host buffer (saved data) 2301. For example, the controller 110 can transfers the saved data from the drive buffer (saved data) 2302 across the interface 140 into the host buffer (saved data) 2301. The saved data provided to the host 101 corresponds to the logical address included in the annotated read command.

After 2312, at 2313, the controller 110 of the storage device 100*a* performs a table fetch to retrieve the set of coefficients in the coefficient table 2305. In other words, the controller 110 of the storage device 100*a* reads the coefficient data requested in the annotated read command from a second physical location of the memory array 120 (one or more of the NAND flash memory devices 130*a*-130*n*).

The controller 110 of the storage device 100*a* performs the CF 2310 on the saved data and the coefficient data. The inputs to the CF 2310 are the saved data read from the NVM (saved data) 2304 and the coefficient data read from the coefficient table 2305. The output of the CF 2310 is the computation result of the CF 2310. At 2314, the controller 110 of the storage device 100*a* stores the computation result of the CF 2310 in the drive buffer (result) 2303.

FIG. 23B is a flowchart diagram illustrating an example method 2300*b* for performing CF in a read operation, according to some implementations. Referring to FIGS. 1, 23A, and 23B, the method 2300*b* corresponds to the method 2300*a*. The method 2300*b* can be performed by the controller 110 of the storage device 100*a*.

At 2323, the controller 110 receives an annotated read command from the host 101 operatively coupled to the storage device 100*a*. The annotated read command identifies the CF 2310 to be performed and includes a first logical address of the saved data, a second logical address of the coefficient data, and a flag or indication that specifies an address (e.g., a PCIe address) of the host buffer (result) 2301 to which the saved data is to be transferred. At 2322, in response to receiving the annotated read command, the controller 110 reads the saved data corresponding to the first logical address from the NVM (saved data) 2304 into the saved data drive buffer (the drive buffer (saved data) 2302). At 2323, the controller 110 transfers the saved data to the host 101 from the saved data drive buffer to the host buffer (saved data) 2301. At 2324, the controller 110 reads the coefficient data corresponding to the second logical address from the coefficient table 2305. At 2325, the controller 110 performs the CF 2310 on the saved data and the coefficient data to determine the computation result, after 2312. In other examples, the controller 110 performs the CF 2310 while (in parallel or simultaneously with) or before the CF 2310 is performed. At 2326, the controller 110 stores the computation result in a result drive buffer (e.g., the drive buffer (result) 2303), for later retrieval.

Reading the saved data and the coefficient data at 2322 and 2324, and transferring the saved data to the host 101 at 2323 can be performed incrementally based on one or more transfer unit sizes. Thus, the CF 2310 can be performed incrementally on some of the saved data and the corresponding coefficient data already read, while remainder of the saved data and coefficient data are still being read. Accordingly, the CF 2310 can be performed concurrently, on-the-fly, as the saved data and the coefficient data are being read and as the saved data is being transferred to the host buffer (saved data) 2301.

FIG. 24A is a block diagram illustrating an example method 2400*a* for performing CF in a read operation, according to some implementations. Referring to FIGS. 1 and 24A, the method 2400*a* can be performed by the host 101 and the storage device 100*a*. One of the buffer 103, 107, or 109 includes a host buffer (result) 2401. The NVM (saved data) 2404 refers to a memory location in the memory array 120 of the storage device 100*a*. The drive buffer (stored data) 2405 can be the buffer 112, the write buffer 114, or the read buffer 116 of the storage device 100*a*. In some examples, the drive buffer (result) 2403 is a read buffer 116 used to temporarily store the computation result of the CF 2410 while the drive buffer (result) 2402 is the buffer 112 used to transfer the computation result to the host buffer (result) 2401. In other examples, the drive buffer (result) 2403 is not used, and the computation result is directly stored by the drive buffer (result) 2402 which is the buffer 112. In the method 2400*a*, the controller 110 of the storage device 100*a* performs a CF 2410 on saved data in the memory location in the memory array 120 and the stored data in a buffer, and the computation result of the CF 2410 is transferred to the host 101. The saved data saved in the NVM (saved data) 2404 and the stored data saved in the drive buffer (stored data) 2405 correspond to different logical addresses.

In the method 2400*a*, the host 101 submits an annotated read command through the bus 105 and over the interface 140 to the controller 110 of the storage device 100*a*. The annotated read command includes an annotation or indication that identifies the type of the CF 2410 to be performed on the saved data and the stored data. The annotated read command identifies the saved data using a first logical address and a first number of logical blocks. The annotated read command identifies the stored data using a second logical address and a second number of logical blocks. Alternatively, the annotated read command identifies the stored data using a buffer address of the stored data (of the drive buffer (stored data) 2405). The annotated read command can further include a flag or indication that specifies an address (e.g., a PCIe address) of the host buffer (result) 2401 to which the computation result of the CF 2410 is to be transferred.

In response, at 2411, the controller 110 of the storage device 100*a* reads the saved data corresponding to the first logical address from the NVM (saved data) 2404. In other words, the controller 110 of the storage device 100*a* reads the saved data requested in the annotated read command from a physical location of the memory array 120 (one or more of the NAND flash memory devices 130*a*-130*n*). At 2412, the controller 110 of the storage device 100*a* performs a buffer fetch to fetch the stored data from the drive buffer (stored data) 2405 using the second logical address or the buffer address.

The controller 110 of the storage device 100*a* performs the CF 2410 on the saved data and the stored data. The inputs to the CF 2410 are the saved data read from the NVM (saved data) 2404 and the stored data read from the drive buffer (stored data) 2405. The output of the CF 2410 is the computation result of the CF 2410. At 2413, the controller 110 of the storage device 100*a* stores the computation result of the CF 2410 in the drive buffer (result) 2403. At 2414, the controller 110 of the storage device 100*a* may send the computation result to the drive buffer (result) 2402. At 2415, computation result is sent from the drive buffer (result) 2402 to the host buffer (result) 2401. For example, the controller 110 can transfers the computation result from the drive buffer (result) 2402 across the interface 140 into the host buffer (result) 2401. In some examples, the computation result provided to the host 101 corresponds to the first logical address included in the annotated read command.

FIG. 24B is a flowchart diagram illustrating an example method 2400*b* for performing CF in a read operation, according to some implementations. Referring to FIGS. 1, 24A, and 24B, the method 2400*b* corresponds to the method

2400*a*. The method 2400*b* can be performed by the controller 110 of the storage device 100*a*.

At 2421, the controller 110 receives an annotated read command from the host 101 operatively coupled to the storage device 100*a*. The annotated read command identifies the CF 2410 to be performed and includes a first logical address of the saved data, a second logical address or buffer address of the stored data, and an indication that specifies an address (e.g., a PCIe address) of the host buffer (result) 2401 to which the computation result of the CF 2410 is to be transferred. In response to receiving the annotated read command, the controller 110 reads the saved data corresponding to the first logical address from the NVM (saved data) 2404 at 2422. At 2423, the controller 110 fetches the stored data corresponding to the second logical address or the buffer address from the drive buffer (stored data) 2405.

At 2424, the controller 110 performs the CF 2410 on the saved data and the stored data to determine the computation result. At 2425, the controller 110 stores the computation result in a drive buffer. For example, the controller 110 can store the computation result in the drive buffer (result) 2403, and then transfers the computation result to the drive buffer (result) 2402. Alternatively, the controller 110 can store the computation result in the drive buffer (result) 2402 directly. At 2426, the controller 110 transfers the computation result to the host 101 (e.g., to the host buffer (result) 2401).

Reading the saved data and the stored data at 2422 and 2423 can be performed incrementally based on a transfer unit size. Thus, the CF 2410 can be performed incrementally on some of the saved data and the corresponding stored data already read, while remainder of the saved data and the stored data is still being read. Accordingly, the CF 2410 can be performed concurrently, on-the-fly, as the saved data and the stored data are being read and as the computation results are being stored to the drive buffer (result) 2403 or 2402 and transferred to the host 101.

FIG. 25A is a block diagram illustrating an example method 2500*a* for performing CF in a read operation, according to some implementations. Referring to FIGS. 1 and 25A, the method 2500*a* can be performed by the host 101 and the storage device 100*a*. One of the buffer 103, 107, or 109 includes a host buffer (saved data) 2501. The NVM (saved data) 2504 refers to a memory location in the memory array 120 of the storage device 100*a*. The drive buffer (stored data) 2505 can be the buffer 112, the write buffer 114, or the read buffer 116 of the storage device 100*a*. Each of the drive buffer (result) 2503 and the drive buffer (saved data) 2502 is a read buffer 116 or a buffer 112. In some implementations, the drive buffer (result) 2503 can be the same as the drive buffer (saved data) 2502, to conserve buffer resources. In the method 2500*a*, the controller 110 of the storage device 100*a* performs a CF 2510 on saved data in the memory location in the memory array 120 and the stored data in a buffer, after the saved data is transferred to the host 101. In other examples, the controller 110 performs the CF 2510 before or while (in parallel or simultaneously with) the saved data is transferred to the host 101. The saved data saved in the NVM (saved data) 2504 and the stored data saved in the drive buffer (stored data) 2505 correspond to different logical addresses.

In the method 2500*a*, the host 101 submits an annotated read command through the bus 105 and over the interface 140 to the controller 110 of the storage device 100*a*. The annotated read command includes an annotation or indication that identifies the type of the CF 2510 to be performed. The annotated read command identifies the saved data using a first logical address and a first number of logical blocks. The annotated read command identifies the stored data using a second logical address and a second number of logical blocks. Alternatively, the annotated read command identifies the stored data using a buffer address of the stored data (of the drive buffer (stored data) 2505). The annotated read command can further include a flag or indication that specifies an address (e.g., a PCIe address) of the host buffer (result) 2501 to which the computation result of the CF 2510 is to be transferred.

In response, at 2511, the controller 110 of the storage device 100*a* reads the saved data corresponding to the first logical address from the NVM (saved data) 2504 into the drive buffer (saved data) 2502. In other words, the controller 110 of the storage device 100*a* reads the saved data requested in the annotated read command from the memory array 120 (one or more of the NAND flash memory devices 130*a*-130*n*).

At 2512, the saved data is sent from the drive buffer (saved data) 2502 to the host buffer (saved data) 2501. For example, the controller 110 can transfers the saved data from the drive buffer (saved data) 2502 across the interface 140 into the host buffer (saved data) 2501. The saved data provided to the host 101 corresponds to the first logical address included in the annotated read command.

After 2512, at 2513, the controller 110 of the storage device 100*a* performs a buffer fetch to fetch the stored data from the drive buffer (stored data) 2505 using the second logical address or the buffer address.

The controller 110 of the storage device 100*a* performs the CF 2510 on the saved data and the stored data. The inputs to the CF 2510 are the saved data read from the NVM (saved data) 2504 and the stored data fetched from the drive buffer (stored data) 2505. The output of the CF 2510 is the computation result of the CF 2510. At 2514, the controller 110 of the storage device 100*a* stores the computation result of the CF 2510 in the drive buffer (result) 2503.

FIG. 25B is a flowchart diagram illustrating an example method 2500*b* for performing CF in a read operation, according to some implementations. Referring to FIGS. 1, 25A, and 25B, the method 2500*b* corresponds to the method 2500*a*. The method 2500*b* can be performed by the controller 110 of the storage device 100*a*.

At 2521, the controller 110 receives an annotated read command from the host 101 operatively coupled to the storage device 100*a*. The annotated read command identifies the CF 2510 to be performed and includes a first logical address of the saved data, a second logical address or buffer address of the stored data, and an indication that specifies an address (e.g., a PCIe address) of the host buffer (result) 2501 to which the saved data is to be transferred. At 2522, in response to receiving the annotated read command, the controller 110 reads the saved data corresponding to the first logical address from the NVM (saved data) 2504 into the saved data drive buffer (the drive buffer (saved data) 2502). At 2523, the controller 110 transfers the saved data to the host 101 from the saved data drive buffer to the host buffer (saved data) 2501. At 2524, the controller 110 fetches the stored data corresponding to the second logical address or the buffer address from the drive buffer (stored data) 2505. At 2525, the controller 110 performs the CF 2510 on the saved data and the stored data to determine the computation result, after 2523. In other examples, the controller 110 performs the CF 2510 before or while (in parallel or simultaneously with) 2423 is performed. At 2526, the controller 110 stores the computation result in a result drive buffer (e.g., the drive buffer (result) 2503), for later retrieval.

Reading the saved data and the stored data at 2522 and 2524, and transferring the saved data to the host 101 at 2523 can be performed incrementally based on one or more transfer unit sizes. Thus, the CF 2510 can be performed incrementally on some of the saved data and the corresponding stored data already read, while remainder of the saved data and stored data are still being read. Accordingly, the CF 2510 can be performed concurrently, on-the-fly, as the saved data and the stored data are being read and as the saved data is being transferred to the host buffer (saved data) 2501.

Figure 26:
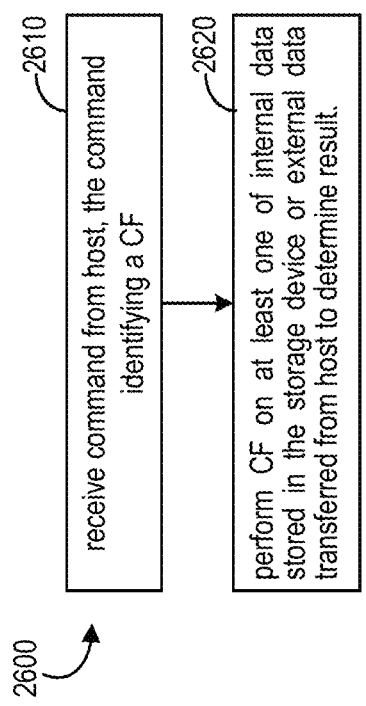
FIG. 26 is a flowchart diagram illustrating an example method for performing CF, according to some implementations.

FIG. 26 is a flowchart diagram illustrating an example method 2600 for performing a CF, according to some implementations. Referring to FIGS. 1-26, the method 2600 can be performed by the controller 110 of the storage device 100a.

At 2610, the controller 110 of the storage device 100a receives a command from the host 101. The command identifies the CF to be performed by the storage device 100a. The command can be an annotated write command, an annotated read command, or another annotated command that identifies the CF to be performed. The CF includes at least one of an add, subtract, multiply, divide or GF math/arithmetic operation; an AND, OR, NAND, NOR, NOT (invert) or XOR logical operation; an AND, OR, or XOR Boolean (true/false result) operation; a logical shift, arithmetic shift or rotate bitwise operation; greater than, less than or not equal to compare operation; a copy, find or compare string operations; an AVG( ), FIRST( ), LAST( ), MAX( ), MIN( ), SUM( ), database query language function; a Reed-Solomon or Erasure coding operation; a data encryption or a database table operation.

At 2620, in response to receiving the command, the controller 110 of the storage device 100a performs the CF on at least one of internal data stored in the storage device 100a or external data transferred from the host 1010 to determine computation result.

In some examples as shown in FIGS. 4A-17B, the command is a write command identifying the external data (e.g., the new data). In such examples, performing the CF on at least one of the internal data or external data includes performing the CF on the external data.

In some examples, in addition to the external data, the write command further identifies the internal data. In such examples, performing the CF on at least one of the internal data or external data includes performing the CF on both the internal data and the external data. The internal data includes one or more of data stored in a non-volatile storage memory (e.g., the memory array 120) of the storage device 100a, data stored in a drive buffer of the storage device 100a, or coefficient data stored in a coefficient table of the storage device 100a.

In some examples, the write command identifies a number of logical blocks and a logical address of the internal data. The write command further identifies a number of logical blocks and a logical address (or buffer address) of the external data. The number of the logical blocks of the internal data and the number of the logical blocks of the external data are same in some cases, and different in other cases.

The controller 110 can write the external data or the computation result of the CF to a non-volatile storage memory (e.g., the memory array 120) of the storage device 100a in some examples. In some examples, the controller 110 can write the external data to the non-volatile storage memory of the storage device 100a before, while, or after performing the CF on the external data.

In some examples as shown in FIGS. 18A-25B, the command is a read command identifying the internal data. In such examples, performing the CF on at least one of the internal data or external data includes performing the CF on the internal data. In some examples, the controller 110 provides the internal data or the computation result of the CF to the host 101. The internal data is provided to the host 101 before, while, or after performing the CF on the internal data.

In some examples, the internal data includes first internal data and second internal data. The read command identifies the first internal data (using a corresponding logical address and a number of logical blocks) and the second internal data (using a corresponding logical address (or buffer address) and a number of logical blocks. Performing the CF on the internal data includes performing the CF on the first internal data and the second internal data.

In some examples, the first internal data includes data stored in the non-volatile storage memory (e.g., the memory array 120) of the storage device 100a. The second internal data includes one of data stored in the non-volatile storage memory of the storage device 100a, data stored in a drive buffer of the storage device 100a, or coefficient data stored in a coefficient table of the storage device 100a. The controller 110 provides the first internal data or the computation result of the CF to the host 101 in some examples. In some examples, the controller 110 provides the first internal data to the host 101 before performing the CF on the first internal data and the second internal data.

In some examples, the read command identifies a number of logical blocks and a logical address of the first internal data. The read command further identifies a number of logical blocks and a logical address of the second internal data. The number of the logical blocks of the first internal data and the number of the logical blocks of the second internal data are same in some cases, and different in other cases.

In some arrangements, the storage device 100a performs the CF described herein using one or more shared processors within the ASIC or circuitry of the controller 110 (the shared processors perform the CF and other functions of the controller 110), one or more separate, dedicated processors within the ASIC or circuitry of the controller 110 (the dedicated processors perform only the CF), or one or more shared processors on a separate chip (co-processor) attached to the ASIC or circuitry of the controller 110. In the examples in which the multiple separate, dedicated processors perform the CF, the processor(s) of the controller 110 selects one of or more of the multiple separate, dedicated processors to perform a particular CF, for example, based on availability of the separate, dedicated processors.

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A non-transitory computer-readable medium comprising computer readable instructions, such that when executed by at least one processor of a storage device, causes the processor to:
  receive a command from a host to read data from or write data to non-volatile storage memory of the storage device, wherein the read or write command contains a set of parameters including:
    an identification of a Compute Function (CF),
    locations of first and second data for the CF,
    an address type for one or both of the locations of the first and second data, wherein the address type is configured to specify that one or both of the locations is either a bus-addressable physical memory or the non-volatile storage memory, and
    first and second numbers of logical blocks of the first and second data, respectively,
    wherein the first and second numbers of logical blocks for the data for the CF are different;
  in response to receiving the command, perform the CF using the first and second data, wherein at least one of the first and second data comprises internal data stored in the storage device or external data transferred from the host to determine a computation result;
  store the computation result in a drive buffer of the storage device that is separate from the non-volatile storage memory of the storage device; and
  transfer data between the drive buffer of the storage device and the host in accordance with the command.

2. The non-transitory computer-readable medium of claim 1, wherein
  the CF comprises one of an mathematical or arithmetic operation, a logical operation, a Boolean operation, a bitwise operation, a compare operation, a string operation, a database query language function, a Reed-Solomon or Erasure coding operation, a data encryption operation, or a database stable operation;

the mathematical or arithmetic operation comprises one or more of: add, subtract, multiply, divide or Galois field (GF);

the logical operation comprises one or more of: AND, OR, NAND, NOR, NOT or XOR;

the Boolean operation comprises one or more of: AND, OR, or XOR;

the bitwise operation comprises one or more of: logical shift, arithmetic shift, or rotate;

the compare operation comprises one or more of: greater than, less than, or not equal to;

the string operation comprises one or more of a copy, find, or compare; and the database query language function comprises one or more of: AVG( ), FIRST( ), LAST( ), MAX( ), MIN( ), and SUM( ).

3. The non-transitory computer-readable medium of claim 1, wherein
the command is a write command identifying the external data; and
performing the CF on at least one of the internal data or external data comprises performing the CF on the external data.

4. The non-transitory computer-readable medium of claim 1, wherein
the command is a write command identifying the internal data and the external data; and performing the CF on at least one of the internal data or external data comprises performing the CF on the internal data and the external data.

5. The non-transitory computer-readable medium of claim 4, wherein the internal data comprises coefficient data stored in a coefficient table of the storage device.

6. The non-transitory computer-readable medium of claim 4, wherein
the write command identifies a number of logical blocks of the internal data and a number of logical blocks of the external data; and
the number of the logical blocks of the internal data and the number of the logical blocks of the external data are different.

7. The non-transitory computer-readable medium of claim 1, wherein the processor is further caused to write the external data or the computation result of the CF to the non-volatile storage memory of the storage device.

8. The non-transitory computer-readable medium of claim 1, wherein the processor is further caused to write the external data to the non-volatile storage memory of the storage device before, while, or after performing the CF on the external data.

9. The non-transitory computer-readable medium of claim 1, wherein
the command is a read command identifying the internal data; and
performing the CF on at least one of the internal data or external data comprises performing the CF on the internal data.

10. The non-transitory computer-readable medium of claim 9, wherein the processor is further caused to provide the internal data or the computation result of the CF to the host.

11. The non-transitory computer-readable medium of claim 9, wherein the processor is further caused to provide the internal data to the host before or while performing the CF on the internal data.

12. The non-transitory computer-readable medium of claim 9, wherein
the internal data comprises first internal data and second internal data;
the read command identifies the first internal data and the second internal data; and
performing the CF on the internal data comprises performing the CF on the first internal data and the second internal.

13. The non-transitory computer-readable medium of claim 12, wherein
the first internal data comprises data stored in the non-volatile storage memory of the storage device; and
the second internal data comprises one of:
data stored in the drive buffer of the storage device; or
coefficient data stored in a coefficient table of the storage device.

14. The non-transitory computer-readable medium of claim 13, wherein the processor is further caused to provide the first internal data or the computation result of the CF to the host.

15. The non-transitory computer-readable medium of claim 12, wherein the read command identifies a number of logical blocks of the first internal data and a number of logical blocks of the second internal data; and
the number of the logical blocks of the first internal data and the number of the logical blocks of the second internal data are different.

16. A storage device, comprising:
a non-volatile storage; and
a controller having a drive buffer separate from the non-volatile storage and a processor configured to:
receive a command from a host to read data from or write data to the non-volatile storage, wherein the read or write command contains a set of parameters including:
an identification of a Compute Function (CF),
locations of first and second data for the CF,
an address type for one or both of the locations of the first and second data, wherein the address type is configured to specify that one or both of the locations is either a bus-addressable physical memory or the non-volatile storage memory, and
first and second numbers of logical blocks of the first and second data, respectively,
wherein the first and second numbers of logical blocks for the data for the CF are different;
in response to receiving the command, perform the CF using the first and second data, wherein at least one of the first and second data comprises internal data stored in the storage device or external data transferred from the host to determine a computation result;
store the computation result in the drive buffer; and
transfer data between the drive buffer and the host in accordance with the command.

17. A method, comprising:
receiving, by a controller of a storage device, a command from a host to read data from or write data to non-volatile storage of the storage device, wherein the read or write command contains a set of parameters including:
an identification of a Compute Function (CF),
locations of first and second data for the CF, an address type for one or both of the locations of the first and second data, wherein the address type is configured to specify that one or both of the locations is either a bus-addressable physical memory or the non-volatile storage memory, and first and second numbers of logical blocks of the first and second data, respectively, wherein the first and second numbers of logical blocks for the data for the CF are different;

in response to receiving the command, performing, by the controller, the CF using the first and second data, wherein at least one of the first and second data comprises internal data stored in the storage device or external data transferred from the host to determine a computation result;

storing the computation result in a drive buffer of the storage device that is separate from the non-volatile storage; and transferring data between the drive buffer and the host in accordance with the command.

* * * * *